United States Patent [19]
Volftsun et al.

[11] Patent Number: 6,151,390
[45] Date of Patent: *Nov. 21, 2000

[54] PROTOCOL CONVERSION USING CHANNEL ASSOCIATED SIGNALING

[75] Inventors: Lev Volftsun, Herndon; Clay H. Neighbors, Reston; Fred R. Rednor, Arlington, all of Va.; Andrew Hardie West, Hove, United Kingdom; David Auerbach, Reston; Adrian Richard Kingston, Gainsville, both of Va.

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/109,996

[22] Filed: Jun. 30, 1998

Related U.S. Application Data

[63] Continuation-in-part of application No. 08/904,295, Jul. 31, 1997.
[60] Provisional application No. 60/081,637, Apr. 13, 1998, and provisional application No. 60/082,613, Apr. 21, 1998.

[51] Int. Cl.[7] .................... H04M 7/00; H04J 3/12
[52] U.S. Cl. .................... 379/229; 370/467; 370/522; 379/220; 379/230
[58] Field of Search .................... 370/466, 467, 370/522; 379/207, 219, 220, 229, 230

[56] References Cited

U.S. PATENT DOCUMENTS

| | | | |
|---|---|---|---|
| Re. 34,536 | 2/1994 | Frimmel, Jr. .......... | 379/216 X |
| 5,182,748 | 1/1993 | Sakata et al. .......... | 370/466 |
| 5,239,542 | 8/1993 | Breidenstein et al. ... | 370/376 |
| 5,414,762 | 5/1995 | Flisik et al. .......... | 379/198 |
| 5,420,916 | 5/1995 | Sekiguchi ............. | 379/230 |
| 5,426,694 | 6/1995 | Hebert ................ | 379/242 |
| 5,428,771 | 6/1995 | Daniels et al. ........ | 709/101 |
| 5,517,563 | 5/1996 | Norell ................ | 379/220 |
| 5,530,434 | 6/1996 | Kanda ................. | 340/825.04 |
| 5,535,336 | 7/1996 | Smith et al. .......... | 709/225 |
| 5,535,373 | 7/1996 | Olnowich ............. | 395/500.46 |
| 5,537,679 | 7/1996 | Crosbie et al. ........ | 455/13 |
| 5,539,787 | 7/1996 | Nakano et al. ........ | 375/377 |
| 5,543,785 | 8/1996 | Vatt et al. ........... | 379/211 X |
| 5,546,450 | 8/1996 | Suthard et al. ........ | 379/207 |
| 5,546,453 | 8/1996 | Hebert ................ | 379/242 |
| 5,550,820 | 8/1996 | Baran ................. | 370/395 |
| 5,557,652 | 9/1996 | Jonsson ............... | 379/207 |
| 5,581,558 | 12/1996 | Horney, II et al. .... | 370/401 |
| 5,793,771 | 8/1998 | Darland et al. ........ | 370/467 |
| 5,815,501 | 9/1998 | Gaddis et al. ......... | 370/402 |
| 5,838,781 | 11/1998 | Isaksson .............. | 379/229 |
| 5,848,070 | 12/1998 | Durvaux et al. ....... | 370/466 X |

*Primary Examiner*—Harry S. Hong
*Attorney, Agent, or Firm*—Hickman Palermo Truong & Becker; Christopher J. Palermo; Carl L. Brandt

[57] ABSTRACT

A method and apparatus for protocol conversion using channel associated signaling (CAS) is disclosed. A protocol conversion system is located logically between a first signaling system and a second signaling system, in which the first signaling system uses the Common Channel Signaling (CCS) protocol and the second signaling system uses CAS, which is incompatible with CCS. The protocol conversion system receives a first message from the first signaling system that conforms to the CCS protocol, converts the first message to one or more second messages that conform to the CAS protocol, and communicates the one or more second messages to the second signaling system, whereby a voice conversation is established between the first signaling system and the second signaling system. The protocol conversion system preferably comprises a universal protocol converter coupled to a CAS module. The CAS module interfaces trunks of the two incompatible networks and drops or inserts signaling information in frames carried by the trunks. The universal protocol converter executes a state machine that determines how to convert CCS messages into CAS messages, and instructs the CAS module what messages are to be sent to each network. In this configuration, voice conversations can be set up over incompatible signaling networks.

27 Claims, 40 Drawing Sheets

416e
416d
416c
416b
416a

| | |
|---|---|
| 900 | TERMINATING BEARER CHANNEL SERVICE STATE |
| 902 | TERMINATING BEARER CHANNEL IDENTIFIER |
| 904 | ORIGINATING USER/NETWORK FLAG |
| 906 | TERMINATING USER/NETWORK FLAG |
| 908 | ORIGINATING CALL REFERENCE |
| 910 | TERMINATING CALL IDENTIFIER |
| 912 | ORIGINATING SIGNALING CHANNEL IDENTIFIER |
| 914 | TERMINATING SIGNALING CHANNEL IDENTIFIER |
| 916 | ORIGINATING OVERLAP/ENBLOCK FLAG |
| 918 | TERMINATING OVERLAP/ENBLOCK FLAG |
| 920 | ORIGINATING MIN MESSAGE LENGTH |
| 922 | ORIGINATING MAX MESSAGE LENGTH |
| 924 | ACTUAL ORIGINATING PARTY ID |
| 926 | CALLING LINE I/F VALIDATION FEATURE FLAG |
| 928 | NUMBER TRANSLATION FEATURE FLAG |
| 930 | TONE DETECTION FEATURE FLAG |
| 932 | ORIGINATING SIGNAL SET |
| 934 | TERMINATING SIGNAL SET |
| 936 | ORIGINATING PROTOCOL TYPE |
| 938 | ORIGINATING PROTOCOL GROUP |
| 940 | TERMINATING PROTOCOL TYPE |
| 942 | TERMINATING PROTOCOL GROUP |
| 944 | LOCAL MODE |
| 946 | BUFFER MODE |
| 948 | CALLING LINE IDENTIFICATION |
| 950 | BUFFER |
| 952 | SENDING COMPLETE FLAG |
| 954 | DIALED DESTINATION NUMBER |
| 956 | TRANSLATED DESTINATION NUMBER |
| 958 | BEARER CAPABILITIES |

Fig. 9A

| 990a | CALL CONTEXT BEFORE APPLICATION OF RULE 970 | 954 904 567 1234 | 956 | 958 FAX | 960 407 567 1234 | 962 407 567 1234 |

| 990b | CALL CONTEXT AFTER APPLICATION OF RULE 970 | 954 904 567 1234 | 956 67 1234 | 958 FAX | 960 407 567 1234 | 962 407 567 1234 |

*Fig. 9C*

| 992a | CALL CONTEXT BEFORE APPLICATION OF RULE 970 | 954 904 567 1234 | 956 | 958 FAX | 960 415 234 1234 | 962 415 234 1234 |

| 992b | CALL CONTEXT AFTER APPLICATION OF RULE 970 | 954 904 567 1234 | 956 904 567 1234 | 958 FAX | 960 415 234 1234 | 962 415 234 1234 |

*Fig. 9D*

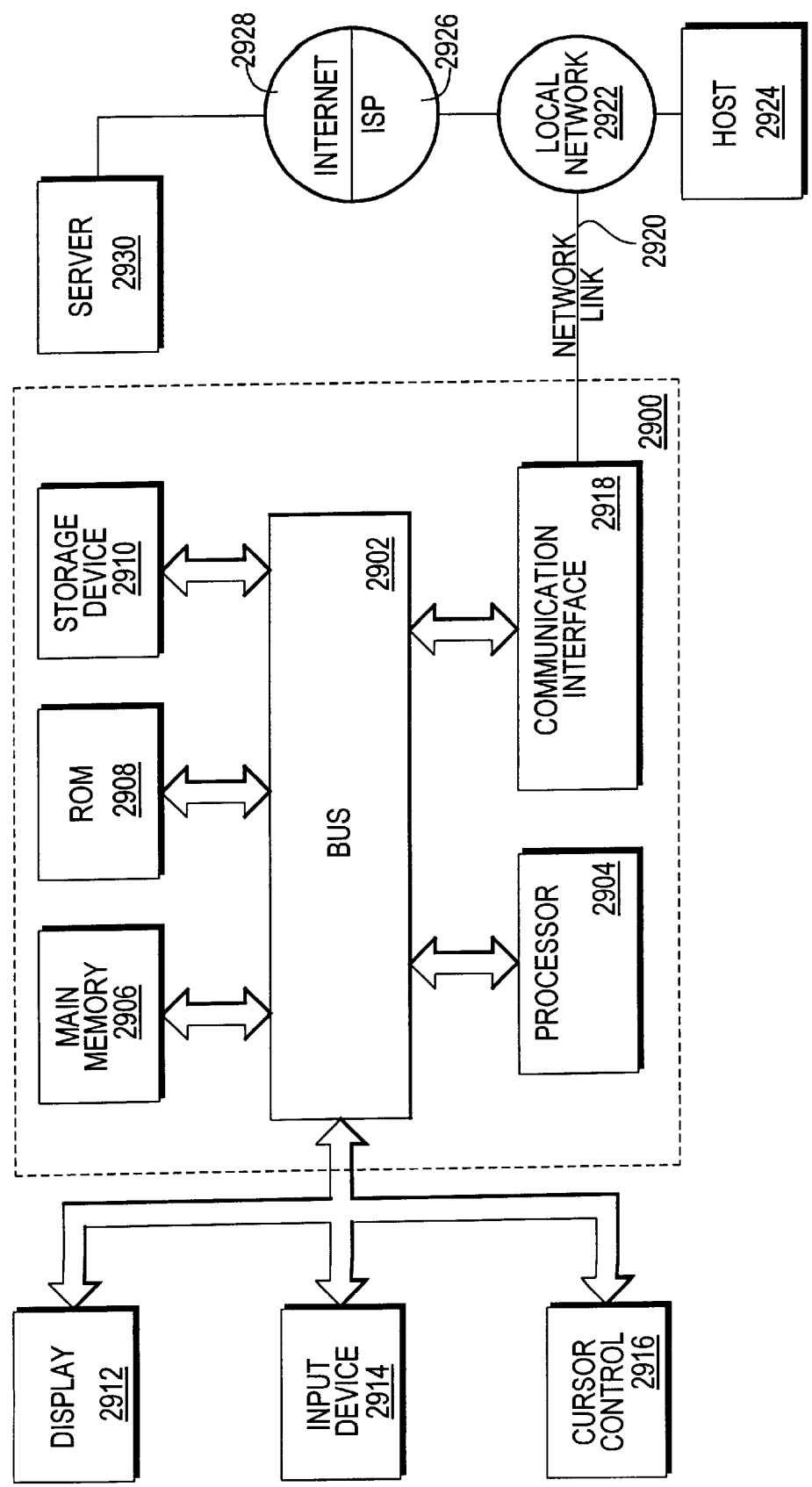

PROTOCOL CONVERSION USING CHANNEL ASSOCIATED SIGNALING

REFERENCE TO PRIOR APPLICATIONS

This application is a continuation-in-part of non-provisional application Ser. No. 08/904,295, filed Jul. 31, 1997, entitled "Universal Protocol Conversion," and is a continuation-in-part of provisional application Ser. No. 60/081,637, filed Apr. 13, 1998, entitled "Protocol Conversion Using Channel Associated Signaling," and is a continuation-in-part of provisional application Ser. No. 60/082,613, filed Apr. 21, 1998, entitled "Protocol Conversion Using Channel Associated Signaling."

FIELD OF THE INVENTION

The present invention generally relates to telephone signaling systems. The invention relates more specifically to interconnection of channel associated signaling systems and common channel signaling systems in a universal protocol converter.

BACKGROUND OF THE INVENTION

A growing global trend is deregulation of telecommunications systems, particularly telephone call switching systems. With deregulation, new common carriers are entering the telephone call switching business. These carriers, as well as established carriers, are seeking to extend their services to new customers, markets, and nations.

However, a difficult problem facing such carriers is interconnecting their equipment with systems available in these new markets and nations. The new customers, markets and nations often use signaling systems and protocols that are different from the protocols that are customary or popular in North America.

In telephony, "signaling" refers to the exchange of call control information between the phone switch and the caller. The purpose of a signaling system is to transfer control information, or signaling units, between elements in a telecommunications system.

Early signaling systems carried the control signals on the same circuit as the user traffic. For example, older in-band signaling systems use this approach. Newer signaling systems, such as Common Channel Signaling System 7 (SS7), use a separate channel for signaling information. These systems are called common channel signaling (CCS) systems because a separate (common) channel is used for signaling. Some call this approach "out of band" signaling and it is preferred to in-band signaling because it is more efficient and robust. For example, out of band signaling offers faster call setup times, more efficient use of voice circuits, support for intelligent network services, and improved control over fraudulent network usage.

Two types of out-of-band signaling exist today. SS7 is a global standard for telecommunications defined by the International Telecommunications Union (ITU). The standard defines the procedures and protocol by which network elements in the public switched telephone network exchange information over a digital signaling network to effect wireless (cellular) and wireline call setup, routing and control. The ITU definition of SS7 allows for national variants such as the ANSI and Bellcore standards used in North America.

SS7 is an example of the first type, physical out-of-band signaling, in which a separate physical channel is used for signaling. SS7 is usually, but not necessarily, deployed as a separate network within the complete telephone network architecture for the purpose of establishing and terminating telephone calls. SS7 messages are exchanged between network elements over bidirectional channels called signaling links.

ISDN is an example of physical in-band, logical out-of-band signaling. In this approach, signaling and user traffic share the same physical transmission medium, but part of the channel capacity is reserved only for signaling traffic. The remainder of the bandwidth is reserved for user traffic, such as the telephone call. ISDN uses the term B channel to describe the user channel, and the term D channel to describe the signaling channel.

Other signaling schemes can be used with T1 and E1 circuits. For example, in some forms of CAS every T1 frame or E1 frame is a voice/bearer/traffic channel in which signaling is carried in "stolen" bits and DTMF tones are transmitted in the voice/bearer/traffic channel.

Further information on such signaling systems is provided in U. Black, "ISDN & SS7: Architectures for Digital Signaling Networks" (Upper Saddle River, N.J.: Prentice Hall PTR, 1997).

Generally, Common Channel Signaling (CCS) is employed to pass signaling information in an SS7 network. However, other methods can be used to pass more information in the T1/E1 frame, such as Channel Associated Signaling (CAS). Channel Associated Signaling uses one bit (called the F bit) per frame to pass special data. Channel Associated Signaling information is included within each voice channel on a digital link. For example, DTMF tones may be passed in-band across the voice channel.

Common Channel Signaling systems and signals are inherently incompatible with Channel Associated Signaling systems and signals. An attempt to connect a call originating from a Common Channel Signaling system to a Channel Associated Signaling system can lead to unpredictable results at either the calling end of the circuit or the called end of the circuit.

Based on the foregoing, there is a clear need in the field to resolve interworking issues between networks using Channel Associated Signaling (CAS) and Common Channel Signaling (CCS) systems.

In particular, there is a need for a system that can carry out conversion of signals in the CAS protocol to signals using a CCS protocol.

There is also a need for a system that can manage a large number of Channel Associated Signaling ports, and that can be expanded to accommodate an ever-increasing number of ports.

SUMMARY OF THE INVENTION

The foregoing needs, and other needs and objectives that will become apparent from the following description, are fulfilled in the present invention, which comprises, in one aspect, a method of communicating signaling call control information between a first signaling system that uses a common channel signaling (CCS) protocol and a second signaling system that uses a channel associated signaling (CAS) protocol, in which the CCS protocol is incompatible with the CAS protocol, the method comprising the steps of receiving, at a protocol conversion system logically located between the first signaling system and the second signaling system, a first message from the first signaling system that conforms to the CCS protocol; converting the first message to one or more second messages that conform to the CAS protocol; and communicating the one or more second messages to the second signaling system; whereby a voice conversation is established between the first signaling system and the second signaling system.

The method features receiving, at the protocol conversion system, a third message from the second signaling system that conforms to the CAS protocol; converting the third message to one or more fourth messages that conform to CCS protocol; and communicating the one or more fourth messages to the first signaling system. The method also features receiving, at the protocol conversion system, an initial address message from the first signaling system; determining, based on the initial address message, to send a seizure request message; and communicating the seizure request message to the second signaling system.

According to one feature, the method further comprises the steps of sending, from the protocol conversion system to the second signaling system, a plurality of voiceband tones that represent digits of a call progress message. In another feature, the method further comprises the steps of communicating a message from the second signaling system to the protocol conversion system indicating that transmission of the voiceband tones is complete; and communicating a call progress message from the protocol conversion system to the first signaling system.

Yet another feature involves the steps of receiving, at the protocol conversion system, an answer signal from the second signaling system; determining, based on the answer signal, to send an answer message; and sending an answer message from the protocol conversion system to the first signaling system. A related feature involves the steps of receiving, at the protocol conversion system, a release signal from the first signaling system; determining, based on the release signal, to send a clear forward signal; and sending the clear forward signal to the second signaling system.

Another feature involves receiving, at a CAS interface system coupled logically between the first signaling system and the second signaling system, a first message from the first signaling system that conforms to the CCS protocol. Still another feature relates to receiving, at a trunk service unit coupled logically between the first signaling system and the second signaling system, a first message from the first signaling system that conforms to the CCS protocol. A related feature is receiving the first message from the first signaling system at the trunk service unit under control of a processor that can cause the trunk service unit to insert or drop CCS protocol signals in frames of channels on trunks of the first signaling system.

Yet another feature involves converting the first message to one or more second messages that conform to CAS protocol using a state machine executing in the protocol conversion system. A related feature is executing a message definition language in the state machine of the protocol conversion system, in which the message definition language is configured to convert CCS messages to CAS messages and to convert CAS messages to CCS messages. The invention is equally applicable to calls originating from a CAS network and terminating in a CCS network, and to calls originating from a CCS network and terminating in a CAS network.

The invention also encompasses a computer data signal in the form of a carrier wave that carries instructions configured according to the foregoing steps and features. The invention also involves an apparatus for carrying out the foregoing steps, as described below.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9A is a diagram illustrating data elements typically contained in a Call Context record for each Call Instance;

FIG. 9C and FIG. 9D are schematic diagrams of selected parts of a plurality of depicted Call Instances to which the exemplary inter-working rule depicted in FIG. 9B would apply;

FIG. 29 is a block diagram of an exemplary computer system with which elements of the system of FIG. 24 may be implemented.

DETAILED DESCRIPTION OF THE PREFERRED EMBODIMENT

Figure 1:
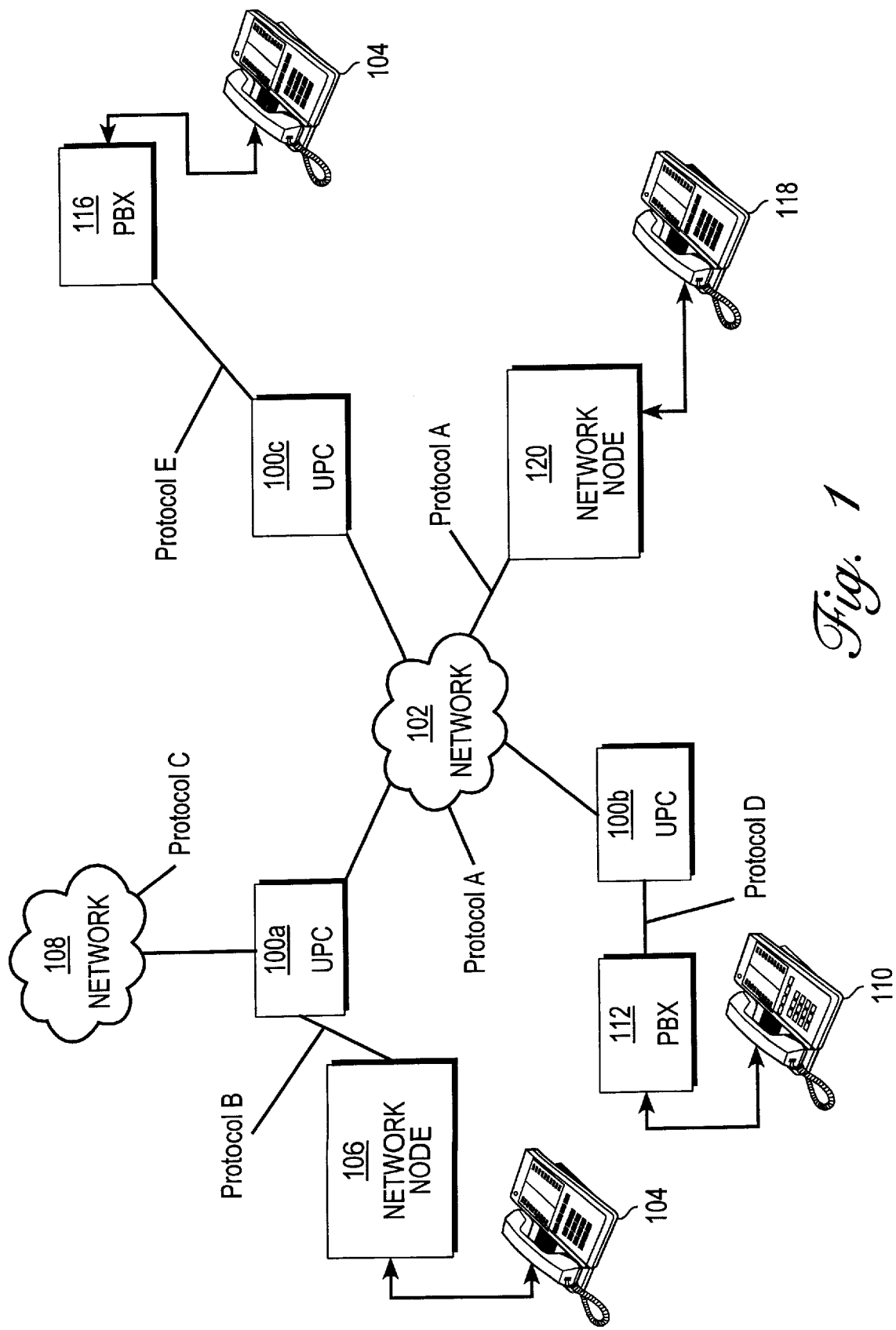
FIG. 1 is a schematic block diagram depicting an overview of the application of a Universal Protocol Converter in accordance with the present invention.

With reference now to the figures, wherein like elements are represented by like numerals throughout the several views, the basic concept of the present invention will be described. An important aspect of the present invention is to translate between heterogeneous signaling systems to provide fast, accurate connections in a reliable telephony service. Referring to FIG. 1, there is depicted an example of a communications topology illustrating some of the applications of a Universal Protocol Converter 100, according to the present invention, to support several different communications needs. Universal Protocol Converter 100 is hereinafter sometimes abbreviated as "UPC" and is further identified in FIG. 1 by a "100" along with a lower case letter to distinguish between the same UPC component that is located in a different configuration. At the center of the figure is a communications Network 102 that includes a plurality of network infrastructure comprised of switches, transmission equipment, and customer premises equipment and which for this example uses a first protocol that is designed Protocol A. A first subscriber or user 104 is connected to a first UPC, 100a, through a Network Node 106 which supports a second protocol that is designated Protocol B. A second Network 108, which includes a plurality of network infrastructure comprised of switches, transmission equipment, and customer premises equipment, supports a third protocol that is designated Protocol C. UPC 100a, as depicted, supports communication among any of its subtending elements (comprised of Network 108, Network Node 106, and Subscriber 104) and Network 102. When used in conjunction with a second UPC, denoted 100b, UPC 100a supports communication among any of its subtending element through Network 102 with a second User 110 served by a Private Branch Exchange (hereinafter referred to as "PBX") 112 to which it is connected and that supports a fourth protocol that is designated as Protocol D. When used in conjunction with another UPC 100c, to which they are interconnected by Network 102, UPC 100a and UPC 100b support communication among their subtending elements and a Subscriber 114, served by a PBX 116 to which it is connected and that supports a fifth protocol that is designated Protocol E. Intercommunication through Network 102 provides similar support for communications among subtending elements of itself, UPC 100a, UPC 100b, and UPC 100c with a Subscriber 118 that is connected to an served by a Network Node 120. Network Node 120 supports Protocol A and therefore no UPC is needed to communicate with Network 102 or other elements in the illustrated topology. In general, FIG. 1 illustrates multiple configurations in which the present invention facilitates communications among network elements that use different protocols.

Figure 2:
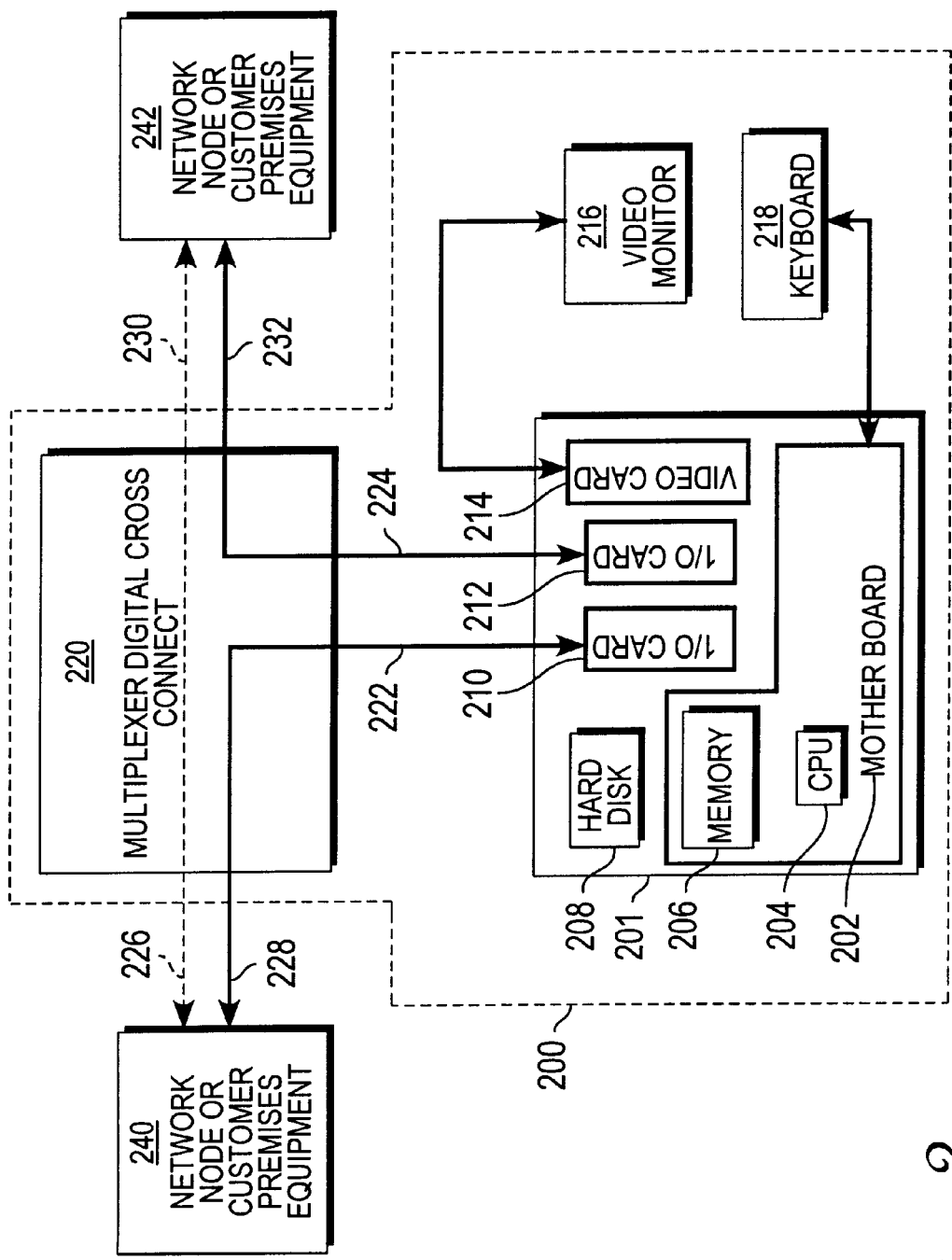
FIG. 2 is a schematic block diagram of one embodiment of the hardware utilized in the present invention.

Referring now to FIG. 2, there is depicted a particular configuration of hardware 200 in accordance with the present invention, that is one implementation of many different configurations. Hardware 200 includes a Computer 201, which serves as the host for the application software in accordance with the present invention. Hardware 200 is comprised of a motherboard 202 on which a Central Processing Unit ("P\CPU") 204 and a Random Access Memory ("RAM") 206 are located, and which is equipped with a Hard Disk 208 and slots for interconnection with Input/Output ("I/O") Cards 210 and 212. Such application software is resident on Hard Disk 208, and upon initialization of Computer 201 appropriate elements of the application software, along with configuration information and other data references used by the application software, are loaded into RAM 206. A video Monitor 216, connected to a Video Card 214, and a keyboard 218, of Computer 201, permit operator interaction wit the application software.

Functionality with the present invention is achieved through interception of the control signaling messages and data associated with a telecommunications network, storage of such control signaling messages and data in an internal format, manipulation of such control signaling messages and data according to inter-working rules applicable to the specific protocols supported, and transmission of such resulting control signaling messages and data to the destination.

In FIG. 2, the hardware 200 of the present invention also includes a conventional Multiplexor/Digital Cross Connect ("MUX") 220 connected to computer 201 with digital circuits that include control channels 222 and 224. For simplification, only one bearer channel 226 and only one control channel 228 are depicted to connect MUX 220 to a network node or customer premises equipment 204, and only one bearer channel 230 and only one control channel 232 are depicted to connect MUX 220 to a Network Node or customer premises equipment 242, respectively.

Those skilled in the art recognize that digital facilities used in communications networks general conform to an accredited standard and are comprised of a plurality of bearer channels and typically one control channel, all of which are Time Division Multiplexed onto a single physical circuit. The role of the MUX 220 then is to receive the incoming circuits from Network Elements 240 and 242 and groom off the control channels to be passed in an individual time slot of a digital circuit (for example either ANSIT1 or ETSIE1 standard form), to the I/O Cards 210 and 212 of the host computer 201. Such grooming is represented by control channel 222 as the carrier of information from control channel 228, and control channel 224 as the carrier of information for control channel 232. In the associated discussion regarding FIG. 5, that follows, an example involving multiple bearer channels and control channel is provided.

An exemplary complement of hardware that will support the illustrated embodiment of the present invention would include: a Sun™ ULTRA SPARC™ computer, equipped with one (or more) 167 Mhz (or higher) CPUs, 128 Megabytes (or more) of RAM, two 4 Gigabyte Hard Disks; two Newbridge Sprite ™ E1 I/O Cards, a Monitor and Keyboard; and one Newbridge Main Street™ Multiplexor.

Figure 3:
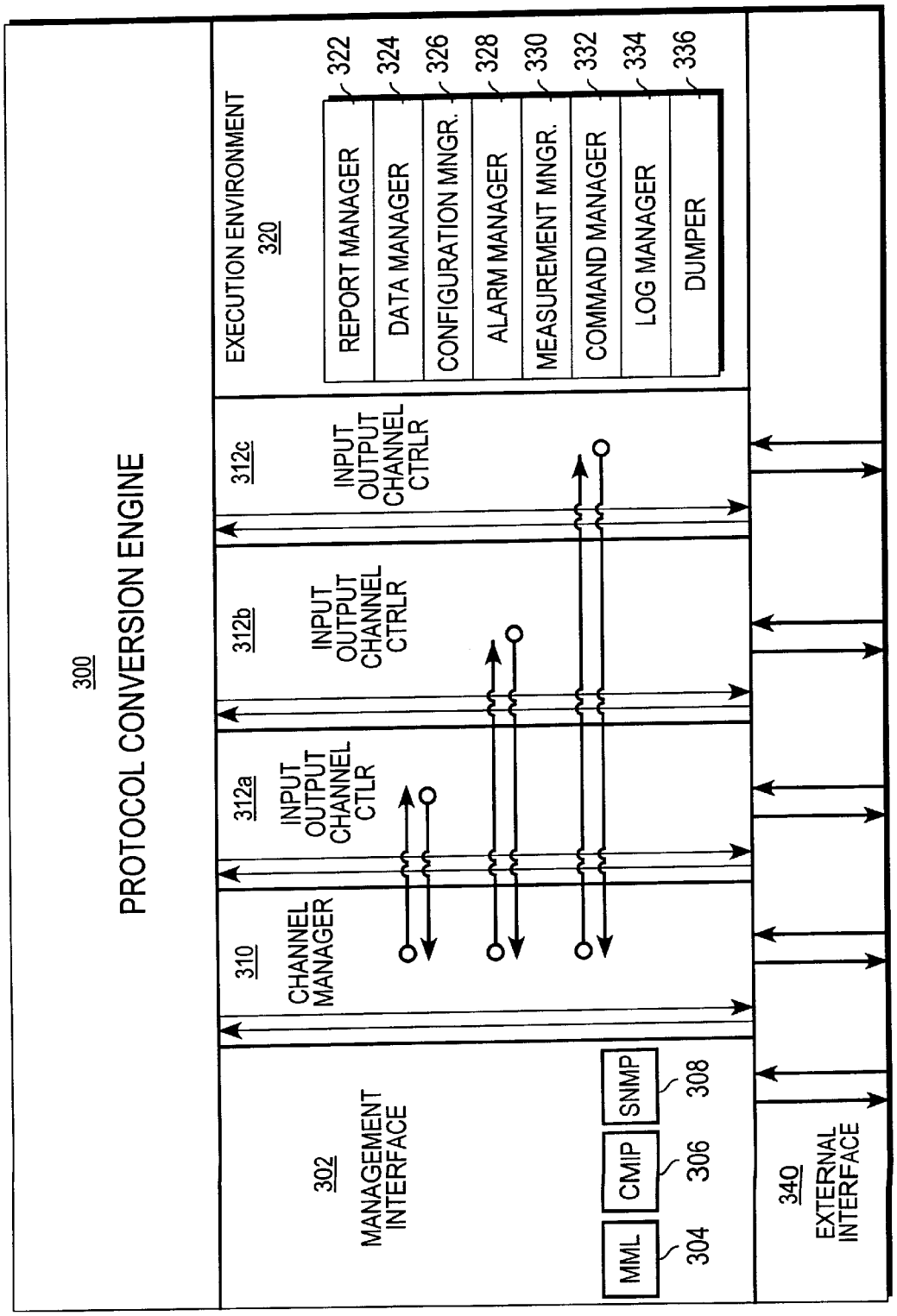
FIG. 3 is a schematic block diagram of the architecture of one embodiment of the software in the present invention.

Referring to FIG. 3 wherein a schematic diagram of the architecture of the present invention is presented, the UPC 100 is comprised of four major software architectural elements—a Protocol Conversion Engine 300, a Management Interface 302, a Channel Manager 301 (and its associated I/O Channel Controllers 312), and an Execution Environment 320. The management Interface 302 and the I/O Channel Controllers 312 communicate with external systems and interconnected Network Nodes and/or Customer Premises Equipment through an External Interface 340.

The Protocol Conversion Engine 300 is a central part of the present invention, within which the actual inter-working of signaling message occurs. The Execution Environment 320 functions as the Software Framework within which the Protocol Conversion Engine 300 operates. A Report Manager 322 provides for the communication of reports through the man-machine interface. A Data Manager 324 provides for management of the databases required for operation. A configuration Manager 326 addresses the configuration needs of the Host Computer as well as the application software. An Alarm Manager 328 provides for the registration of and tracking and reporting alarm conditions generated by hardware and software. A Measurement Manager 330 provides for the capture of statistics concerning the operation of the system, in the context of the present invention, and calls processed. A command Manager 332 supports the Management Interface 302 that permits interaction with the functionality of the applications software. A Log Manager 334 provides the services for logging of activities and messages within the applications software. A Dumper 336 is a multi-purpose utility that collects statistical information, information about call related data and other data about certain key hardware and software events and prepares them for processing by an operating system (e.g. Unix) and other external applications.

The Channel Manager 310 is responsible for coordination of the communications between the Protocol Conversion Engine 300 and the individual I/O Channel Controllers 312 that provide communication with the interconnected Network Nodes, Customer Premises Equipment, and/or External Applications systems. The Management Interface 302 provides the mechanism for operator interaction with the UPC 100 as would be required for configuration data entry or modification, alarm acknowledgment or response, and network element management functions traditionally associated with communications network elements. Depicted in FIG. 3 are three principal management interfaces, that include a Man Machine Language ("MML") 304—an interactive interface generally conforming with the provisions of ITU Recommendation Z300; a Common Management Interface Protocol ("CMIP") 306—a protocol interface generally conforming with the provisions of ITU Recommendation X.720; and a simple Network Management Protocol ("SNMP") 308 a protocol generally conforming with the provisions of RFC-1157 of the Internet Engineering Task Force.

Figure 4:
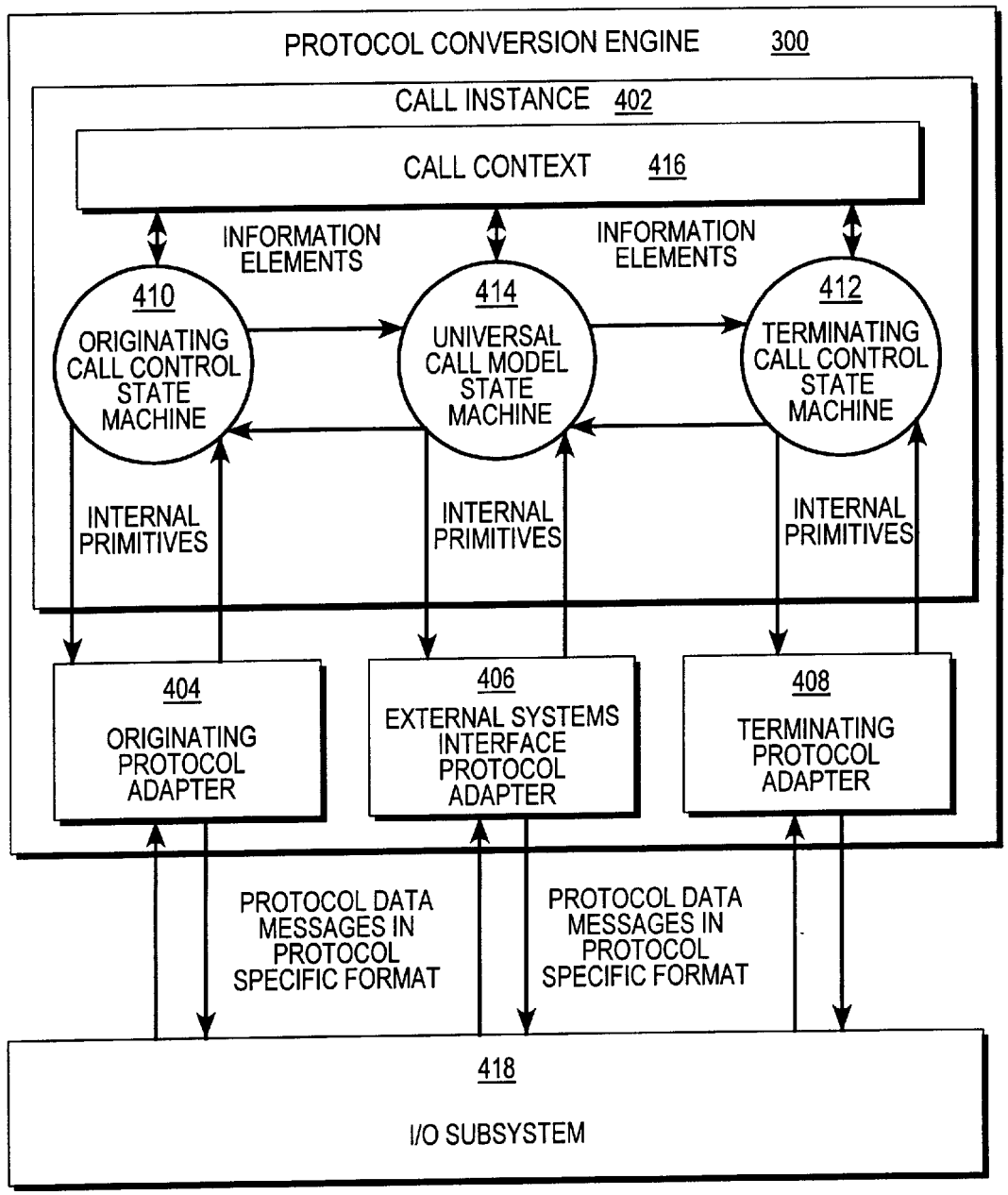
FIG. 4 is a high level schematic diagram depicting a logical view of the elements of the Universal Protocol Converter in accordance with the present invention.

Referring now to FIG. 4, a diagram of the Protocol Conversion Engine 300 is schematically depicted. Comprised of a Call Instance 402 and a plurality of Protocol Adapters 404, 406, and 408, Protocol Conversion Engine 300 interfaces with external equipment, and therefore with interconnected networks and network elements, through a conventional I/O (Input/Output) Subsystem 418. It should be noted that Protocol Adapter 406 is a special form of protocol Adapter, and unlike Protocol Adapters 404 and 408, it supports the interconnection of external systems that may be involved in real time call control (such as Transaction Control Application Part—TCAP—communications with a C7 network Service Control Point—SCP) as well as those that may not be involved in real time call control (such as use of proprietary protocol in communicating with a Fraud Control System). Protocol Adapters 404 and 408 are the mechanism by which calls are instantiated, and responsible for maintaining the environment in which the Call Instance 402 executes. External Systems Interface Protocol Adapter 406, operating in a manner similar to Protocol Adapters 404 and 408, provides a means for communicating to external systems and/or entities. In addition, Protocol Adapter 404 acts as the mechanism that provides an interface between the Originating Call Control ("OCC") 410 and the I/O Subsystem 418 and similarly, Protocol Adapter 408 act as the mechanism that provides an interface between the Terminating Call Control ("TCC") 412 and the I/O Subsystem 418. Call Instance 402 is comprised of three functional state machines—two Call Control State Machines, one designated for an originating call control OCC 410, one designated for a terminating call control TCC 412; and one designated as a Universal Call Model State Machine ("UCM") 414. Call Control State Machines 410 and 412, working in conjunction with Protocol Adapters 404 and 408, respectively convert signaling messages received from originating and terminating networks through I/O subsystem 418 to non protocol-specific Internal Primitives.

Internal Primitives are the events that are passed among a call control state machine (i.e. Originating Call Control 410 or Terminating Call Control 412), the Universal Call Model state Machine 414, the originating or terminating protocol adapter 404 and 408, and the External Systems Interface Protocol Adapter 406, respectively. An event in this context is a stimulus delivered to or from a state machine that may dictate a particular action, an example of which is a signal sent in response to a timer expiring. Internal Primitives are defined depending on how the protocol control is implemented, and are vehicles for carrying signaling information data and/or signals.

In the exemplary model depicted, Call Instance 402 is servicing a call that is originating from one network element operating with a first protocol and terminating on another network element operating with a different protocol. Using a process and information obtained as more fully described below with respect to FIGS. 7, 8A, and 8B, Protocol Adapters 404 and 408 respectively take the signaling message coming from or going to the originating party and take the signaling messages coming from or going to the terminating party and parse and assemble the signaling messages.

Call Instance 402 also includes a reserved portion of memory which is called Call Context 416. Call Context 416 is a collection of data elements that describe the contents of the messages passed through protocol Conversion Engine 300. The description is in a physical representation-independent, protocol-independent form. For each active call, there is exactly one instance of Call Context 416. The data elements of Call Context 416 are accessible to both OCC 410 and TCC 412, as well as protocol independent UCM 414 for the duration of the call. Together with the current state of the call, Call Context 416 completely specifies the state of the call, os that both OCC 410 and TCC 412 have all information that is needed and such that they communicate with UCM 414, rather than directly with each other.

State machines 410, 412 and 414 are comprised of states, primitives, alternatives, decisions, saves, and procedures. In addition to addressing the states of a call, the present invention addresses signaling messages within a call, that are defined as data structures that contain information passed between two connection points. Although each base protocol uses a different way of specifying the structures of its messages, in all protocols a message is comprised of header information and a series of discrete information elements. In particular UCM 414 is comprised of header information and a series of discrete information elements. In particular UCM 414 is comprised of states, primitives, alternatives, decisions, saves, and procedures that are invoked in response to Internal Primitives sent by OCC 410 and TCC 412 in such a way that a Call Instance 402 is processed in a protocol independent fashion. In this fashion, UCM 414 acts as an intermediary between OCC 410 and TCC 412 by utilizing its knowledge of all possible Internal Primitives it may get from OCC 410 and/or TCC 412, for which UCM 414 might have to send to the opposite side or to respond to the side of the call sending the Internal Primitive. Specifically, in the case of receiving an Internal Primitive from OCC 410, the UCM 414 determines the Internal Primitive that must be sent to TCC 412; and where applicable, sent to OCC 410 as may be required in the case where OCC 410 needs to know the state of the call. Internal Primitives may contain state signals and Information Elements and, therefore, in fulfilling the role described, UCM 414 may perform manipulation of certain data elements within the Internal Primitives and such manipulation is accomplished via population of Call Context 416 and/or extraction from Call Content 416 of Information Elements. As one skilled in the art will recognize, there is not necessarily a one-to-one correspondence between the Information Elements and/or states of one protocol versus those of another and therefore, another function of UCM 414 is to recognize the need for and provide for the population of Call Context 416 with required default or other required values.

It should be noted that, for purposes of clarity in description of the functionality, Call Control State Machines 410 and 412 and Protocol Adapters 404 and 408 have been provided with function labels "Originating" (including "OCC") and "Terminating" (including "TCC"). The association of "Originating" or "Terminating" functionality with any element is only applicable for the duration of a single call. Protocol Adapter 404 and Call Control State Machine 410 may provide "Originating" functionality in one call, and "Terminating" functionality in another. Similarly, Protocol Adapter 408 and Call Control State Machine 412 may provide "Originating" functionality in one call, and "Terminating" functionality in another.

Figure 5:
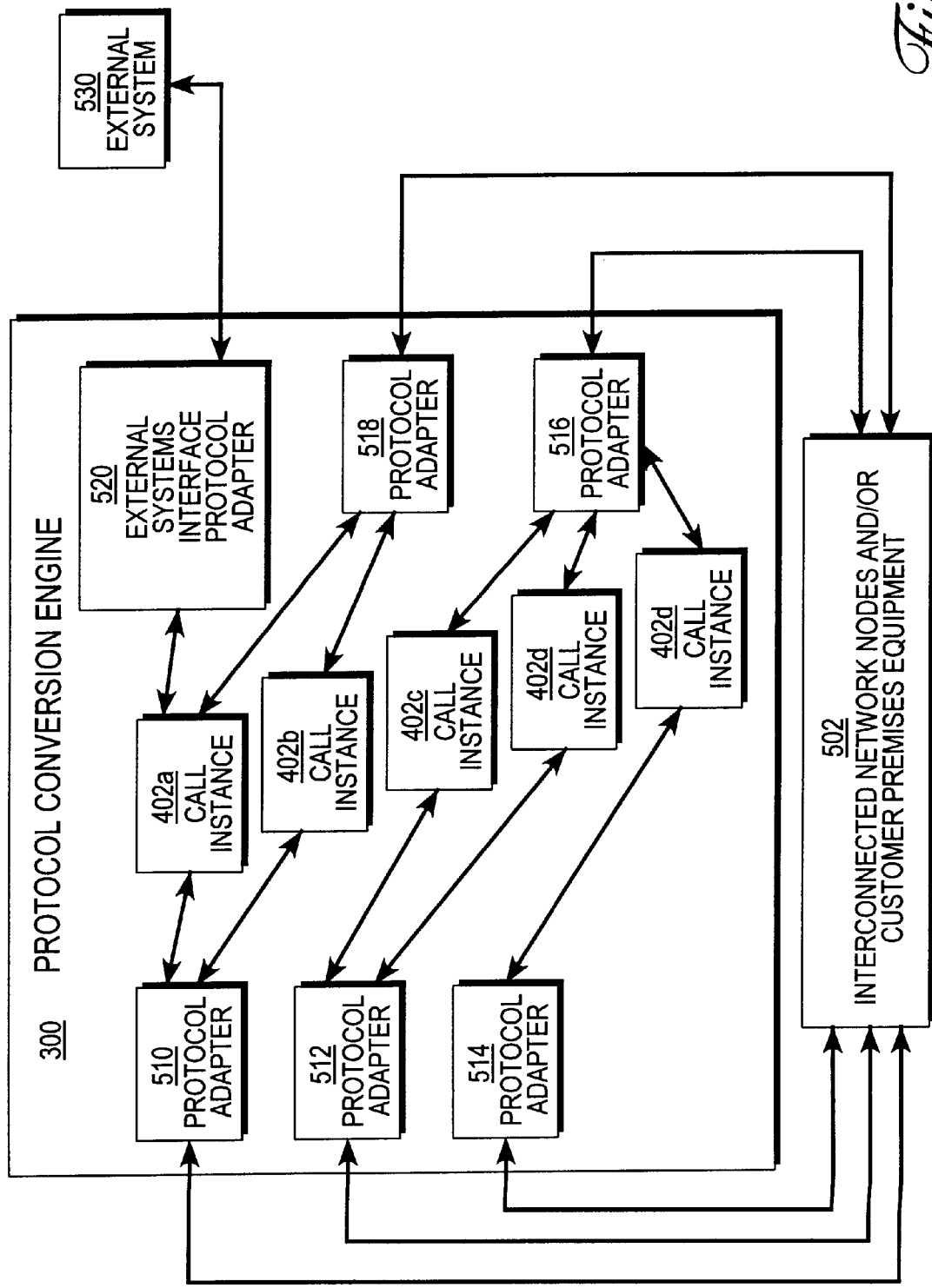
FIG. 5 is schematic diagram illustrating the application of the logical elements depicted in FIG. 4 in the simultaneous processing of a plurality of calls.

Referring now to FIG. 5, wherein an exemplary depiction of the Protocol Conversion Engine 300 is presented, and within which five individual Call Instances 402a, 402b, 402c, 402d, and 402e are illustrated. Each Call Instance, created by the origination of a call from within the Interconnected Network Nodes and/or Customer Premises Equipment 502, is depicted as associated with one of five Protocol Adapters 510, 512, 514, 516 and 518, each of which supports a unique protocol or protocol family (comprised of a group of protocols which differ only by minor variance). In addition, an External Systems Interface Protocol Adapters 520 is shown supporting an External System 530 in conjunction with the requirements of Call Instance 402a. The exemplary depiction of this singular association is not a limitation of the present invention in which plurality of call instance may be associated with the External Systems Interface Protocol Adapter 520. Within this exemplary depiction Protocol Adapters 510, 512, 516, and 518 are shown as supporting multiple Call Instances 402a, 402b, 402c, 402d, while Protocol Adapter 514 is shown as supporting only one Call Instance 402e. However, as it would be appreciated by those skilled in the art, the limitations depicted in FIG. 5 of a particular Protocol Adapter being connected to one or two Call Instances, are for the purpose only of display and are not a limitation that exists within the present invention that permits any Protocol Adapter to support one or many Call Instances.

Figure 6:
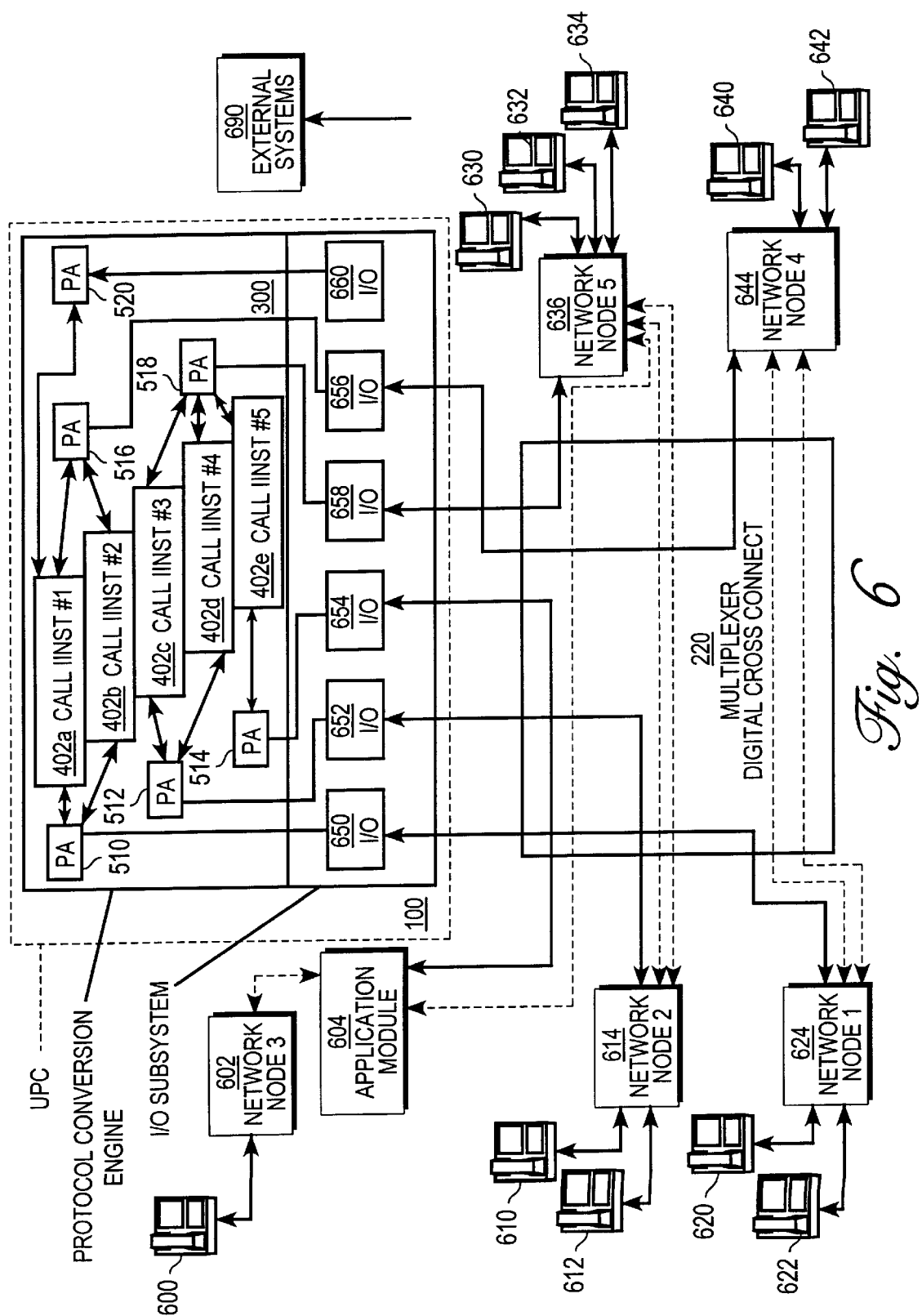
FIG. 6 is an exemplary schematic diagram illustrating an implementation of the logical elements of the present invention depicted in FIG. 5 in conjunction with other network elements.

Referring now to FIG. 6 there is a schematic depiction of one possible network topology that would correspond to the example of multiple call instances as described in FIG. 5. In this exemplary topology, UPC 100, comprised of Protocol Conversion Engine 300 and I/O subsystem 418), is configured to support five different telecommunications protocols as required by five heterogenous Network Nodes 602, 614, 624, 636, and 644, to which a plurality of subscribers 600, 610, 612, 620, 622, 630, 632, 634, 640, and 642 are connected, and one External System 690. Protocol Adapters, a plurality of which are shown in FIG. 6 and abbreviated "PA" at 510, 512, 514, 516, and 518, provide support for each of their particular protocols. External Systems Interface Protocol Adapter 520 provides support for the requirements of External System 690 and communicates with External System 690 through and I/O Card 660.

More specifically, UPC 100 has been configured to support conversion between the protocols used by a Network Nodes 5 636; a Network Node 3 602 and Network Node 5 636. It should be noted that this is only one of many possible topologies, and it should not be inferred that there is any limitation in the mapping of one protocol to another.

For example, a Subscriber 600 is served by Network Node 3 602 that uses a Channel Associated Signaling ("CAS") protocol. A CAS Application Module 604 is connected to Network Node 3 602 and facilitates conversion between a conventional Channel Associated Signaling protocol and a conventional Common Channel Signaling protocol. CAS Application Module 604 functions by decoding the in-band tones and creating control messages that represent the tones and placing such control messages on a separate control channel. Similarly, control messages received on the separate control channel are converted to tones that are injected into the bearer channel. It should be noted that circuits using CAS may be either analog or digital, and therefore the "tones" would be either analog tones or the digital representation of such tones, according to the specific type of facility. Thus the bearer channel output from 602 is split into a bearer channel (shown in dashed lines) and a control channel (shown in solid lines) as it leaves the CAS Application Module 604. While the bearer channel passes through the MUX 220, the control channel is groomed into an I/O Card 654 and then passes to a PA 514. From there the control channel passes to Call Instance 5 402*e* and thence to PA 518, to and I/O Card 658, and finally to Network Node 5 636 where is directed to any of Subscribers 630, 632 or 634 according to the dialed digits. While for purposes of describing this example call, the traditional convention of moving from left to right on the diagram has been used, the present invention has no such limitations and is fully bi-directional. Therefore, any of Subscribers 630, 632 or 634 could have originated the call to Subscriber 600, in which cases the call processing would follow the previously described path, in reverse.

It should be further noted that for the purposes of clarity FIG. 6 depicts a plurality of additional separate I/O Cards 650, 652, and 656. Subject to the capabilities of the specific I/O Card used in an embodiment there is no limitation or requirement in the present invention that there be a one-to-one relationship between the number of supported protocols, and the number of I/O cards. In fact, one of the functions provided by MUX 220 is to allow the aggregation of control channels from a number of circuits into time-slots of a single circuit. Thus, in the example of FIG. 6, it would be possible to substitute a single I/O Card one or more of I/O cards 650, 652, 654, 656, and 658, by simply using a different timeslot within the digital circuit that connects MUX 220 with the UPC 100. For reasons of redundancy most communications carriers would, however, use at least two I/O cards, and would balance the load between them.

A limitation of the exemplary embodiment depicted in FIG. 6 is the fixed correlation between protocols for which inter-working conversion is supported. This fixed correlation is the consequence of the "pass through" in the MUX 220 of the Bearer Channels between Network Nodes. An alternative embodiment that would not be subject to such limitation may be created by replacing MUX 220 with a switching device under control of the UPC 100. One method for effecting such control would be through use of the External Systems Interface 660. A second alternative embodiment that would not be subject to such limitation may be crated by replacing MUX 220 with a Dynamically Reconfigurable Digital Cross Connect system that is capable of having its mapping dynamically changed by remote control, and effecting such remote control, for example, through use of the External Systems Interface 660 of the UPC 100. To depict these alternative embodiments, MUX 220 would simply be replaced by a symbol or an object representing an appropriate, conventional switch; or, in the case of the other alternate embodiment, to show control line connections between External System 690 and a symbol or object representing the remote controllable digital cross connect that replaes the MUX 220. As those skilled in the art will recognize, the facilities carrying bearer channels in Non Facility Associated Signaling ("NFAS") networks-such as ETSI C7 and ANSISS7—are often separate from the facilities containing the control channels. In the previously described preferred embodiment and two alternatives presented, the NFAS bearer channels would not necessarily have to pass through MUX 220; however, the NFAS signaling channels would, allowing the present invention to support NFAS protocols Referring now to FIG. 7, a high level illustration of the present invention has been depicted using the Data Store and Process Flow conventions of the Yourdon-DeMarco Software Engineering methodology. For this reason the call-out numbers used in this diagram do not repeat previously assigned call-out numbers for items with the same name. Data stores, indicated by the dual horizontal black bars, are comprised of information that exists in a plurality of files stored within an appropriate medium or media—e.g. hard disk, or random access memory. In the present invention, the Channel Detail Data Store 702 (depicted within this FIG. in two places for purposes of clarity) is comprised of configuration information about the communications facilities that are connected through the Network Interface 700 to the present invention. Such configuration information includes the logical identification of channels from the interconnected Network Node or Customer Premises Equipment, and identification of time slots used in the physical facilities connecting MUX 220 and the UPC 100.

As was illustrated in FIG. 2, FIG. 5 and FIG. 6 each originating bearer channel has a corresponding mate. This is because the exemplary embodiment of the present invention does not interrupt the flow of the bearer channel. In the previously mentioned alternate embodiments the mapping between originating and terminating barer channels, and therefore the mapping of the required protocol conversion, is accomplished by Channel Detail Data Store 702 containing information that mapped groups of channels. The Protocol Definition Data Store 704 (depicted within this FIG. in two places for the purposes of clarity) is comprised of information about the communications protocols to be supported by the specific embodiment of the present invention. Protocol Definition Data Store 704 is a library of information about the communications protocols, and includes Message Definitions ("MD"), State Machine Definitions ("SMD"), Call Context Population Rules ("CCP'R"), and Call Context Extraction Rules ("CCER"). Message Definitions are the collection of information about messages including format, content, and coding as would be required for a software process to receive, analyze, and reconstruct messages, or a state machine to recognize and respond to signals. State Machine Definition are the collection of information that describe all possible states of the process flow of operation among such states that are required to instantiate and operate a state machine. Call Context Population Rules are the collection of rules relative to formatting and placing Information Elements in Call Context 416. Call Context Extraction Rules are the collection of rules relative to extracting Information Elements from Call Context 416. The UCM Definition Data Store 706 contains information necessary to instantiate logical instances of calls, including Call Context Definitions (i.e. the templates for creation of Call Context 708 data), State Machine Definitions for the Universal Call Model 716, and Inter-working Rules ("IWR"). Inter-working rules define specific logic that is used to process Internal Primitives flowing between Call Control State Machines 714 or 718 and the Universal Call Model State Machine 716.

An advantage of the present invention is the requirement that the author of a rule or rules need only be knowledgeable of the relationship between a single communications protocol and the universal protocol represented in the Universal Call Model 716. The consequence of such advantage is that new protocols can be added individually, and at different times as required. Call Context Data Store 708 is unlike the other, permanent reference Data Stores depicted in this figure, as it represents a temporary Data Store. This temporary Data Store contains the information required by the various state machines in processing of a single instance of a call. The Call Context Data Store 708 only exists for the duration of the associated call instance. In the preferred embodiment of the present invention, Data Stores 702, 704, and 706 reside in an appropriate storage medium or media. In a preferred embodiment of the present invention, such information is copied to random access memory at time initialization so as to enable rapid use by the software.

Figure 7:
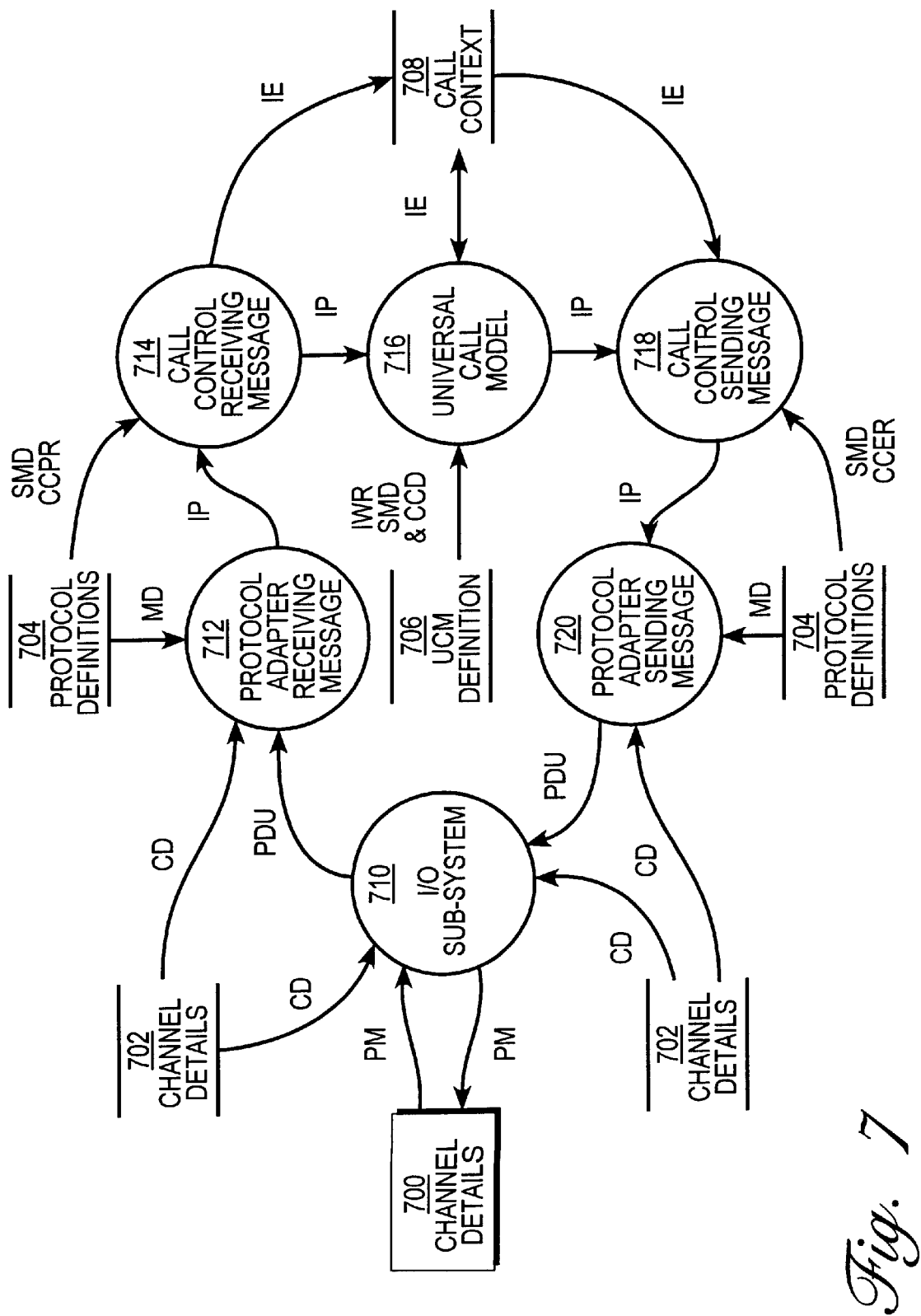
FIG. 7 is a schematic process diagram illustrating the relationship among the elements of the Universal Protocol Converter, in accordance with the present invention, in terms of the exchange of Protocol Data Units ("PDU"), Internal Primitives ("IP"), Information Elements ("IE"), State Machine Definitions ("SMD"), Call Context Definitions ("CCD"), and other processing rules that are exchanged by said elements.

Unlike previous figures that specifically identify an "originating" and a "terminating" element, FIG. 7 recognizes the inherent bi-directional nature of communication control. Therefore, the protocol adapter processes, depicted within circles, are labeled as Protocol Adapter Receiving Message 712 and Protocol Adapter Sending Message 720, respectively. In the same manner, the processes comprising the Call Control State Machines 714 and 718, are labeled as all Control Receiving Message and Call Control Sending Message, respectively.

The process flow of the handling of a new call by the present invention is traced by starting at the Network Interface 700 which represents the point of interconnection with the present invention provided by the I/O Cards, are previously described. An incoming Protocol Specific Message (designated by the PM on the interconnecting arrow) is received at 700 and passed to the I/O Sub-system 710. Using Configuration Data 9 as denoted by the CD on interconnecting arrows) from the Channel Detail Data Store 702, the I/O Sub-system transforms the Protocol Specific Message into Protocol Data Units (denoted as "PDU" on the interconnecting arrows) that are sent to the Protocol Adapter Receiving Message 712. Using Configuration Data (CD) from Channel Detail Data Store 702 to identify the incoming protocol, the mate of the incoming channel, and the protocol of the outgoing channel, and Message Definition information (designated by the MD on the interconnecting arrows) from the Protocol Definition Data Store 704, the Receiving Protocol Adapter instantiates a new Call Instance. As depicted in 402 of FIG. 4, the new Call instance is comprised of three state machines 714, 716, and 718 and a Call Context 708. At the time of this instantiation, Call Control Receiving Message 714 and Call Control Sending Message 718 are provided with State Machine Definitions, Call Context Population Rules, and Call Context Extraction Rules from the Protocol Definition Data Store 704. Protocol Adapter 712 then sends Internal Primitives (designated by the IP on the interconnecting arrows) to a newly instantiated Call Control Receiving Message 714 where, using the Call Context Population Rules, Control Receiving Message 714 formulates Information Elements (designated by IE on the interconnecting arrows) that are written to the associated Call Context 708. Call Control Receiving Message 714 also sends appropriate state signals contained within Internal Primitive (designated by IP on the interconnecting arrows) to UCM 716. UCM 716 makes use of the Inter-working Rules (designated by "IWR" on the interconnecting arrows), State Machine Definitions (designated by SMD on the interconnecting arrows) received from UCM Definition Data Store 706 at the time of Call Instance instantiation, and Information Elements in Call Context 708 to manipulate existing and/or create new Information Elements and write them to Call Context 708. UCM 716 then signals (through an Internal Primitive) Call Control Sending Message 718 which, using Call Context Extraction Rules, extract the Information Elements from Call Context 708 to formulate Internal Primitives for transmission to a Protocol Adapter Sending Message 720. Protocol Adapter Sending Message 720 then uses Configuration Data from the Channel Details Data Store 702 and the received Internal Primitive to send a Protocol Data Unit to the I/O Sub-system 710. I/O Subsystem 710 then sends a Protocol Message to Network Interface 700 associated with the incoming channel.

The same logic is used to process message between the Originating and Terminating network elements. In the preceding example an incoming message from the Originating Network Node was traced, and Call Control Receiving Message 714 corresponds to OCC 410 as referenced in FIG. 4, and Call Control Send Message 718 corresponds to TCC 412 as referenced in FIG. 4. Similarly, Receiving Protocol Adapter 712 corresponds to the Protocol Adapter associated with the Protocol being used by the Originating Network Node, and Protocol Adapter Sending Message 720 corresponds to the Protocol Adapter associated with the Protocol being used by the Terminating Network Node.

For a response message form the Terminating Network Node, the process flow of the example remains valid; however, Call Control Receiving Message 714 corresponds TCC 412 in FIG. 4, and Call Control Sending Message 718 corresponds to OCC 410 in FIG. 4. In addition, Protocol Adapter Receiving Message 712 corresponds to the Protocol Adapter associated with the Protocol being used by the Terminating Network Node, and Protocol Adapter Sending Message 720 corresponds to the Protocol Adapter associated with the Protocol being used by the Originating Network Node.

Figure 8A:
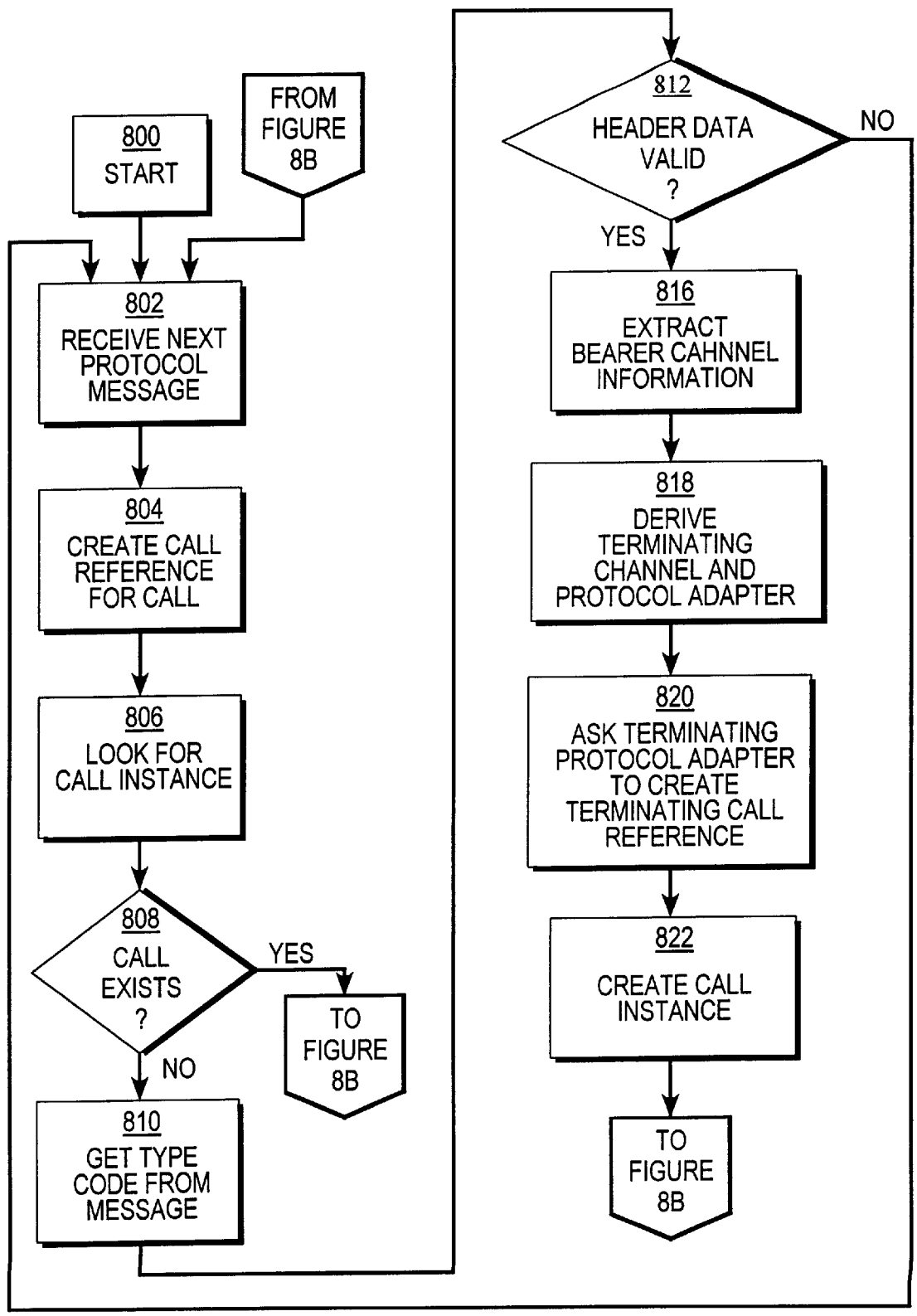
FIG. 8A and FIG. 8B comprise a general flow chart illustrating the process by which a Protocol Adapter performs signaling message translation between external communication and/or application protocols and Internal Primitives specific to the Universal Protocol Converter in accordance with the present invention.
Figure 8B:
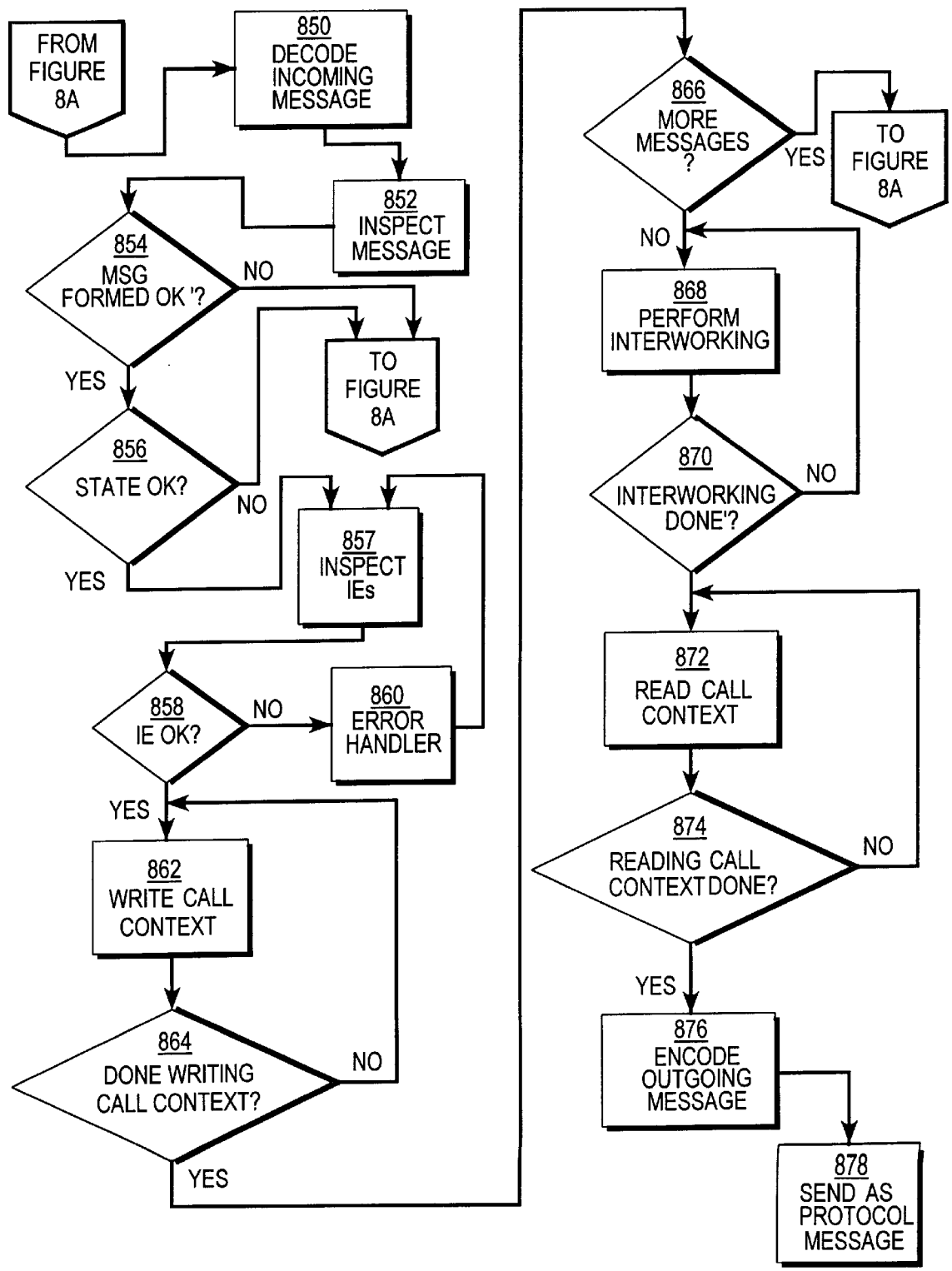

With reference now to FIGS. 8A and 8B, a high level flow chart of the internal process flow of a part of the present invention illustrates the manner in which protocol specific signaling message are received, converted into a generic internal UPC format, processed and manipulated as necessary in the circumstances and converted again to protocol specific signaling messages that are transmitted.

The process depiction begins at a point designated Start 800 where a message is received at the UPC. A protocol specific signaling message is received from the event handler of the present invention, depicted at 802 in the process flow. The program logic then develops an internal call reference identifier 804 from data in the incoming signaling message and attempts to determine if this call reference already exists at 806.

If at a decision point 808 the call is determined to exist, processing proceeds at 850 as described in conjunction with FIG. 8B. If at decision point 808 it is determined that the subject call is not found, this means that this is a new call that must be instantiated. The program logic then proceeds at 810 to inspect the incoming signaling message to ascertain the type of message and at 812 conducts a fundamental check of the message header. If an error is detected, an appropriate error message generated and sent to the originating side of the call and control is returned to 802. If no error is detected, the originating bearer channel identification is extracted at 816. Processing continues at 818 by deriving the originating signaling channel identifier, the termination bearer channel identifier and the terminating signaling channel identifier—and thus the terminating protocol adapter. It should be noted that a "channel identifier", whether signaling or bearer and whether originating or terminating, may be associated with one channel or plurality of associated channels. Subsequently at 820, the program logic asks the termination protocol adapter to create a call reference and insert the new call reference into the internal call map. If the processing occurs normally to this point, a new call is instantiated at 822.

Referring now to FIG. 8B, processing then continues with an incoming Internal Primitive, as described in conjunction with FIG. 7, containing a signaling message, arriving from the originating side of the call to be processed. The message is decoded through program logic 850 that, using the originating side protocol definition from Data Store 704 and cooperation with other internal program logic, decodes the message.

Once the message is decoded at 850 using the Protocol Definition as from the Data Store 704, the message is inspected at 852 to determine whether or not the message is correctly formed, as determined at 854. If not, this means that the message received is an unknown or unintelligible message. As indicated by the off-page connector, processing then proceeds at 802, as depicted in FIG. 8A and in addition, an appropriate error message is generated and sent to the originating side of the call. If the message to be processed is fundamentally sound, a decision is made at 856 to ascertain that the message is acceptable in the state of current processing. If the message is not correct for the current processing state, it is rejected and at 850 an error message for the current state. This message is then sent to the originating side of the call. In addition, as directly by the off-page connector, control is returned to 802 and processing continues as depicted in FIG. 8A.

If the message is determined to be correct for the current state, processing then proceeds by determining if the information elements (or data contained within the message) are correct. Each information element contained in the message is inspected in turn at 857 and as processing proceeds, a determination is made at 858, through program logic that determines whether or not a given information element is understandable. If an information element is determined to be in error, processing proceeds at 860. The individual information element is rejected, an error message constructed that indicates that the information element received is not understandable and the message is sent to the originating side of the call. Processing then proceeds at 857, inspecting the next information element in turn.

If the Information Element is determined to be correct, processing proceeds to 862 where a given Information Element is written into Call Context 416. Processing continues as described at steps 858 through 864 until all information elements are processed in turn and written to Call Context 416. When no more information elements are found in the current message, a determination is then made at 866 as to whether or not additional message are waiting to processed. If additional message are waiting to processed, control is returned to step 802, described in conjunction with FIG. 8A, to handle the next message.

If no more messages are waiting to be processed, processing continues to the inter-working phase at 868. The inter-working phase is comprised of processing and/or manipulation of information elements from the Call Context 416 through the use of program logic that implements the rules that are derived from the knowledge contained in the Protocol Definition data store 704 and the UCM Definition data store 706. Inter-working may be as simple as the copying of one or a plurality of Information Elements from one part of the Call Context 416 structure to another part, or a complicated as performing manipulation of the data according to pre-defined algorithms or formulae. Two illustrative examples of the inter-working phase and the resultant content of selected elements of the Call Context 416 are presented in FIGS. 9B and 9C and are more fully described in the accompanying text. As each inter-working rule us applied, a determination is made at 870 as to whether or not all required inter-working is complete. If it is not complete, the next inter-working rule is applied beginning from 868. It should be noted that any requirement for data manipulation by or obtaining additional information from External Systems 530 would be identified, scheduled and performed during the inter-working phase.

When inter-working is complete, processing continues with elements being read at 872 from Call Context 416. Processing continues as elements required for the outbound message are read in turn and the outbound message is iteratively constructed. As each item is read from Call Context 416, a determination is made at 874 as to whether or not reading necessary data elements from Call Context 416 is complete. If reading is not complete, reading continues at 872. If reading is complete, the outgoing message is encoded at 876 through program logic that reads in the terminating side protocol definition 704 and cooperating with other internal program logic encodes the message from the intelligible internal format to the outgoing protocol-specific raw bit string. An outgoing protocol message is then delivered at 878.

With reference now to FIG. 9A, the Information Elements typically contained in the Call Context 416 of a given call instance 402 are illustrated. It should be noted that these "typical" Information Elements represent a sub-set of the hundreds of Information Elements that are necessary in describing all possible protocols in the UCM 414. Call Context 416a lists the storage areas of the data elements, and Call Context 416b, 416c, 416d, and 416e illustrate four different call instances, thereby showing the real world situation where Protocol Conversion Engine 400 can handle a number of calls at the same time, each call having one and only one Call Instance 402. The data stored in each Call Context 416a for each Call Instance 402 typically includes at least the following Information Elements:

Terminating Bearer Channel Service State 900 indicates the service state of the terminating side bearer channel. This element is used to determine whether or not the bearer channel that is expected to be utilized on the terminating side of the call is available and to ensure that it is not out of service.

Terminating Bearer Channel Identifier 902 is represented as the unique circuit identifier of the terminating side bearer channel.

Originating User/Network Flag 904 indicates whether the originating side of a given call is designated as being either User or Network side. In other words, this allows the determination of whether or not the originating side of the call is communicating with customer premises equipment (user side) or with the network side. A flag in the context of the definitions provide herein is a single character that is used to permit the program logic to make decisions based on a binary choice (e.g. on/off, yes/no, etc.).

Terminating User/Network Flag 906 indicates whether the terminating side of a given call is designated as being either User or Network side. In other words, this allows the determination of whether or not the terminating side of the call is communicating with customer premises equipment (user side) or with the network side.

Originating Call References 908 indicates the originating side call references identifier. This element facilitates the unique identification of the originating side of a given call, unique to all others, within the context of a given UPC, as well as to a particular call instance.

Terminating Call References 910 similarly indicates the terminating side call reference identifier. This element facilitates the unique identification of the terminating side of a given call, unique to all others, within the context of a given UPC, as well as to a particular call instance.

Originating Signaling Channel Identifier 912 allows for the unique identification of the originating side signaling or control channel.

Terminating Signaling Channel Identifier 914 allows for the unique identification of the terminating side signaling or control channel.

Originating Overlap/En-bloc Flag 916 indicates whether the originating side of a given call is capable of sending either a single digit at a time or partial digit string versus a complete string of digits.

Terminating Overlap/En-bloc Flag 918 indicates whether the terminating side of a given call is capable of receiving a single digit at a time or partial digit string versus a complete string of digits.

Originating Min Message Length 920 indicates the minimum message length, in terms of the dialed digits, on the originating side of a given call. In other words, what is the minimum number of digits dialed for a valid call.

Originating Max Message Length 922 indicates the maximum message length, in terms of dialed digits, on the originating side of a given call. Upon determining that the maximum number of dialed digits has been entered, a sending complete message is automatically sent.

Actual Originating Party ID 924 is the line identification of the originator of a call. As is more specifically described with respect to CLI 948, this may not be the number presented to the Terminating Party.

Calling Line ID Validation Feature Flag 926 indicates whether or not the calling line identification (CLI) validation feature is enabled for a given call.

Number Translation Feature Flag 928 indicates whether or not the number translation feature is enabled for a given call.

Tone Detection Feature Flag 930 indicates whether or not the tone detection feature is enabled for a given call.

Originating Signal Subscription 932 is a Boolean array, indexed by a unique signal identifier, representing the possible set of available signal to which the originating side of the call subscribes. This is particularly useful in responding to ore handling signals supported by one side of the call and not the other.

Terminating Signal Subscription 934 is a Boolean array, indexed by a unique signal identifier, representing the possible set of available signals to which the terminating side of the call subscribes. This is particularly useful in responding to or handling signals supported by one side of the call and not the other.

Originating Protocol Type 936 indicates the particular protocol employed on the originating side of a given call.

Originating Protocol Group 938 indicates the protocol group or family to which a specific protocol, on the originating side of a given call, belongs.

Terminating Protocol Type 940 indicates the particular protocol employed on the terminating side of a given call.

Terminating Protocol Group 942 indicates the protocol group or family to which a specific protocol, on the terminating side of a given call, belongs.

Local Mode 944 indicates whether or not a given call involves manipulating data on each side of the call (i.e. in the case of dissimilar protocols) to populate or read call context data.

Buffer Mode 946 indicates whether or not a given call involves using the "pass through" mode on each side of the call (i.e. in the case of the same or similar protocols) to populate or read call context data.

Calling Line Identification ("CLI") 948 is the specific number identity to be presented to the terminating party in a call. For example, for purposes of privacy, the CLI presented to the Terminating Party (presumed to be equipped with Caller ID type service) of a call originated by an executive from within a PBX may be that of the main number of the PBX and not the specific number of the executive's line.

Buffer 950 is defined as a series of elements involved in a conversion that represent the elements to copied to the output or terminating side, when buffer mode is enabled. This is not used when local mode is enabled.

Sending Complete Flag 952 is a Boolean flag used to indicate whether or not sending, of the string of dialed digits, is complete.

Dialed Destination Number 954, sometimes called dialed address number, contains the dialed string of digits if operating in en-bloc mode of the collection of component parts if operating in overlap mode.

Translated Destination Number 956 number is sometimes called translated dialed address number. If Number Translation is enabled and if operating in en-bloc mode, this Information Element contains a copy of the Dialed Destination Number 954; or, if operating in overlap mode, the current Dialed Destination Number 954 part.

Bearer Capabilities 958 is used to define the specific use capability of the bearer channel among one or a plurality of choices including services (e.g Voice, FAX, Asynchronous Data, Synchronous Data) and communications rates (e.g. 2400 Baud, 4800 Baud, 9600 Baud, etc.).

Other data could be stored in Call Context 416 depending upon the needs and configuration of the protocols of the connecting networks.

Figure 9B:
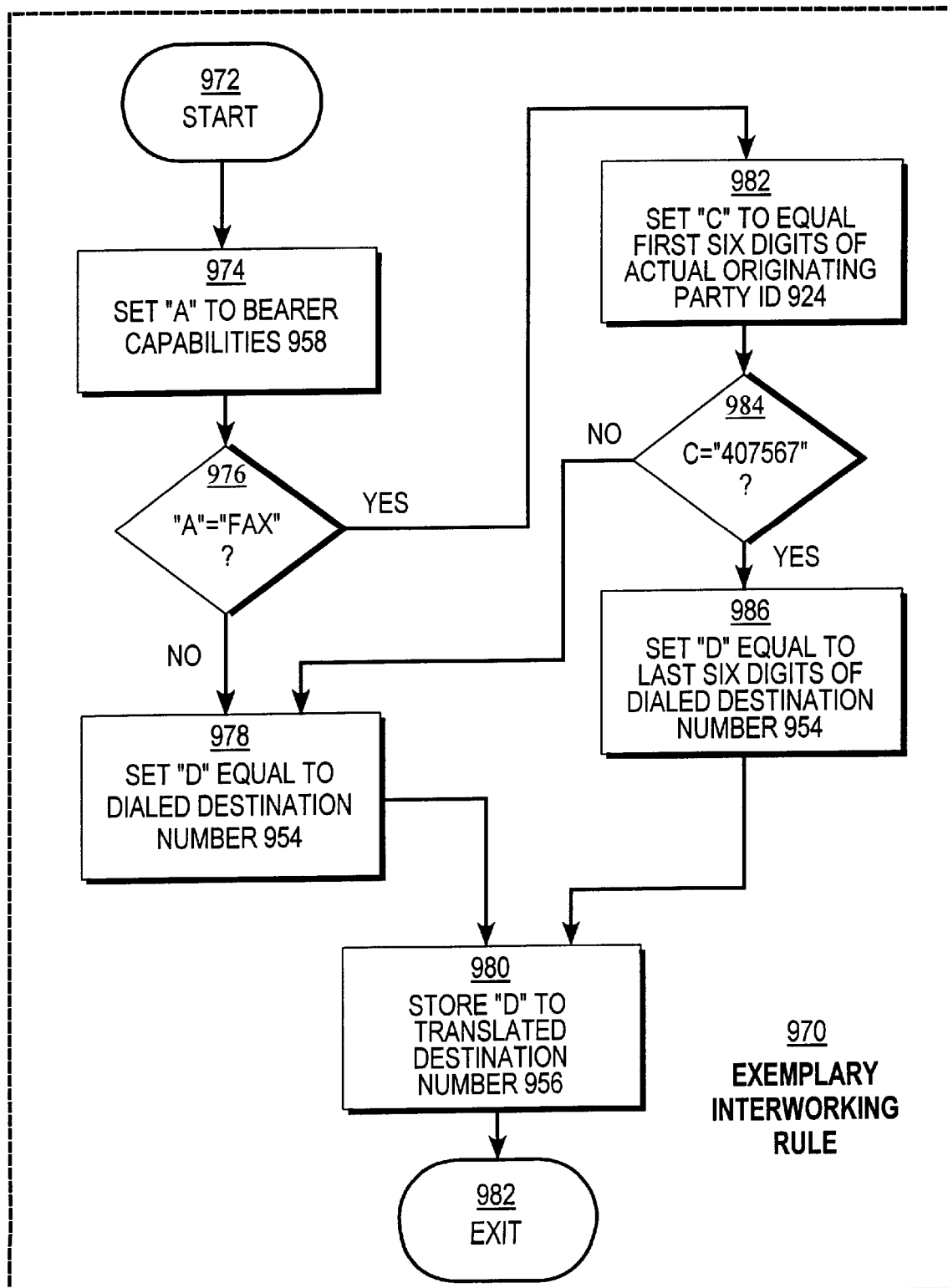
FIG. 9B depicts a flow chart of an exemplary inter-working rule, and the effect of such rule on the contents of select Information Elements with the Call Context records.

Referring now to FIG. 9B there is depicted an exemplary Inter-Working Rule 970 that demonstrates the conditional manipulation of Dialed Destination Number 954. Starting at 972 the process begins with the initialization at 974 of memory variable "A" as being equal to the Bearer Capabilities 958. A conditional test at 976 is used to determine which of two process branches is followed. In the case of a "positive" test of condition 976, processing continues with 982 where memory variable "C: is initialized to equal the first six digits of the Actual Originating Party ID 924. Thereafter another conditional test occurs at 984 to determine which of two processing branches is followed. In the case of a "negative" test at 984 processing continues at 978 which is also the resulting branch for a "negative" test at 976. At 978 memory variable is initialized to equal the Dialed Destination Number 954. In the case of a "positive" test at 984 processing continues at 986 with the initialization of memory variable "D" to equal the last six digits of the Dialed Destination Number 954. All processing branches converge at 980 where the contents of memory variable "D" are stored as the Translated Destination Number 956.

Referring now to FIG. 9C there are depicted examples of the contents of selected Information Elements of the Call Context 416. The Call Context 416 Information Elements shown in 990a and 990b depict the content of the selected Information Elements before and after, respectively, the processing of Inter-Working Rule 970. In this first example, the processing follows the path from the conditional test at 976 to 982, and the conditional test at 984 to 986, ultimately resulting in the population of the Translated Destination Number 956 with a manipulation of the Dialed Destination Number 954. This example is illustrative of dialed digit manipulation as may be required because the terminating network element only requires a sub-set of the actual dialed number, and therefore the leading digits that are not required are deleted.

Referring now to FIG. 9D, 992a and 992b depict the content of the Selected Information Elements before and after, respectively, the processing of the Actual Originating Party ID 924 in 990a and 992a, the processing path is different. The contents of 924 and 992a result in a positive test at 976 and a negative test at 984, thus processing ends with 978, 980, and 982.

FIGS. 10 through 22 have been prepared in general conformance with the ITU Recommendation Z.120 establishing the Specification and Description Language ("SDL"). These figures depict state diagrams for the UCM 414 in which states are depicted as "rounded-rectangles", the allowable output signals as rectangles having an "angular indention", and the allowable output signals as rectangles having a "pointed side". When the angular indentation of an input signal in the illustrations is on the left side of the indented rectangle, it refers to a signal coming form the Originating side of the call, thus denoting input into UCM 414 from OCC 410. When the pointed side of an output signal in the illustration points to the left, it refers to a signal destined for the Originating side, thus denoting input into the OCC 410 from he UCM 414. Similarly, when the angular indention of an input signal in the illustrations is on the right side of the indented rectangle, it refers to a signal coming from the Terminating side of the call, thus denoting input into UCM 414 from TCC412. When the pointed side of an output signal in the illustrations points to the right it refers to a signal destined for the Terminating side, thus denoting input into the TCC 412 from the UCM 414. As the SDL specifications do not include a symbol that it explicitly defined to be used to represent a signal that is from a process environment and that has no directional association (i.e. it is neither associated with originating or terminating side of call), and as a symbol is required to denote a signal received from the engine environment, a non-conventional symbol— comprised of a rectangle pointing in both directions and containing a rounded rectangle—has been used. This symbol occurs, for example, in FIG. 18 and is labeled as 1822.

Figure 10:
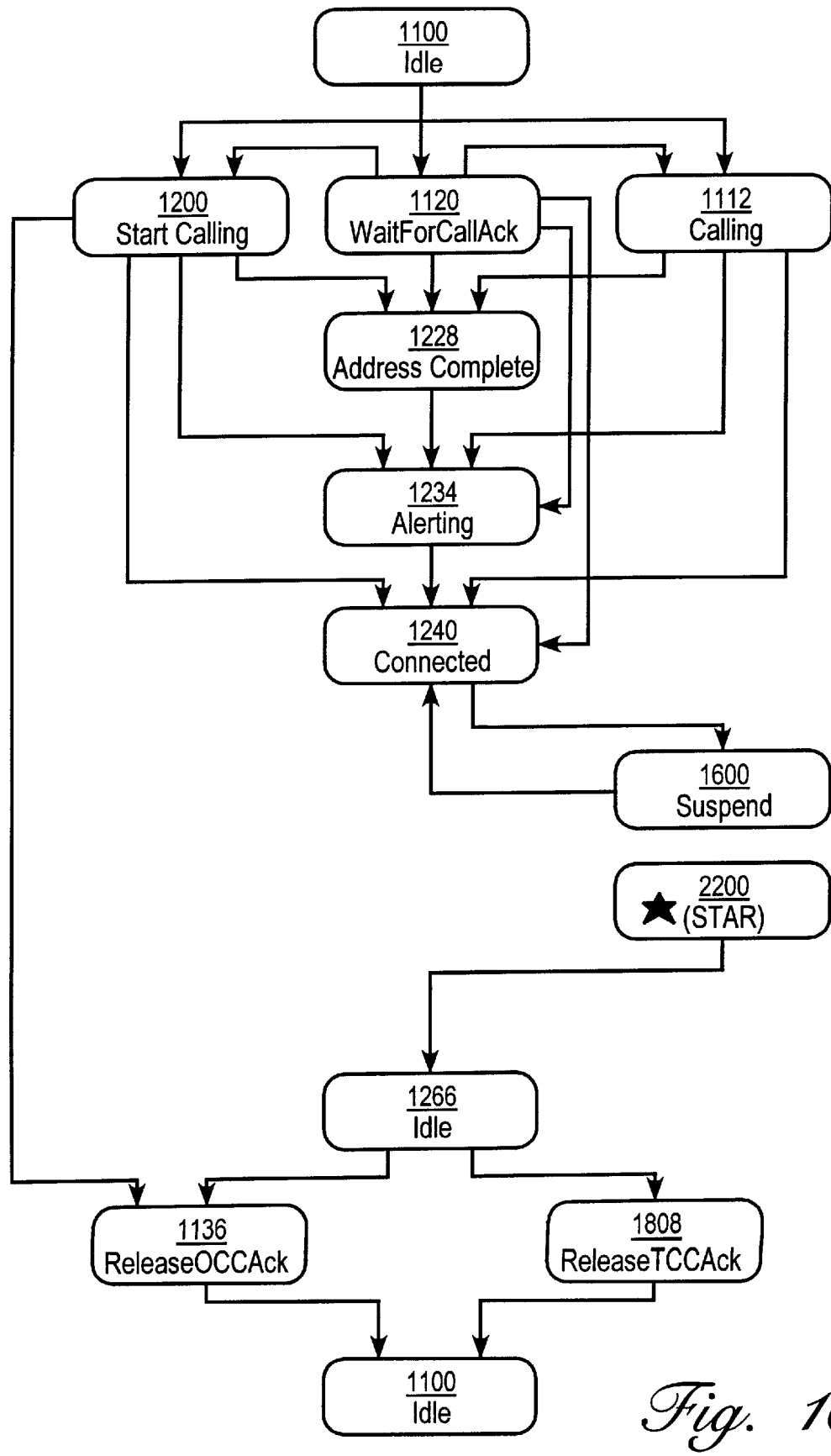
FIG. 10 is a summary state diagram of the state diagrams depicted in FIGS. 11 through 22.

In order to better understand the operation of the present invention, it is necessary to understand the various states, as shown in FIG. 10 and with reference to FIG. 3, associated with UCM 414. The states through which UCM 414 moves are relatively independent of the states through which OCC 410 and TCC 412 move, and the states of the latter two are dependent on the protocols of the call they are handling.

Typically, UCM 414 reaches the state shown in FIG. 10 after (1) input signals are received, and/or (2) output signals are sent, by UCM 414 to and from either OCC 410 or TCC 412. OCC 410 is responsible for controlling the protocol data sent from the terminating side.

FIG. 10 represents the hierarchy of the states that UCM 414 can be in, and thus provides a general overview of the state machine. Each of the states depicted in FIG. 10 are described in greater detail in FIG. 11 through 22 and bear the same number as used in these figures. Thus, FIG. 10 is an overview or summary of the states. For convenience and easier readability, the words "state machine" are sometimes omitted to OCC state machine 410, TCC state machine 412 and UCM state machine 414. One other note of clarification in reference to FIG. 10. All states StartCalling 1200, WaitForCallAck 1120, Calling 1112, Address 1228, Alerting 1234, Connected 1240 Suspend 1600, and Star 2200 ultimately transition to state Releasing 1266 at appropriate times during processing. For purposes of clarity on FIG. 10, the arrows depicting these transitions are omitted, except in the case of the states Star 2200.

Figure 11:
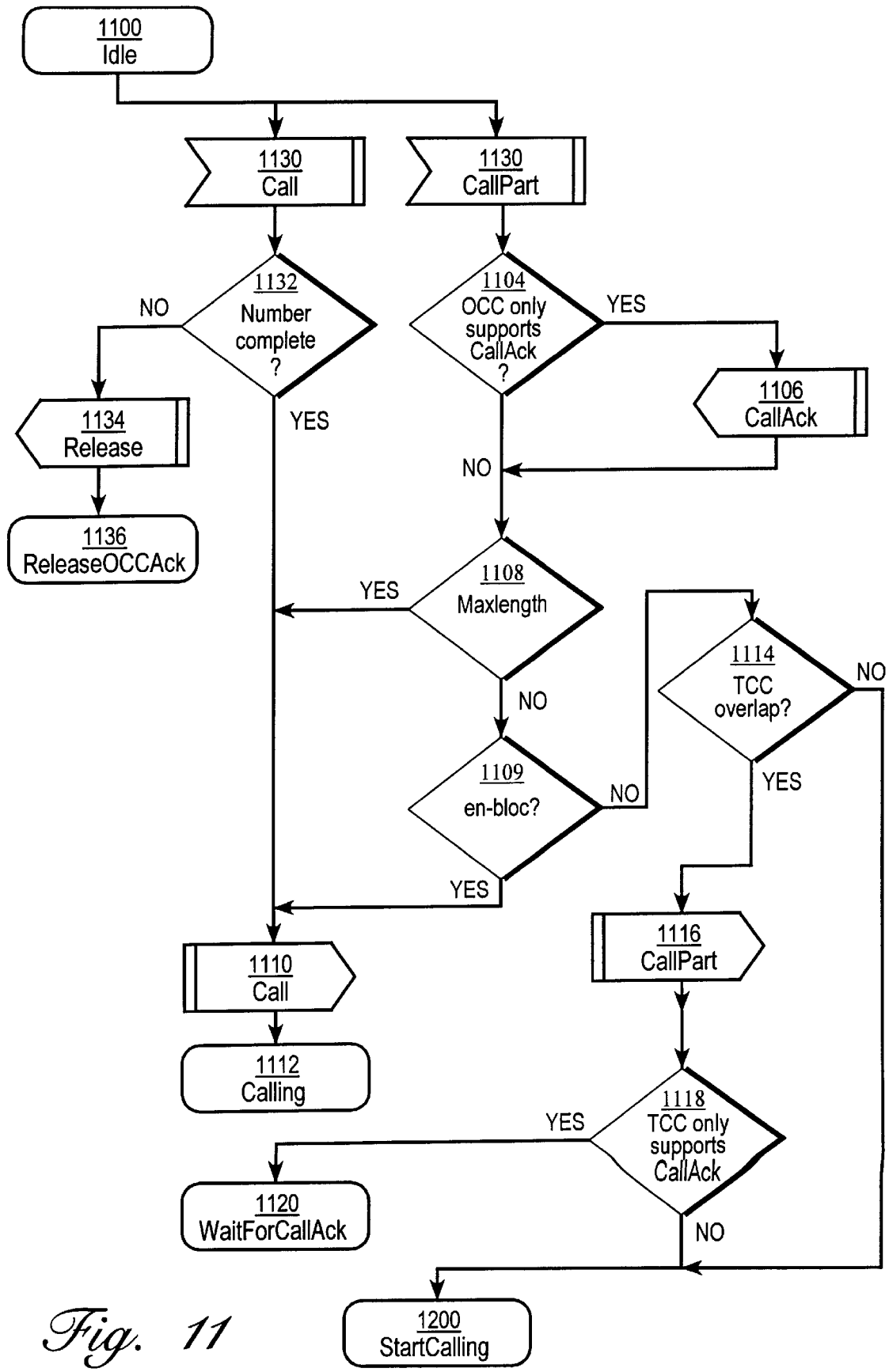
FIG. 11 is a state diagram of the state Idle of the Universal Call Model state machine.

Referring now to FIG. 11, UCM 414 is initially set up when a new Call Instance begins and starts in a state Idle 1100, which is a prerequisite starting point for call. Typically, there are two types of calls that UCM 414 receives (1) an overlap call in which UCM 414 receive each digit as it is dialed, or (2) an en-bloc call in which UCM 414 receives all digits of the called number at the same time.

According to the overlap call mode, an input signal CallPart 1102 can be received by UCM 414 from OCC 410 that indicates that a part of the called number has been received and that a new call is to be established. Reception of input signal CallPart 1102 may be followed by one or more CallNext signals discussed below (i.e., overlap receiving or sending)

A decision 1104 inquires whether OCC 410 only supports call acknowledgement signal. If OCC 410 only supports call acknowledgements, UCM 414 sends an output signal CallAck 1106 to OCC 410 to indicate that a call set-up is progressing, but further information is required to route the call. This, then, implies that a request for further CallNext 1202 input signal or a CallLast 1218 input signal is to be expected, both being discussed below in conjunction with FIG. 12. If decision 114 is answered in the negative, or after signal CallAck 1106 has been sent from UCM 414 to OCC 410, UCM 414 enters decision 1108 and inquires whether the maximum length of the called number has been reached. If the answer is no, UCM 414 enters a second decision 1109 and inquires whether the system is in the en-bloc mode. If either decision 1108 or decision 1109 is answered affirmative, UCM 414 sends an output signal Call 1110 to TCC 412 that in turns allows UCM 414 to enter State Calling 1112. Output signal Call 1110 indicates that an initial calling message has been received from the OCC 410, and that a new call is to be established. Reception of signal Call 111 by TCC 412 implies that all necessary information for the call set up has been already been translated into Call Context 416 by OCC 410 and/or UCM 414, and no further calling signal will be received for this call.

State calling 1112 indicates that signal Call 1110, or sequence of signal CallPart 1116, CallNext 1202 signals, and CallLast 1218 signal have been received and sent to TCC 412 to set up a new call, and that a response is awaited from TCC 412. A continued discussion of State Calling 1112 is mentioned in conjunction with FIG. 13.

If decision 1109 is answered in the negative, UCM 414 enters decision block 1114 and inquires whether TCC 412 is in the overlap call mode referred to above. If TCC 412 is indeed in the overlap mode, UCM 414 sends an output signal CallPart 1116 to TCC 412 that allows UCM 414 to enter a decision block 1118. Output signal CallPart 1116 is similar to input signal CallPart 1102 in that both indicate that an initial calling message has been received from the OCC 410 and that a new call is to be established. Reception of signal CallPart 1116 may be followed by one or more CallNext 1202 signals discussed below. Reception of signal CallPart 1116 indicates that only some of the necessary information to set up the call has already been translated into Call Context 410 by OCC 410 or UCM 414.

Decision 1118 inquires whether TCC 412 only supports call acknowledgements. If decision 1118 is answered in the affirmative, UCM 414 enters a State WaitForCallAck 1120 in order to wait for a call acknowledgment from TCC 412. State Calling 1112 is discussed in further detail below in conjunction with FIG. 13.

If either decision 1118 or decision 1114 is answered in the negative, UCM 414 enters a state StartCalling 1200. State StartCalling 1200 indicates that input signal CallPart 1102 has been received from OCC 410 by UCM 414. State StartCalling 1200 is continued below in conjunction with FIG. 12.

Alternatively, in the en-bloc call mode mentioned above, an input signal Call 1130 is received from OCC 410 which indicates that an initial calling message has been received from the OCC 410 and that the call is to established. Reception of this signal implies that all necessary information for the call setup had already been translated into the Call Context 416. UCM 414 enters a decision 1132 and inquires whether the called number is complete.

If the output from decision 1132 is answered in the negative, UCM 414 sends output signal Release 1134 to OCC 410 and then enters state ReleaseOCCAck 1136. In FIG. 11, after a Release 1134 signal has been sent, then a particular state machine moves to a state ReleaseOCCAck 1136 indicating that a Release 1134 has been sent to OCC 410, and that the UCM 414 is awaiting acknowledgment from OCC 410 with a ReleaseAck 1806 signal after TCC 412 has already acknowledged with a ReleaseAck 1810 while in a releasing state.

Release 1134 or 1264 signals are used to indicate that a release request message has been received from either the OCC 410 or the TCC 412. Reception of the Release 1134 or 1264 signals implies that the call release has begun in either OCC 410 or TCC 412 because the sending of the Release signal is used to start releasing in that side of the call. A ReleaseAck 1806 or 1810 signal can be expected in response from the side receiving the Release 1134 or 1264 signal.

However, if decision 1132 is answered in the affirmative, UCM 414 sends output signal Call 1110 to TCC 412 and transitions to state StartCalling 1200 as mentioned above.

Figure 12:
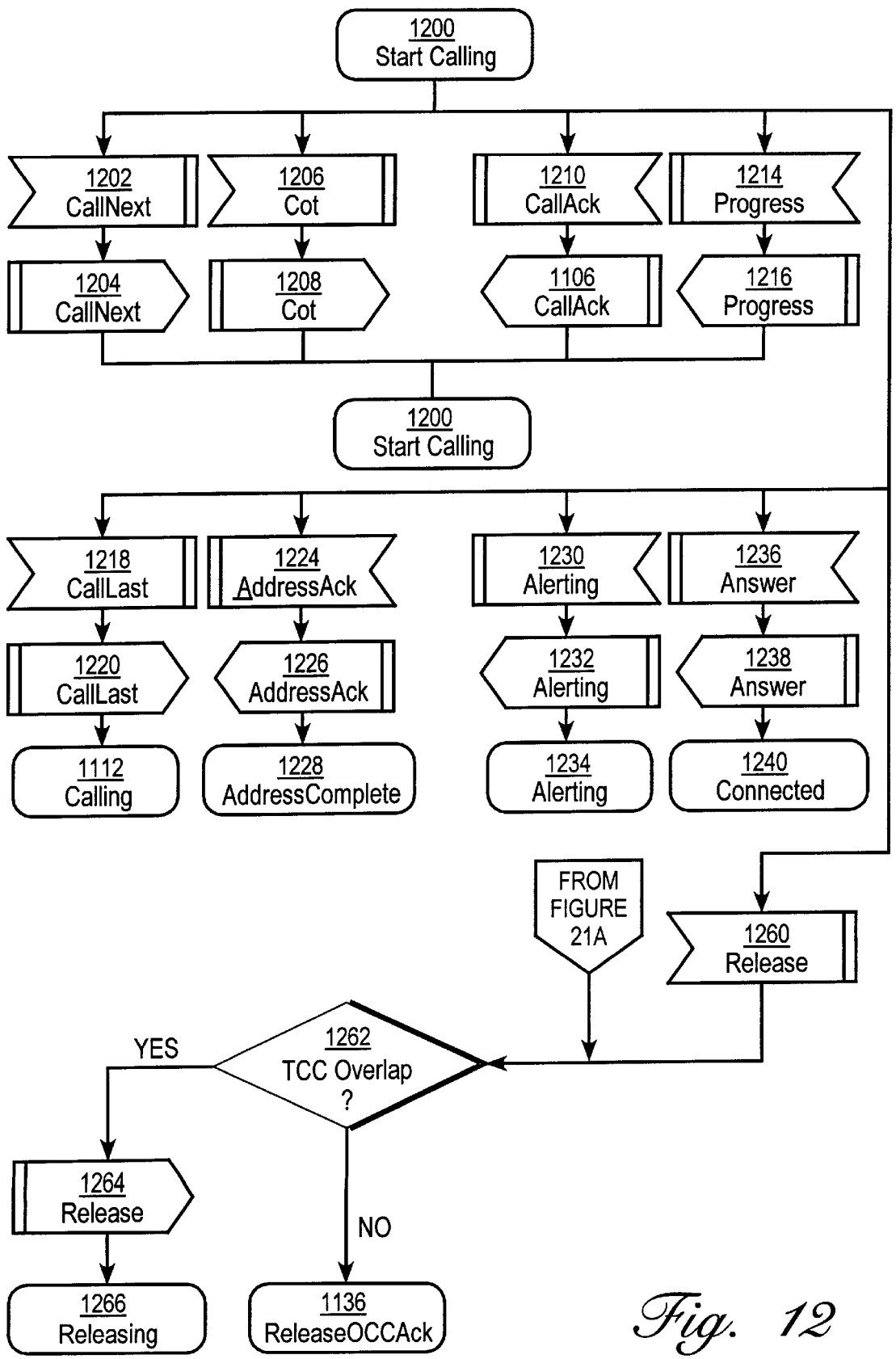
FIG. 12 is a state diagram of the state StartCalling shown in FIG. 11.

FIG. 12 depicts the transition from state StartCalling 1200, the particular transition being dependent upon the particular signal received and whether it was received from OCC 410 or TCC 412.

Upon receiving an input signal CallNext 1202 from OCC 410, a second signal CallNext 1204 is generated and sent from UCM 414 to TCC 412, causing UCM 414 to remain in the same state.

Continuing with FIG. 12, UCM 414 while in state Start-Calling 1200 can also receive an input signal CallAck 1210 sent from TCC 412. UCM 414 then initiates output signal CallAck 1106, discussed above with respect to FIG. 11, to OCC 410. Signals 1210 and 1106 indicate that call set-up is progressing, but further information is required to route the call. Signals 1210 and 1106 allow UCM 414 to transition to state StartCalling 1200, but also imply a request for further input signal CallNext 1202, or input signal CallLast 1218.

Alternatively, when UCM 414 is in state StartCalling 1200, UCM 414 can receive an input signal COT 1206 form OCC 410. Input signal COT 1206 is a general indication of continuity activity. The continuity activity can take the form of either a continuity check result, or a request for a continuity retest. Variables in call context can be examined to determine what action is to be taken. Input signal COT 1206 is generated by OCC 410, transmitted into UCM 414 and then passed on to TCC 412 in the form of an output signal COT 1208, the generation of which allows UCM 414 to transition to state StartCalling 1200.

An input signal Progress 1214 can also be sent from the TCC 412 to UCM 414, the receipt of which initiates an output signal Progress 1216 from UCM 414 to OCC 410 that allows UCM 414 to transition to state StartCalling 1200. Signals 1214 and 1216 indicate that the call set-up is progressing and that sufficient routing information has been received, however, a delay is expected before the next backward signal is received.

An input signal CallLast 1218 is one further possible input that can be received by UCM 414. Input signal CallLast 1218 is sent from OCC 410 to UCM 414, whereupon an output signal CallLast 1220 is sent from UCM 414 to TCC 412 in response, both signals indicating that the last of a series of initial calling messages has been received from OCC 410. Signals CalLast 1218 and 1220 imply that all necessary information for the call set-up has already been translated into Call Context 416 by OCC 410 or UCM 414, and no further calling signal will be received for this call. Signal 1218 and 1220 allow UCM 414 to transition to state Calling 1112 discussed below with respect to FIG. 13.

Figure 14:
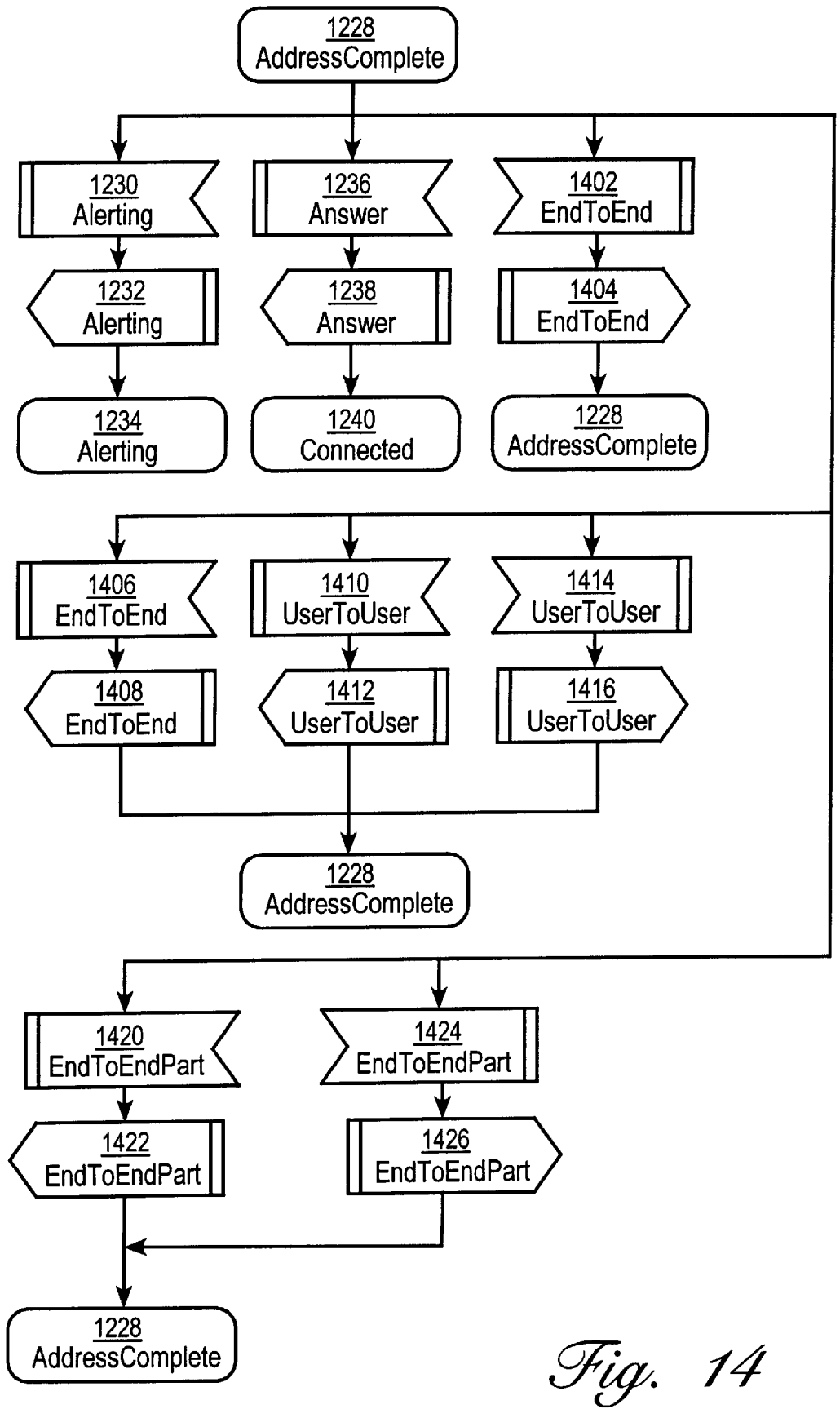
FIG. 14 is a state diagram of the state AddressComplete shown in FIG. 12.
Figure 15:
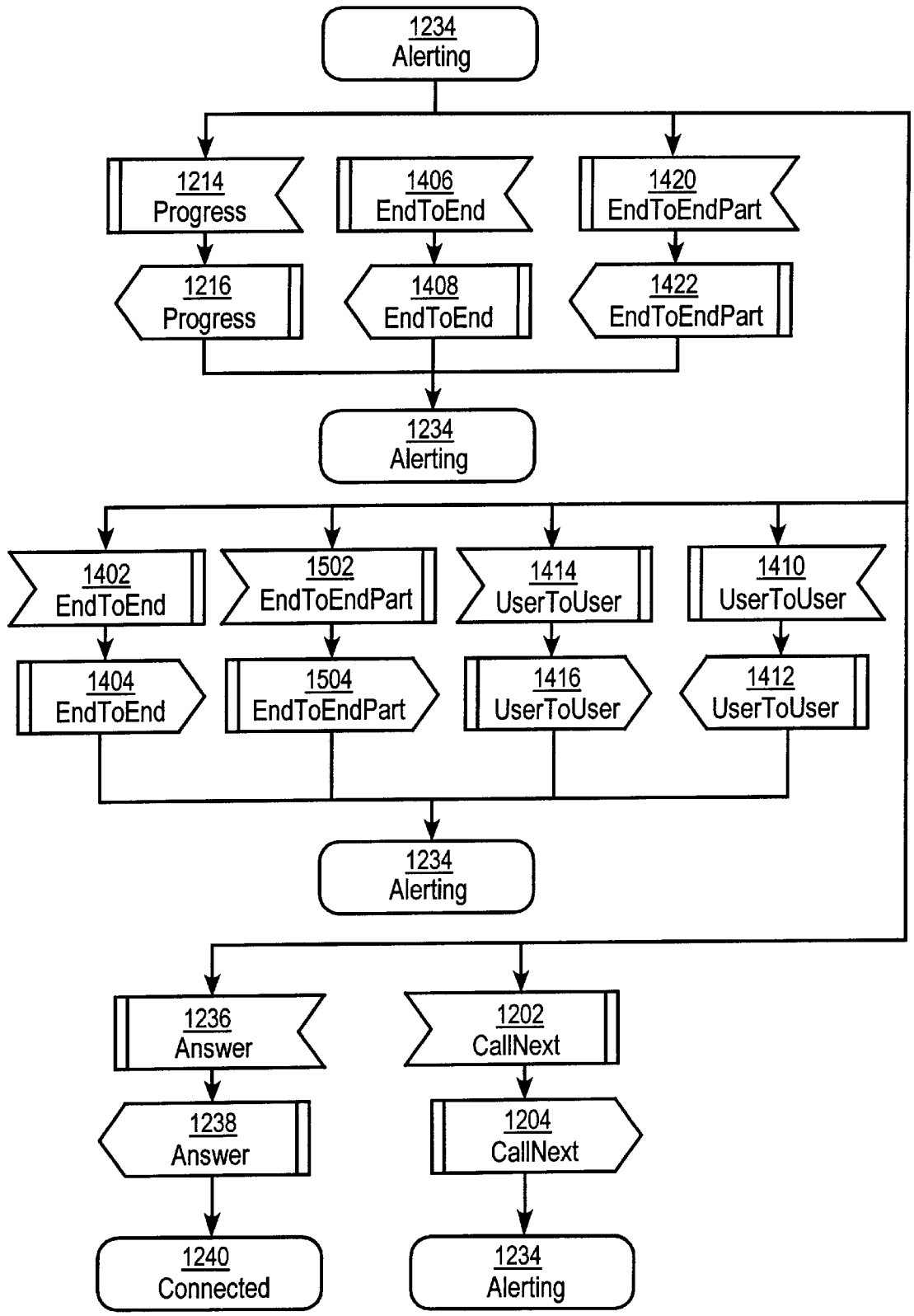
FIG. 15 is a state diagram of the state Alerting shown in FIG. 12.

An input signal AddressAck 1224 is sent from TCC 412 to UCM 414 so that an output signal AddressAck 1226 can be sent from UCM 414 to OCC 410 to indicate that sufficient address digit information has been received to complete call set-up and place UCM 414 in a state AddressComplete 1228, further described in conjunction with FIG. 14. However, signals AddressAck 1226 and 1228 do not imply that the call is set-up to be called user because the call is still routing through the network. In simple calls, the receipt of signal AddressAck 1226 will normally be followed by or replaced by an output signal Alerting 1232. Being in state Address-Complete 1228 simply indicates that input signal AddresAck 1224 has been received from TCC 412 during call set-up.

UCM 414, when in the state StartCalling 1200 can also receive an input signal Alerting 1230 from TCC 412, which in turn causes UCM 414 to send an output signal Alerting 1232 to OCC 410 that indicates that sufficient address digit information has been received to complete call set-up and that the caller user is now being alerted. The receipt and sending of signals Alerting 1230 and 1232 allow UCM 414 to transition to state Alerting 1234 which simply indicates that input signal Alerting 1230 has been received from TCC 412 during call set-up. State Alerting 1234 is discussed in further detail below in conjunction with FIG. 15.

UCM 414 can also receive an input signal Answer 1236 from TCC 412, such that UCM 414 sends a corresponding output signal Answer 1238 to OCC 410 to indicate that an alerted user has now answered, so that the call should be through-connected the receiving and sending of signals 1236 and 1238 allow UCM 414 to transition to a state Connected 1240, which simply indicates that the input signal Answer 1236 has been received from TCC 412 and that the call is now through connected. State Connected 1240 is discussed in further detail below in conjunction with FIG. 16.

A further alternative for UCM 414 when in state Start-Calling 1200, is the receipt from OCC 410 of an input signal Release 1260 that is used to indicate that a release request message has been received from the OCC 410. Reception of input signal Release 1260 implies that the call release has started in OCC 410. Receipt by UCM 414 of input signal Release 1260 put UCM414 into a decision 1262 that inquires whether TCC 412 is in an overlap call mode. If decision 122 is answered affirmatively, UCM 414 sends an output signal Release 1264 to TCC 412 which is used to start the releasing process in TCC 412.

It is noted that a release acknowledgement signal should be expected to be received by UCM 414 after it receives input signal Release 1260 from OCC 410, or it receives a similar input signal from TCC 412. Similarly, a release acknowledgement signal should be expected after UCM 414 sends output signal Release 1264 to TCC 412 or output signal Release 1134 to OCC 410 as discussed in conjunction with FIG. 11 above.

Output signal Release 1264 allows UCM 414 transition to a state Releasing 1266 that indicates that some form of release input signal has been received from OCC 410 or TCC 412. Alternatively, it can indicate that an internal release input signal, as discussed in conjunction with FIG. 15 below, has been received from the Protocol Conversion Engine 300 and passed to both OCC 410 and TCC 412 as required. However, it is not known which side, the OCC 410 side or the TCC 412 side, will answer next with a ReleaseAck 1806 or 1810. However, if the output from decision 1262 is negative, then UCM 414 will transition to a state ReleaseOCCAck 1136.

As further shown by FIG. 13, decision 1262 can also be entered be receiving signal Release 1260 generated by OCC 410 when in state WaitForCallAck 1120, as discussed above with respect to FIG. 11 and as further discussed below with respect to FIG. 21.

Figure 13:
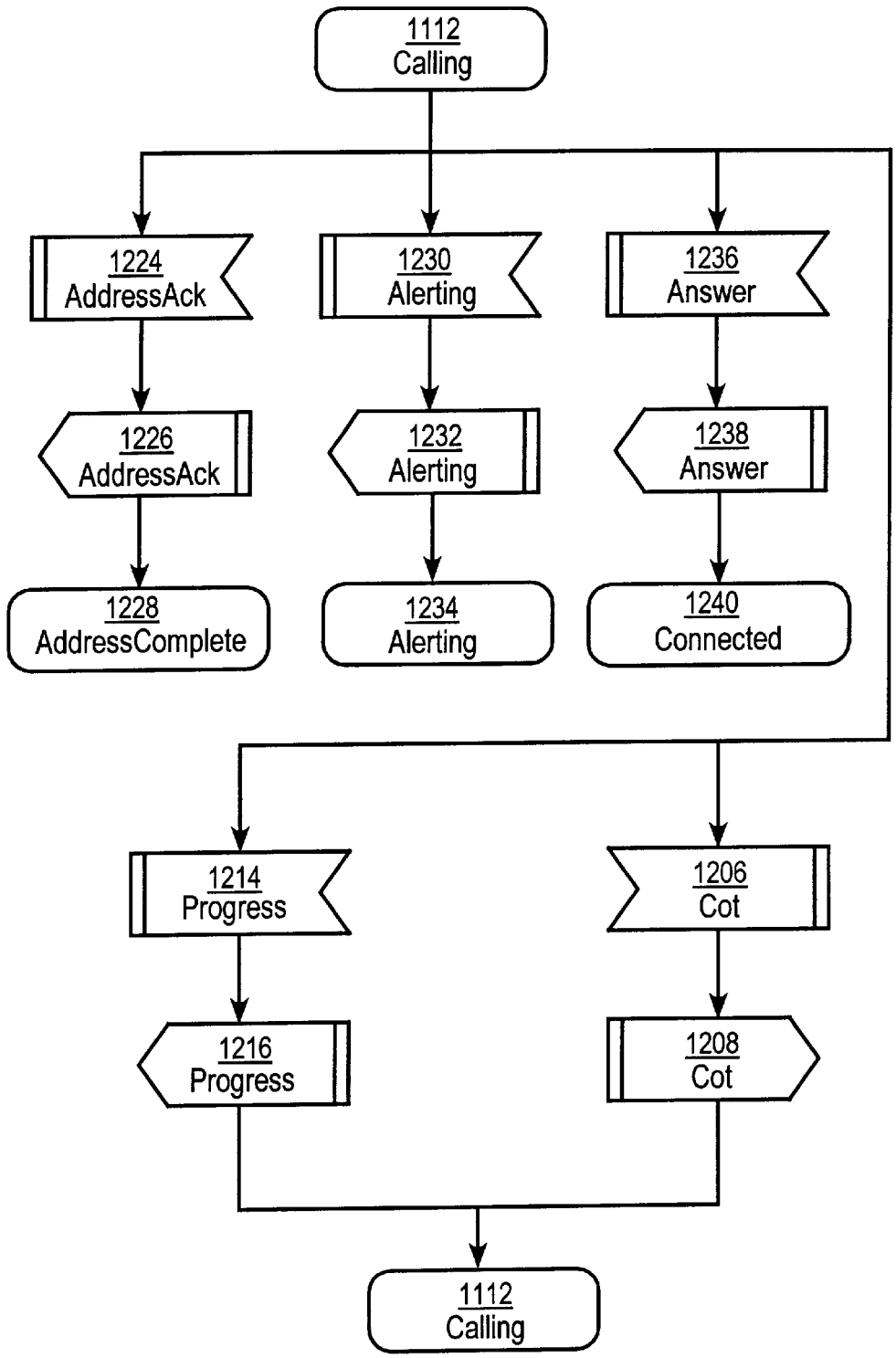
FIG. 13 is a state diagram of the state Calling shown in FIG. 11.

Turning now to FIG. 13, UCM 414 can receive a variety of input signals when it is in the state Calling 1112. Input signal AddressAck 1224, discussed above in conjunction with FIG. 12, is an address acknowledgment signal sent from TCC 412 to UCM 414, which, in turn initiates an output signal AddressAck 1226 from UCM 414 to OCC 410. Signal AddressAck 1226 indicates that the call set-up is progressing and that sufficient information has been received. However, a delay is expected before the next backward signal is received. Signals 1224 and 1226 allow UCM 414 to transition to state AddressComplete 1228.

UCM 414 transitions from state Calling 1112 to state Alerting 1234 upon receipt by UCM 414 of an input signal Alerting 1230 from TCC 412, and upon the sending by UCM 414 of an output signal Alerting 1232 to OCC 410. Signals Alerting 230 and 1232 indicate that sufficient address digit information has been received by UCM 414 to complete call setup, and that the user is being alerted. State Alerting 1234 simply indicates the signals alerting 1230 and 1232 have been received and sent, respectively, by UCM 414.

UCM 414 can transition to state Connected 1240 by receiving input signal Answer
1236 and then sending output signal Answer 1238 to OCC 410. Signals Answer 1236 and 1238 indicate that an alerted use has now answers and that the call should be through connected as discussed above in conjunction with FIGS. 12 and 16.

Alternatively, UCM 414 when in state calling 1112 can receive input signal Progress 1214 from TCC 412 and then send output signal Progress 1216 to OCC 410 so that UCM 414 transitions to state Calling 1112. Both signals Progress 1214 and 1216, and state Calling 1112 were discussed above in conjunction with FIG. 12.

When in state Calling 1112, UCM 414 can receive input signal Cot 1206 from OCC 410 that initiates UCM 414 to send output signal CallPart 1116 to TCC 412 so that UCM 414 returns to state Calling 1112.

Referring now to FIG. 14, UCM 414 is able to transition from the state AddressComplete 1228, discussed above with respect to FIGS. 12 and 13, to a variety of other states. After UCM 414 receives an input signal Alerting 1230 from TCC 412, and sends a corresponding output signal Alerting 1232 to OCC 410, UCM 414 transition to state Alerting 1234 that was discussed in conjunction with FIGS. 12, 13 and 15.

The UCM 414 can also transition from state Address-Complete 1228 to state Connected 1240 by receiving input signal Answer 1236, and then sending output signal Answer 1238, as previously discussed in conjunction with FIG. 12 above.

Continuing with FIG. 14, when UCM 414 is in state AddressComplete 1228, an input signal EndToEnd 1402 can be sent from OCC 410 to UCM 414 which initiates UCM 414 to send an output signal EndToEnd 1404 to TCC 412. Input and output signals EndToEnd 1402 and 1404 are used to transparently transport information from OCC 410 to TCC 412 between the local access nodes. The receipt of input signal EndToEnd 1402 and the sending of output signal EndToEnd 1404, allow UCM 414 to transition to state AddressComplete 1228.

Also when in state AddressComplete 1228, UCM 414 can receive an input signal EndToEnd 1406 from TCC 412, which then initiates UCM 414 to send an output signal EndToEnd 1408 to OCC 410. Input signal 1406 and output signal 1406 are similarly used to transparently transport information from side-to-side between the local access nodes and also allow UCM 414 to transition to state AddressComplete 1228 to respond to additional signals.

Additional signals include an input UserToUser 1410 from TCC 412 that allows UCM 414 to initiate an output signal UserToUser 1412 to OCC 410, or an input signal UserToUser 1414 from OCC 410 that allows UCM 414 to initiate and send an output signal UserToUser 1416 to TCC 412. Input signals UserToUser 1410 and 1414, and output signals UserToUser 1412 and 1416 output signals are used to transparently transport information from customer premises equipment to customer premises equipment, and allow UCM 414 to transition to the state Complete 1228.

Other possible input signals include and EndToEndPart signal 1220 from TCC 412 that allows UCM 414 to initiate a corresponding output signal EndToEndPart signal 1442 to OCC 410 and in input signal EndToEndPart signal 1424 from OCC 410 that allows UCM 414 to initiate an output signal EndToEndPart signal 1426 sent to TCC 412. Input signals EndToEndPart signal 1420 and 1424, and End-ToEndPart signal 12422 and 1426 are used to transparently transport information from side-to-side between the local access nodes, to indicate that further end-to-end information is to be received, and to allow UCM 414 to transition to the AddressComplete 1228.

FIG. 15 illustrates the possible input and output signals and state transitions from state Alerting 1234, all of which are discussed above in conjunction with FIGS. 12, 13, 14 and 15. Specifically, input signal Answer 1236 and output signal Answer 1238 allow UCM 414 to transition from state Alerting 1234 to state Connected 1240. On receiving of input signal Progress 1214, UCM 414 sends output signal Progress 1216. On receiving input signal EndToEnd 1406, UCM 414 send output signal EndToEnd 1408. On receiving input signal EndToEnd 1402, UCM 414 sends output signal EndToEnd 1404. On receiving input signal EndToEnd 1502, UCM 414 send output signal 1504. On receiving input signal EndToEnd 1420, UCM 414 send output signal EndToEnd 1422 on receiving input signal UserToUser 1414, UCM 414 sends output signal UserToUser 1416. On receiving input signal UserToUser 1410, UCM 414 sends output signal UserToUser 1412. On receiving input signal CallNext 1202, UCM 414 sends output signal CallNext 1204. In all of the aforementioned cases, UCM 414 transitions to state Alerting g1234, effectively not changing state, but merely replication an input signal and then sending it out in the same direction of flow in which the input signal was received.

Figure 16:
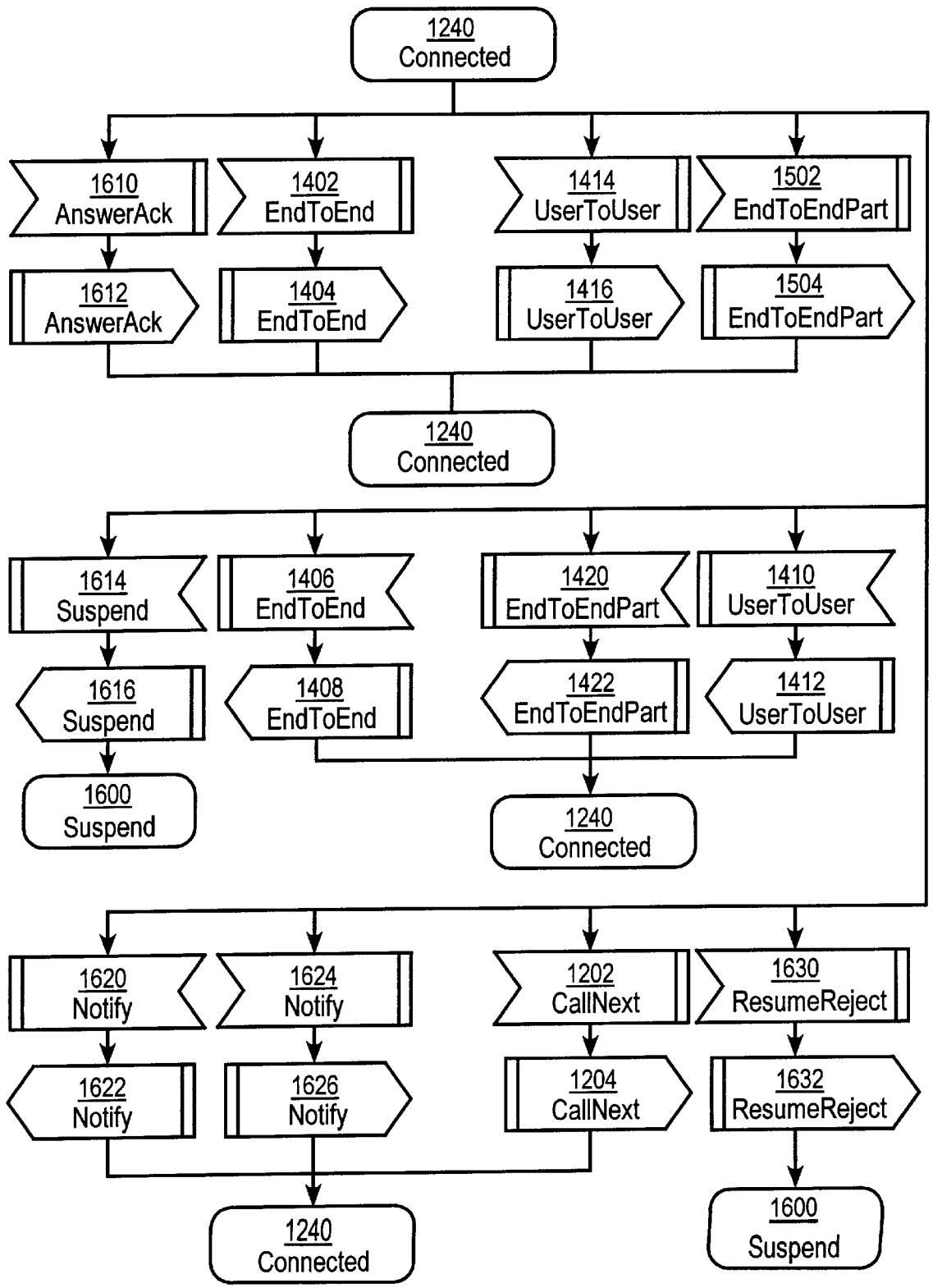
FIG. 16 is a state diagram of the state Connected shown in FIG. 12.

FIG. 16 depicts those signals that are propagated by UCM 414 when it is in state Connected 1240. Specifically, input signal EndToEnd 1402, UserToUser 1414, and EndToEnd 1502, and an input signal AnswerAck 1610, all received from OCC 410, are respectively propagated to TCC 412 by UCM 414 when it is in state Connected 1240 as output signals EndToEnd 1404, UserToUser 1416, and EndToEnd 1504, and an output signal AnswerAck 1612. Signals AnswerAck 1610 and 1612 indicated that a connected calling user has now acknowledged the connection as answered, and the connection should be maintained. In addition, input signals EndToEnd 1406, EndToEndPart 1420, and UserToUser 1410, all received from TCC 412, are respectively propagated to OCC 410 by UCM 414 when it is in state Connected 1240 as output signals EndToEnd 1408, EndToEndPart 1422 and UserToUser 1412. In each case, UCM 414 returns to state Connected 1240 after it propagates the corresponding output signal.

FIG. 16 also depicts the input and output signals that allow UCM 414 to transition between state Connected 1240 and a state Suspend 1600. Upon the receipt by UCM 414 of an input signal Suspend 1614 from TCC 412, UCM 414 initiates an output signal Suspend 1616 to OCC 410, to all UCM 414 to transition to state Suspend 1600. Signals Suspend 1614 and 1616 indicated the temporary suspension of a call that puts UCM 414 in state Suspend 1600, which is discussed below in conjunction with FIG. 17. Also, upon receipt by UCM 414 of an input signal ResumeReject 1630 from OCC 410, UCM 414 propagates an output signal ResumeReject 1632 to TCC 712 and moves to state Suspend 1600. Signal ResumeReject 1630 and 1632 are used as an acknowledgment of the receipt of a signal Resume, discussed below in conjunction with FIG. 20, where the originating protocol cannot process the Resume request.

An input signal Notify 1620 received by UCM 414 from TCC 412 results in an output signal Notify 1622 being sent by UCM 414 to OCC 410, and input signal Notify 1624 received by UCM 414 from OCC 410 results in an output signal Notify 1626 being sent by UCM 414 to TCC 412. These signals indicate the status of a suspend request at some distant point, and are passed transparently through UCM 414, but allow UCM 414 to transition to state Connected 1240. Finally, when UCM 414 is in state Connected 1240, it can also receive input signal CallNext 1202 from OCC 410 and propagate an output signal CallNext 1204 to TCC 412 and then transition to state Connected 1240.

Finally, when UCM 414 is in state Connected 1240, it can also receive input signal CallNext 1202 from OCC 410 and propagate an output signal CallNext 1204 to TCC 412 and then transition to state Connected.

Figure 17:
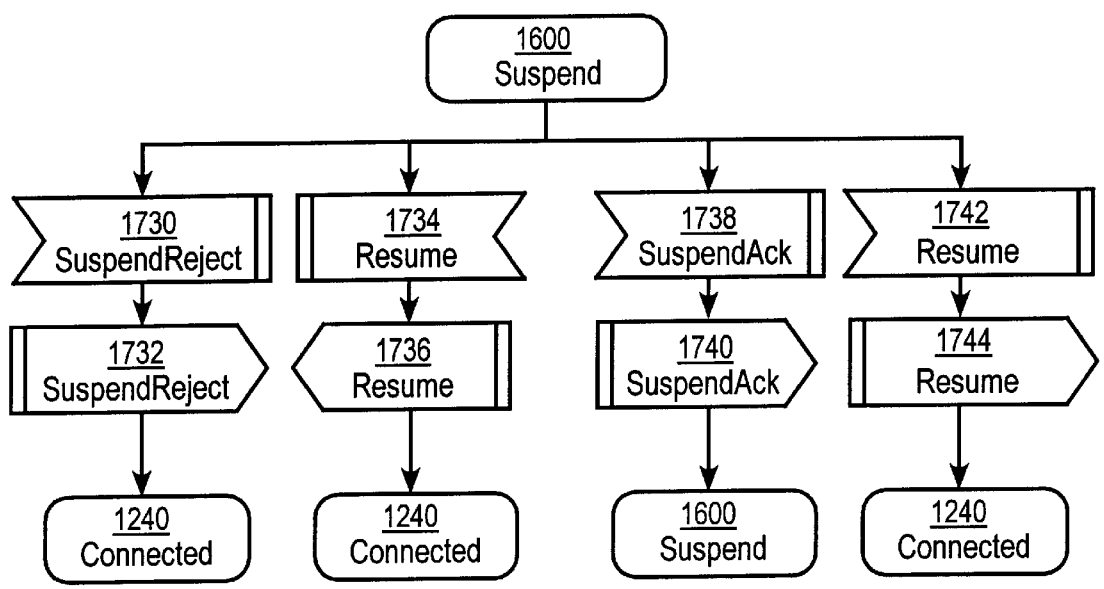
FIG. 17 is a state diagram of the state Suspend shown in FIG. 16.

FIG. 17 illustrates the state transitions associated with state Suspend 1600. When UCM 414 is in state Suspend 160 and it received an input signal SuspendReject 1730 from OCC 410, it first generates an output signal SuspendReject 1732 to TCC 412 and then transitions to state Connected 1240, as discussed above. Signals SuspendReject 1730 and 1732 are responses to signals Suspend, such as signals 1614 and 1616, when the line or protocol on the originating call side is unable to process such signals.

UCM 414 can also transition from state Suspend 1600 to state Connected 1240 by receiving an input signal Resume 1734 from TCC 412 or an input signal Resume 1744 from OCC 410 that initiates, respectively, an output signal Resume 1736 or 1744 from UCM 414 to OCC 410 or TCC 412 respectively. Signal Resume 1732 and 1743 after a successful processing of previous suspend signals, such as 1614 and 1616, by the originating protocol, are the next logical signals received and sent, respectively, by UCM 414.

Alternatively, UCM 414 can transition out of state Suspend 1600 upon the receipt from OCC 410 of an input signal SuspendAck 1738 that initiates an output signal SuspendAck 1740 sent by UCM 414 to TCC 412. Signals SuspendAck 1738 and 1740 are responses to the input signal Suspend 1614 originally sent by TCC 412 as discussed above in conjunction with FIG. 16.

UCM 414 can also transition from Suspend state 1600 to Connected state 1240 by receiving form OCC 410 an input signal Resume 1742 that initiates a resume output signal 1744 from UCM 414 to TCC 412. Thus, after previously successfully processing a suspend signal, resume signals 1742 and 1744 are the next logical signals received by UCM 414 so that the call can be continued by transitioning UCM 414 into state Connected 1240.

Figure 18:
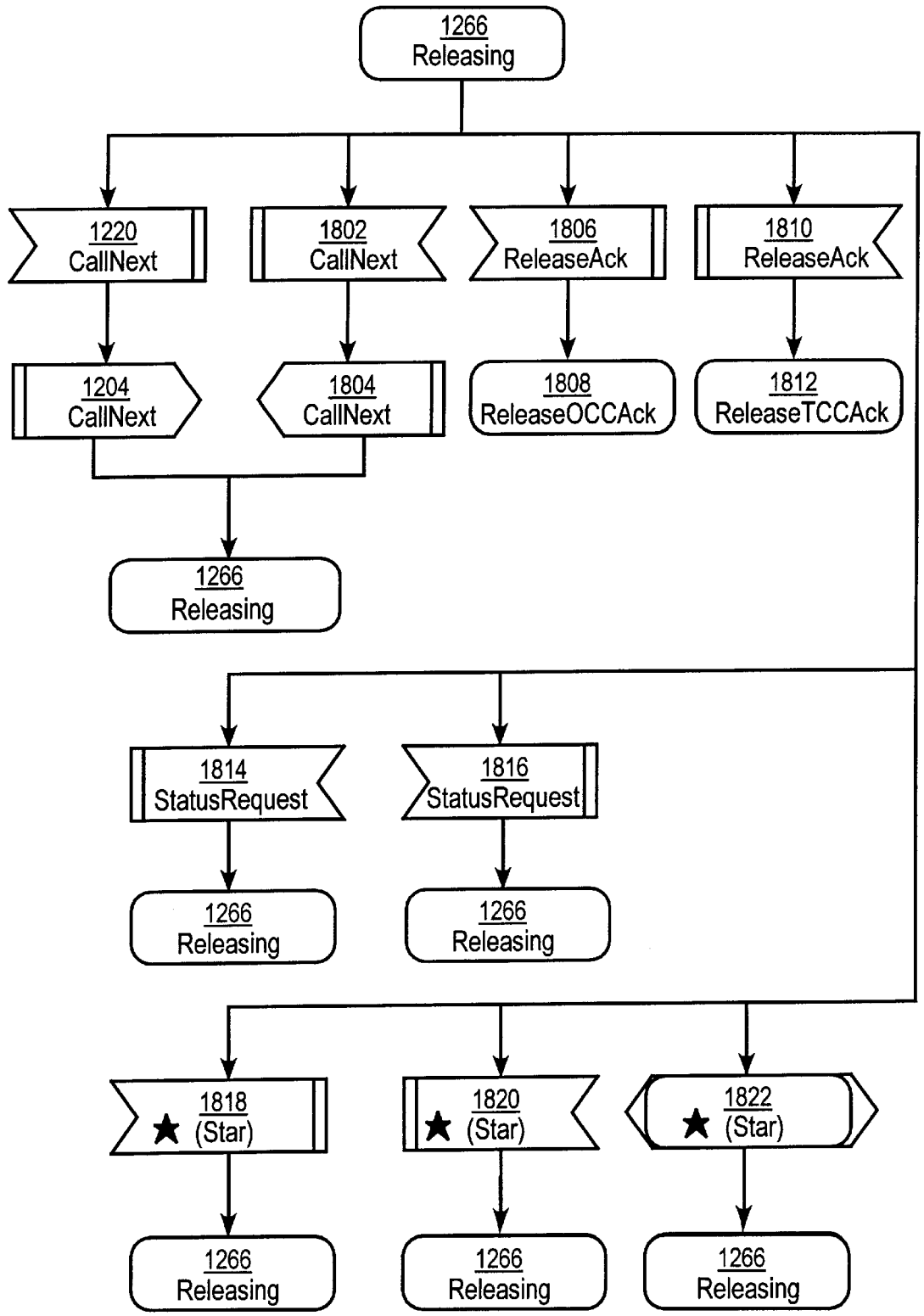
FIG. 18 is a state diagram of the state Releasing shown in FIG. 12.

FIG. 18 illustrates that state transitions of UCM 414 and the signals that it can receive when it is in state Releasing 1266, as previously mentioned in conjunction with FIG. 12. UCM 414 can transition to Releasing state 1266 by receiving in put signal CallNext 1220 from OCC 410 that initiates output signal CallNext 1204 sent from UCM 414 to TCC 412. Similarly, UCM 414 can receive an input signal CallNext 1802 from TCC 412 that initiates an output signal CallNext 1804 sent from UCM 414 to OCC 410 to reach state Releasing 1266. Signals CallNext 1802 and 1804 are similar to signal CallNext 1202 and 120, but are from the opposite direction.

Also when UCM 414 is in state Releasing 1266, either an input signal ReleaseAck 1806 from OCC 410 or an input signal ReleaseAck 1810 sent from TCC 412 can cause UCM 414 to move to a state ReleaseOCCAck 1808 or a state ReleaseTCCAck 1812, respectively. Both input signals ReleaseAck 1806 and 1810 are a confirmation that a previous release signal, such as signals Release 1260 and 1262, has been acted upon, and that releasing of the call is complete such that no other signals can be sent for this call to the side that has sent this signal. Thus, this is the last signal in any sequence.

UCM 414 can also return back to state Releasing 1226 upon the receipt of an input signal Star or Asterisk (*) 1818 from OCC 410, an input signal Star or Asterisk 1820 (*) from TCC 412, or a Protocol Conversion Engine 300 internally generated signal Star or Asterisk (*) 1882. It is noted that any signal Star or Asterisk (*) such as 1818, 1820, and 1822, is not an actual signal but is considered a catch-all signal appended to those states where a signal that is not normally expected as a part of the state, are typically handled. In other words, when UCM 414 is in state Releasing 1266, signals not normally handled by UCM 414 in this state can be sent from OCC 410, TCC 412, or the Protocol Conversion Engine 300. UCM 414 will then transition upon receipt of a "non-allowable" signal to state Releasing 1266.

FIG. 18 also shows that UCM 414 can transition from state Releasing 1266 to the same state upon the receipt of an input signal StatusRequest 1814 from TCC 412, or an input signal StatusRequest 1816 from OCC 410. Signals StatusRequest 1814 and 1816 imply a request for a status signal or a message is to be returned to the same side that sent the signal so that the call state can be returned to OCC 410 or TCC 412.

Figure 19:
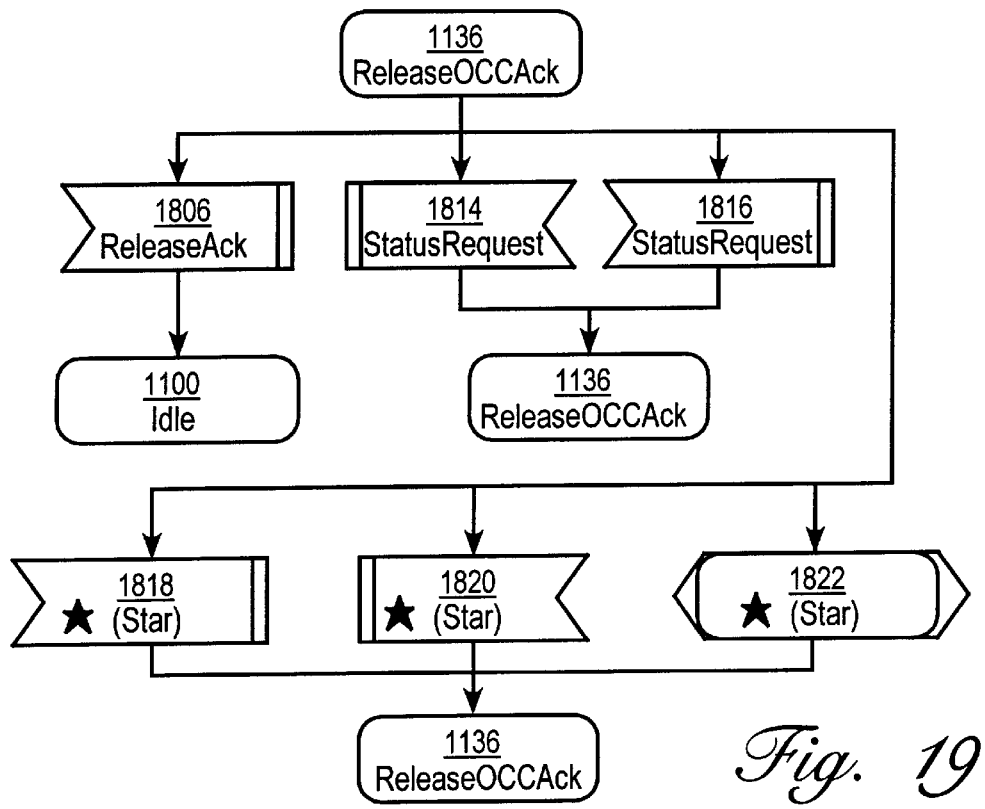
FIG. 19 is a state diagram of the state ReleaseOCCAck shown in FIG. 11.

FIG. 19 illustrates the allowable input signals and corresponding possible state transitions when UCM 414 is in the state ReleaseOCCAck 1136, as previously discussed in conjunction with FIGS. 11 and 12 above. When UCM 414 is in the Sate RelaseOCCAck 1136 and receives an input signal ReleaseAck 1806 from OCC 410, UCM 414 transitions to state idle 1100, as described in FIG. 10. In general, signals ReleaseAck 1806 or 1810 can be sent from either OCC 410 or TCC 412 to UCM 414 to confirm that a previous signal Release 1134 or 1264 has been acted uon, and that releasing of the call is complete. Upon completion of releasing of a call, no other signals can be sent for this call to the respective side, either OCC 410 or TCC 412, that has sent the signal. Thus, signals ReleaseAck 1806 or 1810 is the last signal of a call.

Alternatively, UCM 414 can transition from state ReleaseOCCAck 1136 back to the same state upon the receipt of input signal StatusRequest 1814 from TCC 412, or from a signal StatusRequest 1816 from OCC 410. Signals StatusRequest 1814 and 1816 were discussed above in conjunction with FIG. 18.

Also, UCM 414 transitions out of and into state ReleaseOCCAck 1136 upon receipt of input signal Star or Asterisk (*) 1818 from OCC 410, of input signal Star or Asterisk (*) 1820 from TCC 412, or an internally generated signal Start or Asterisk (*) 1822 sent from the Protocol Conversion Engine 300. These signals were discussed above in conjunction with FIG. 18.

Figure 20:
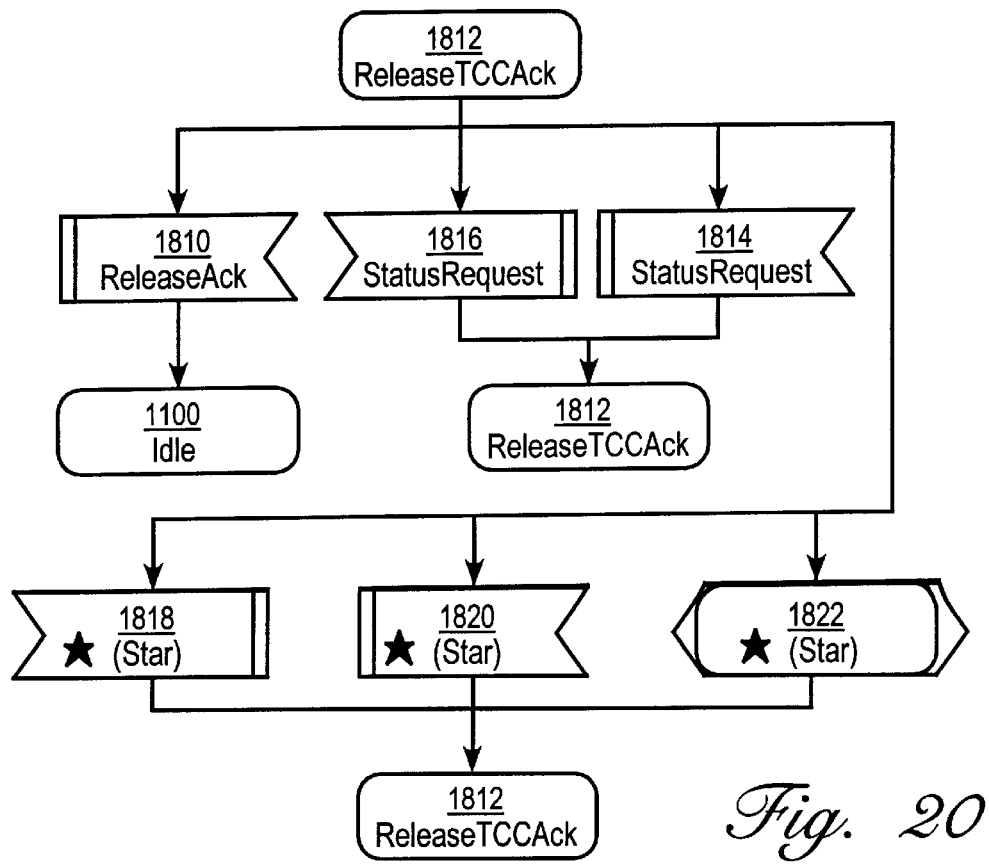
FIG. 20 is a state diagram of the state ReleaseTCCAck shown in FIG. 18.

FIG. 20 illustrates the allowable signals and state transitions of UCM 414 from the state Release TCCAck 1812. The actions of UCM 414 in this state are similar to the actions when in state ReleaseOCCAck 1136, except for the direction of the signals. Input signals StatusRequest 1814 and 1816 sent from OCC 410 or from TCC 412 allow UCM 414 to transition to state ReleaseTCCAck 1812. Similarly, either input signal Star or Asterisk (*) 1820 from OCC 410, input signal Star or Asterisk (*) 1818 from TCC 412, or Protocol Conversion Engine 300 internal signal Star or Asterisk (*) 1822 allow UCM 414 to transition to state ReleaseTCCAck 1812 upon receipt of the signals. Upon receipt of input signal ReleaseAck 1810 from TCC 412, UCM 414 transitions to state Idle 1100.

Figure 21A:
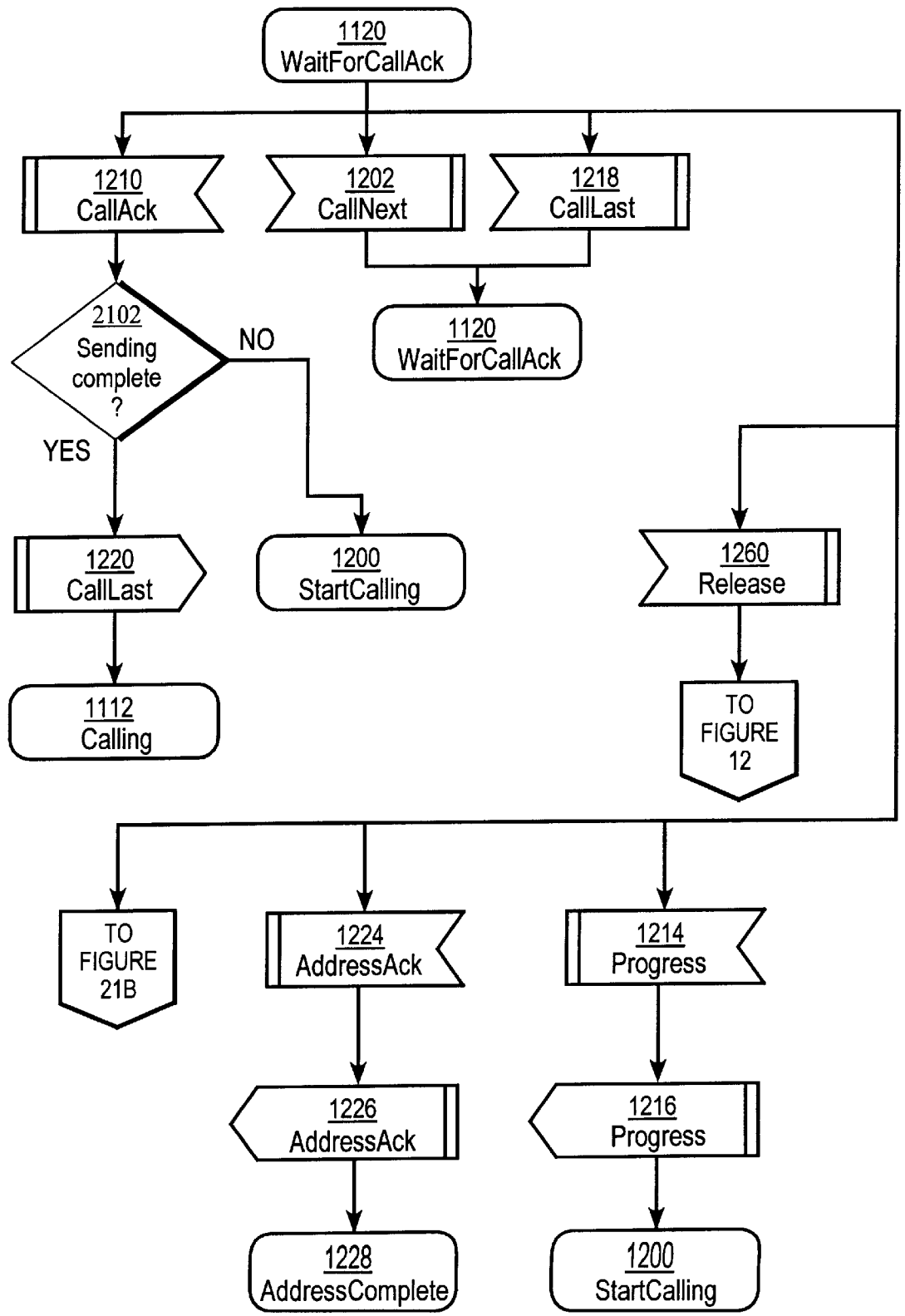
FIG. 21A and FIG. 21B are a state diagram of the state WaitForCallAck shown in FIG. 11.
Figure 21B:
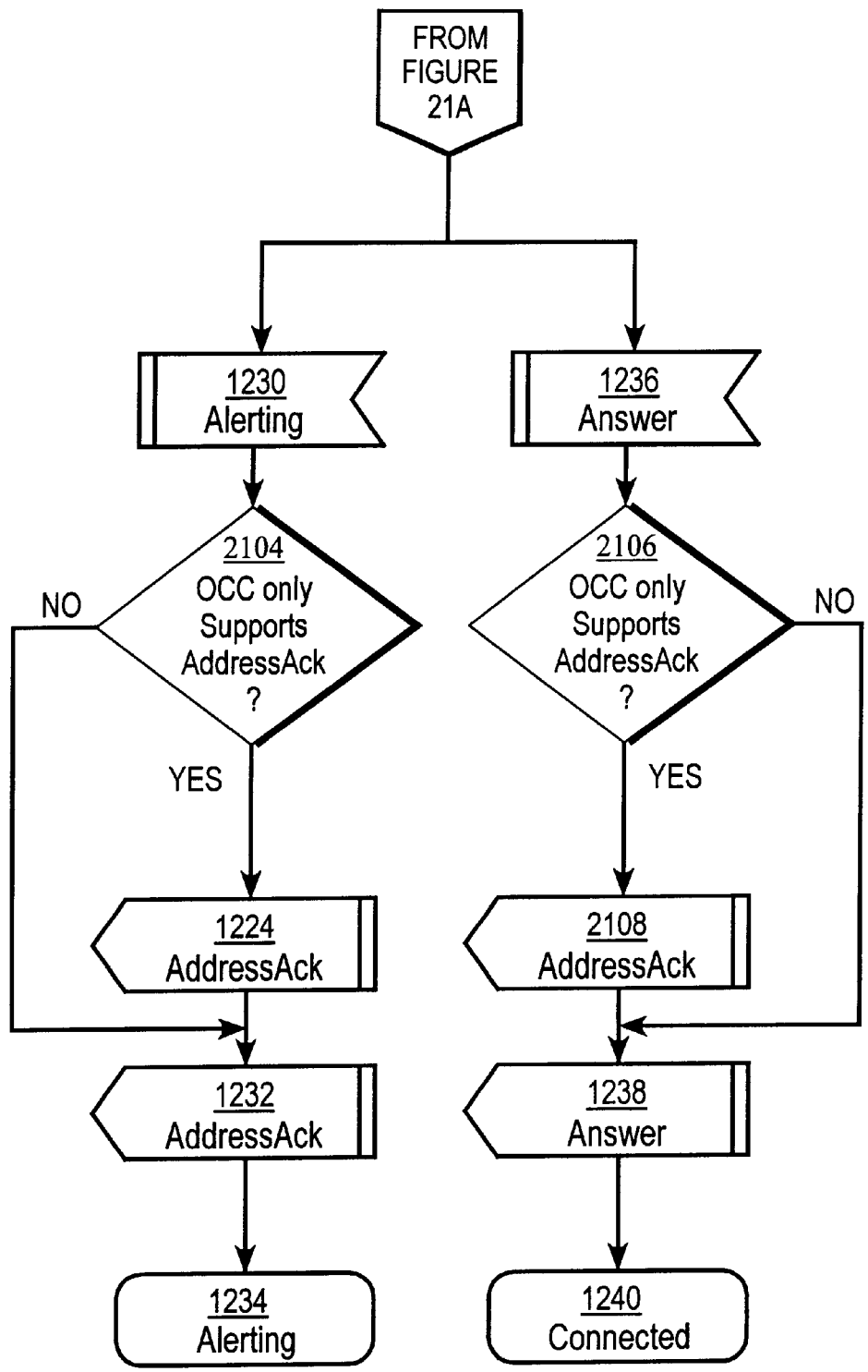

FIGS. 21A and 21B disclose state transitions when UCM 414 is in the state WaitForCallAck 1120 originally mentioned in conjunction with FIG. 11 above. When UCM 414 is in state WaitForCallAck 1120, UCM 414 can receive input signal CallAck 1210 from TCC 412 that moves UCM 414 into a decision 2102. Decision 2102 inquires whether sending of the dialed digits is complete. A negative response to decision 2102 (ie sending is not complete) enables UCM 414 to transition to the state StartCalling 1200 discussed above in conjunction with FIG. 12.

An affirmative response to decision 2102 prompts UCM 414 to send output signal CallLast 1220, discussed in conjunction with FIG. 12, to TCC 412 so that UCM 414 can then transition to the state Calling 1112, discussed in conjunction with FIGS. 12 and 13.

UCM 414 can also receive input signals CallNext 1202 and CallLast 1218. Either input signals CallNext 1202 or input signal CallLast 1218 enables UCM 414 to transition to state WaitForCallAck 1120.

If UCM 414 receives input signal Release 1260 from OCC 410 while in state WaitForCallAck 1120, UCM 414 transitions to decision 1262, as depicted in FIG. 21A by an off-page connector to FIG. 12.

UCM 414 can also receive input signal AddressAck 1224 from TCC 412, which results in the initiation of an output signal AddressAck 1226 propagated from UCM 414 to OCC 410 and then a transition to state AddressComplete 1228. Similarly if UCM 414 receives an input signal progress 1214 from TCC 414, it will propagate a corresponding output signal Progress 1216 and then transition to the state StartCalling 1200.

Upon receiving input signal Alerting 1230 from TCC 412 when ECM 414 is in state WaitForCallAck 1120, UCM 414 moves to a decision 2104. Decision 2104 inquires whether only OCC 410 supports signal AddressAck 1224. A negative response to decision 2104 prompts UCM 414 5o send output signal Alerting 1232 to OCC 410 after which UCM 414 transitions to state Alerting 1234, described above in the description of FIG. 12. Alternatively, on an affirmative response in decision 2104, UCM 414 generates output signal AddressAck 1224 to OCC 410, then generates signal Alerting 1232 also to OCC 410 before it transitions to the state Alerting 1234.

Similarly, when UCM 414 receives a signal Answer 1236 from TCC 412 when in state WaitForCallAck 1120, it enters a decision 2106 to determine if only OCC 410 supports signal AnswerAck 2108. If the answer is in the affirmative, UCM 414 generates signal AnswerAck 2108 to OCC 410, and then generates signal Answer 1238 to UCM 414 before moving to state Connected 1240. On the other hand, upon a negative response in decision 2106, which indicates that OCC 410 is not the only side that supports signal AnswerAck 2108, UCM 414 bypasses the generation of a signal AnswerAck 2108 and only generates output signal Answer 1238 to OCC 410 before it transitions to state Connected 1240.

Figure 22:
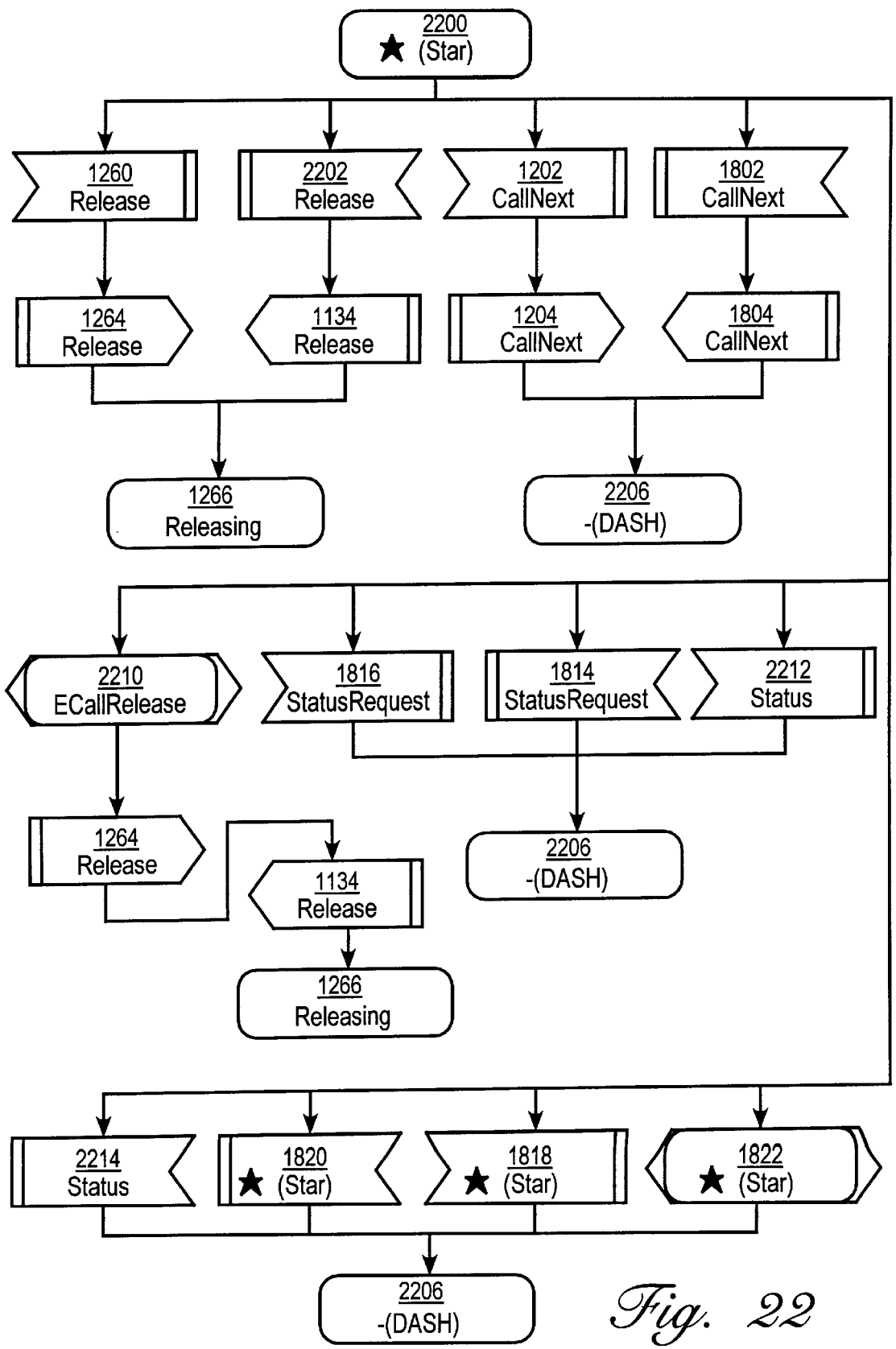
FIG. 22 is a state diagram of the state Star or Asterisk (*) state.

FIG. 22 depicts a state Star or Asterisk 2200, sometimes called state Star or pseudo-state asterisk or star or even state * 2200. The Star or Asterisk state denotes logic that should be executed in all states and is used as a short-hand notation. It is also used in those situations where a particular action or reaction is the same for every state so that it need not be replicated in the diagrams for all states. In FIG. 22, state Star or Asterisk 2200 represents a generic handling of signals common to all states. If in some state any non-standard handling of the same signals is needed, it is defined explicitly in that state. This explicit handling of signals in "real" states overwrites the implicit handling, defined in pseudo-state Star or Asterisk 2200.

Another pseudo-state is state Dash ("–") 2206, which is sometimes referred to as the "dash next state." It is used to mean that the terminating next state is identical to the originating state. Thus, a transition to pseudo-state dash ("–") means that no state change has occurred.

For example, if in any state UCM 414 receives input signals CallNext 1202 or 1802 from OCC 410 or TCC 412, respectively, UCM 414 sends output signals CallNext 1204 and 1804, respectively, and then transitions to state Dash 2206. This is interpreted to mean that UCM 414 remains in the same actual state that it was in before receiving the signal.

On the other hand, when UCM 414 receives input signal Release 1260 from OCC 410 or input signal Release 2202 from TCC 412 while in any state, UCM 414 respectively sends output signal Release 1264 to TCC 412 or output signal Release 1134 to OCC 410, and then transitions to state Releasing 1266.

UCM 414 can also receive a signal ECallRelease 2210 from the Protocol Conversion Engine 300 that initiates output signals Release 1264 and 1134 to TCC 412 and OCC 410, respectively, before moving to state Releasing 1266. Signals from the Protocol Conversion Engine 300 are generated for a variety of reasons, such as at the institution by an operator to shut down the system so that maintenance can be performed.

UCM 414 in any state can receive input signals StatusRequest 1814 and 1816 from TCC 412 and OCC 410, respectively, which enables UCM 414 to transition to state Dash 2206. Similarly, an input signal Status 2212 sent from OCC 410, or an input signal Status 2214 sent from TCC 412 can be sent to UCM 414 to enable it to transition to state Dash 2206. Status signals 2212 and 2214 can be sent from and received by both OCC 410 and TCC 412 via UCM 414 to answer with status information from OCC 410 or TCC 412.

Lastly, FIG. 22 shows the use of an input signal Star or Asterisk (*) 1818 from OCC 410 or input signal Star or Asterisk (*) 1820 from TCC 412 being sent to UCM 414 and then a transition by UCM 414 to the state Dash 2206. A signal Star or Asterisk (*) in SDL notation is used to represent all other signals for which no transition is specified elsewhere. The use of state Star or Asterisk 2200 in combination with an Asterisk signal and a transition to a Dash 2206 state is universal notation that is used to show that sometimes a signal will be ignored by UCM 414. This notation is sometimes omitted because it is understood to exist in all state machines. In the context of FIG. 22, it means that in all states, the reception of an undefined signal will cause a state transition to the same state, or effectively, no transition will occur.

Figure 23:
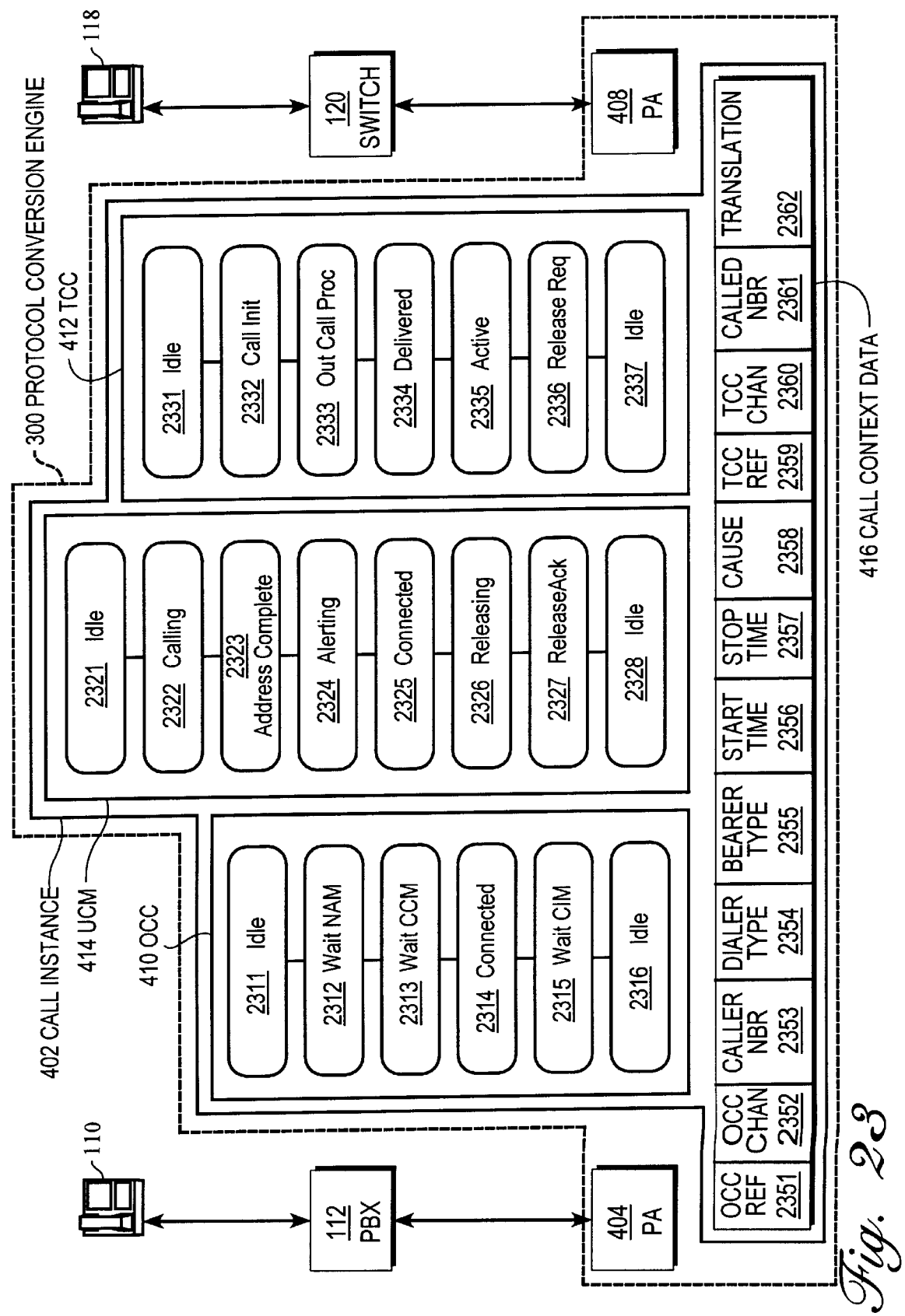
FIG. 23 is an exemplary schematic diagram depicting an illustrative telephone call between subscribers of telephone service supported by network elements using heterogenous protocols as facilitated by the present invention.

With reference now to FIG. 23, the operation of Protocol Conversion Engine 300 can be more easily understood by following the progression of a particular, exemplary standard call, called a Call Instance 402 and graphically denoted, and the changes in the states of OCC 410, UCM 414 and TCC 412. In the context of FIG. 1, a call instance will be made by an originating telephone or calling telephone, denoted User 110, through PBX 112 connected to Universal Protocol Converter 100b and then through Network 102 to a Network Node or Switch 120 and the terminating telephone or called telephone, denoted User 118. For the purposes of this example, PBX 112 uses a conventional variant of protocol DPNSS and Network Switch uses a conventional variant of protocol ETSI PRI.

OCC 410, UCM 414 and TCC 412 are depicted as having a plurality of states that are entered from the top to the bottom. It is noted that the states depicted for the three state machines are exemplary and those entered depend upon the particular protocol of the machine interfacing with OCC 410 and TCC 412, and depend upon the particular events occurring during the call for UCM 414. OCC 410 is depicted as having transitions between state Idle 2311, state WaitNAM 2312, state WaitCCM 232, state Connected 2314, state WaitCIM 2315 and state Idle 2316. WaitNAM 2312 is the state indicating that a network node, that has sent address signaling to a terminating network node, is awaiting acknowledgment from the terminating network that complete address signaling has been received. WaitCCM 2313 is the state indicating that a terminating network node is waiting for the subscriber to terminate the call. WaitCIM 2315 is the state in which a network node, that has previously sent a CRM message to a second network node, is awaiting the receipt of a CIM from the second network node. UCM 414 is depicted as having transitions between state Idle 2321, state Calling 2322, state AddressComplete 2323, state Alerting 2324, state Connected 2325, state Releasing 2326, state WaitRlsAck 2327, and state Idle 2328. TCC 412 is depicted as having transitions between state Idle 2331, state CallInit 2332, state OutCallProc 2333, state Delivered 2334, state Active 2335, state ReleaseReq 2336, and state Null 2337. For the particular call instance of the example, Call Context 416 has 12 individually addressable memory cells, a cell 2351 for the OCC Ref, a cell 2352 for the OCC Chan, a cell 2353 for the Caller Number, a cell 2354 for the Dialer Type, a cell 2355 for the Bearer Type, a cell 2356 for the Start Time, a cell 2357 for the Stop Time, a cell 2358 for Cause, a cell 2359 for TCC Ref, a cell 2360 for TCC Chan, a cell 2361 for Called Number, and a cell 2362 for Translated.

In the first step, a PBX 112 subscriber picks up the handset of telephone 110 and dials a number. PBX 112 receives the dialed digits on an available D-channel and sends an ISRM_C message to Protocol Adapter 404 of UPC Protocol Conversion Engine 300 of Universal Protocol Converter 100. An ISRM_C message is the first message that a network node (in this case a switch) received indicating that a new call is being presented. This message contains the following components: Call Reference, Bearer Capability (also known as SIC in the case of DPNSS protocol), Channel Number, Calling Line Type, Originating Line Identity, and Dialed Address. The three state machines 410, 412, and 414 are all set up for the call instantiation in their respective initial Idle states 2311, 2321 and 2331. Protocol Adapter 404 passes the Layer 3 information to OCC 410.

In OCC 410, the logic of the program disassembles the ISRM_C message into its generic components and stores them in the appropriate cells in Call Context 416: Call Reference being stored in cell 2351, Bearer Capability (also being known as Bearer Type) being stored in cell 2355, Channel Number being stored in cell 2352, Calling Line Type being stored in cell 2354, Originating Line Identity (sometimes referred to as "Dialed Address") being stored in cell 2361.

OCC 410 sends a signal Call 1130 to the UCM 414 and then moves into state WAITNAM 2312. When signal Call 1130 is received in UCM 414, it is passed on to TCC 412, and UCM 414 moves into state Calling 2322. Signal Call 1110 is received by TCC 412 and the logic of in TCC 412 assembles a Setup message from the information in Call Context 416 which contains the following components: TCC Call Reference, Bearer Capability, TCC Channel ID, Calling Party Number, and Called Party Number. TCC Call Reference is also stored in cell 2359 and TCC Channel is stored in cell 2360. In this example, cell 2362, labeled "translated" of Call Context 416 contains the same value as cell 2361. The values in cells 2361 and 2362 will normally be the same, unless number translation is enabled. If number translation is enabled, cell 2361 will contain the Called Number and cell 2362 will contain the Translated Called Number.

TCC 412 moves to state CallInitiated 2332 and the Setup message is sent to Protocol Adapter 408. Protocol Adapter 408 adds the Layer 2 information and the entire message is transmitted to network Switch 120. Network Switch 120 then responds to the Setup message with a CallProceeding message that is passed to TCC 412 through Protocol Adapter 408. TCC 412 receives the CallProceeding message and moves to state OutgoingCallProceeding 2333. TCC 412 then sends a signal AddressAck to UCM 414. When signal AddressAck is received by UCM 414, it moves to state AddressComplete 2323. No message is sent by UCM 414 to OCC 410. Network Switch 120 also sends a Ring signal to Telephone 118 causing it to ring.

Once Telephone 118 is ringing, Network Switch 120 sends signal Alerting to Protocol Adapter 408, which in turn sends it to TCC 412. TCC 412, in turn, sends signal Alerting to UCM 414 and moves to state CallDelivered 2334. UCM 414 passes signal Alerting to OCC 410 and moves to state Alerting 2324. When signal Alerting is received in OCC 410, the logic of the program assembles a NAM message from the information in Call Context 416 and OCC 410 moves to state WaitCCM 2313.

When Telephone 118 is answered, Network Switch a5 sends a signal Connect to Protocol Adapter 408, which passes it to TCC 412. TCC 412 receives a signal Connect, and in turn sends a signal Answer to UCM 414 and moves to state Active 2335. When UCM 414 receives signal Answer, the call Start Time is written into cell 2356 of Call Context 416. UCM 414 then sends signal Answer to OCC 410 and moves into state Connected 2325. Signal Answer is received by OCC 410 and the logic of the program assembles a CCM message from the information in Call Context 416. OCC 410 moves to state Connected 2314.

The parties on telephones 110 and 118 then carry out their conversation.

When called Telephone 118 is hung up, network switch 120 sends a Disconnect message to Protocol Adapter 408 which in turn sends it to TCC 412. The logic of the program TCC 412 causes a read of the clearing cause code and saves this as a generic internal clearing cause in cell 2358 of Call Context 416. TCC 412 responds to the Disconnect message by sending a Release message to Protocol Adapter 408. Signal Release is then sent to UCM 414 and TCC 412 moves to state ReleaseRequest 2336. When UCM 414 receives signal Release, it causes the Stop Time to be written into cell 2357 of Call Context 416, and then sends signal Release to OCC 410. UCM 414 then moves into state Releasing 2326.

When signal Release is received in OCC 410, the logic therein assembles a CRM message from the information in Call Context 416, and OCC 410 moves to state WaitCIM 2315. A CRM message is the request by which a network node notifies another network node with which it has an established bearer connection, that it wishes the connection to be released. OCC 410 then sends message CRM to Protocol Adapter 404, which in turn sends it to PBX 112. PBX 112 responds to message CRM by sending a signal CIM which passes through Protocol Adapter 404 into OCC 410. OCC 410 sends a first signal ReleaseAck to UCM 414, and moves to state Idle 2316. When signal ReleaseAck is received by UCM 414, it moves into state WaitReleaseAck 2327.

When the release is complete, Network Switch 120 sends a message ReleaseComplete through Protocol Adapter 408 to TCC 412. A second signal ReleaseAck is then sent to UCM 414, and TCC 412 moves into state Idle 2337. When the second signal ReleaseAck is received by UCM 414, it moves to state Idle 2328 and the Call Instance is ended. Selected parts and sometimes all of the information in Call Context 416 are saved to hard disk or other non-volatile storage media, that which is saved being determined by the particular management functions desired (e.g. billing information or the frequency that a number is called).

As one skilled in the art will recognize, the elements and processes described are for purposes of the exemplary embodiment, depicted as being hosted within a single computer platform. The operation of the present invention does not require, and is therefore not limited to, the use of a single host for all parts. The existence of conventional data communications and inter-process networking technology permits the distribution of these processes in accordance with the performance requirements of the embodiment of the invention.

OVERVIEW OF CAS PROTOCOL CONVERSION

A method and apparatus for channel associated signaling protocol conversion is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Generally, an embodiment of a protocol conversion system using channel associated signaling comprises a protocol converter that executes a protocol conversion software application, coupled to a CAS Module. In combination, these elements provide CAS to CCS signal conversion.

In the preferred embodiment, a channel associated signaling protocol conversion system comprises a universal protocol converter coupled to a Channel Associated Signaling module; a conversion engine in the protocol converter that comprises an Execution Environment, a Universal Call Model application, a Channel Associated Signaling Application Module, a Call Control Conversion application, and a Configuration Control and Element Management mechanism; and optionally, a general-purpose computer system for carrying out configuration and other general-purpose applications. The Universal Call Model application implements a destination-end SSJ call control protocol, for example, ISUP signaling.

Preferably, channel associated signaling protocol conversion is carried out in the context of a general-purpose protocol converter that provides universal switched voice network protocol conversion. The protocol converter is integrated with a CAS Module that provides real time interpretation of in-band CAS line, register and supervision signals. CAS signals are adapted to an internal call model, and subsequently converted to CCS signals using the conversion engine of the protocol converter. Optional trend and statistical analysis reporting may also be provided based on scanning capabilities and real time reporting of signaling anomalies and irregular events detected on the voice channel. The CAS Module also provides a hardware interface and demarcation point for termination of digital signaling links, and for timeslot interchange of the signaling channels.

The invention may be implemented using A-links or F-links of a network. SS7 networks have three types of signaling points, namely Service Switching Points, Signal Transfer Points, and Service Control Points. Service Switching Points or SSPs are switches that originate, terminate, or tandem calls. An SSP sends signaling messages to other SSPs to set up, manage, and release voice circuits required to complete a call. An SSP may also send a query message to a centralized database or Service Control Point (SCP) to determine how to route a call.

Signal Transfer Points (STPs) are packet switches that route network traffic between signaling points. An STP routes each incoming message to an outgoing signaling link based on routine information contained in the message. An STP acts as a network hub, making an SS7 network more efficient by eliminating the need for direct links between signaling points.

Link types A, B, C, D, E, and F are defined according to their use in the network. An "A" (access) link connects a signaling end point, such as an SCP or SSP, to an STP. Only messages originating from or destined to the signaling end point are transmitted on an A link. An "F" (fully associated) link connects two signaling end points, such as SSPs or SCPs. F links are not usually used in networks that have STPs because the STPs serve a similar function.

PREFERRED SYSTEM ARCHITECTURE

Figure 24A:
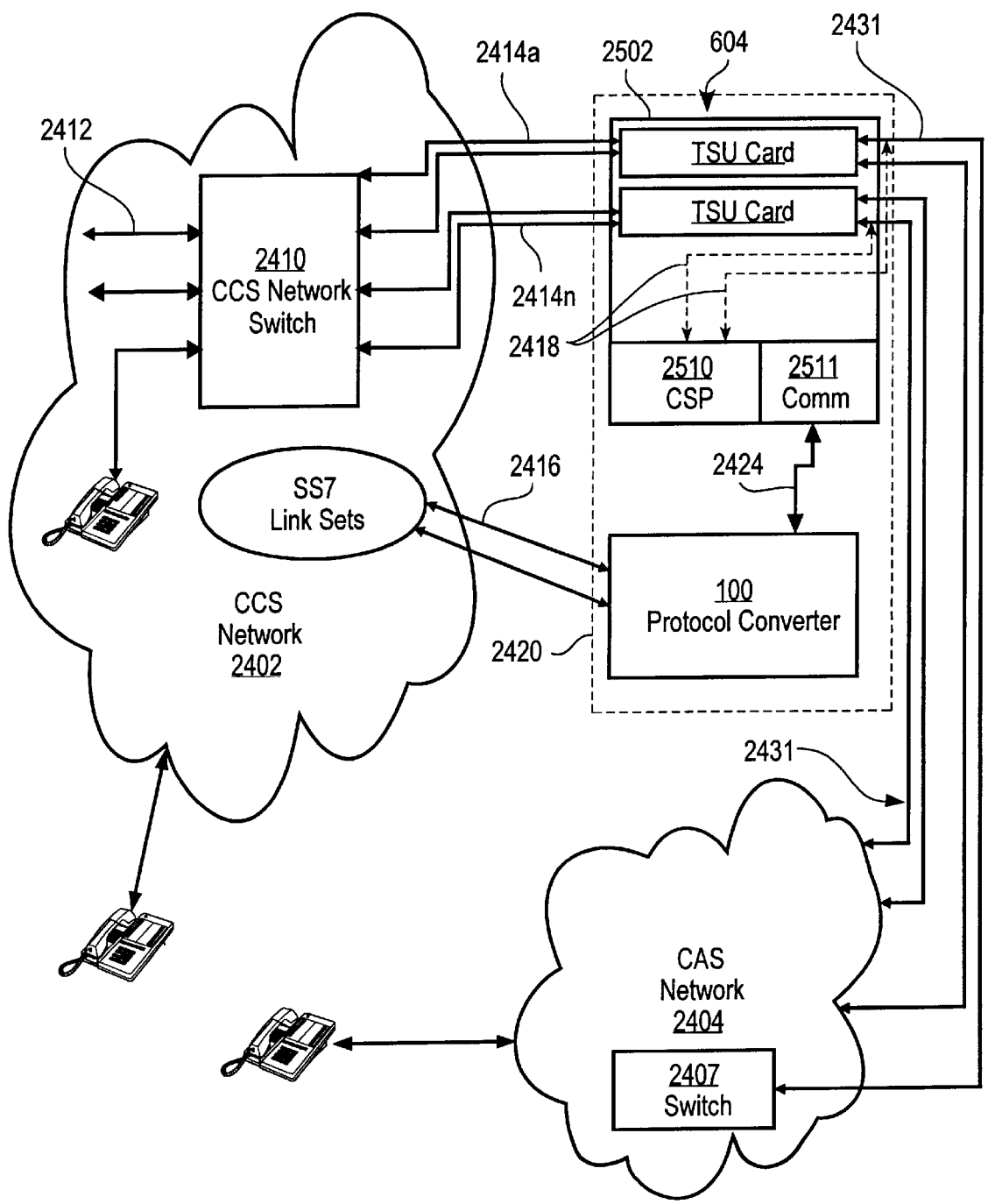
FIG. 24A is a block diagram of a protocol conversion system for use with a CAS network and a CCS network using A links.

FIG. 24A is a block diagram of the context and main components of a preferred embodiment of a channel associated signaling protocol conversion system 2420.

Generally, the system 2420 operates in the context of the public switched telephone network (PSTN) in which a first party to a call is connected to a CCS network 2402 and a second party to the call is connected to a CAS network 2404. Each network 2402, 2404 comprises end stations such as residential telephones, private branch exchanges (PBXs), voice mail equipment, computers, etc. Each end station is coupled to a trunk that leads to a telephone company central office (CO). The trunk is coupled to one or more central office switches.

For example, one or more inter-switch trunks 2412 connect CCS switches to one another, within the central office and between central offices. In the preferred embodiment, the inter-switch trunks 2412 carry voice and signaling information on E1 or T1 circuits. The inter-switch trunks are coupled to a network switch 2410. The network switch 2410 carries out switching of calls to or from the inter-switch trunks 2412 and to or from trunks logically opposite the inter-switch trunks 2412. In one embodiment, there are one or more ISUP trunk groups 2414a–2414n. The ISUP trunk groups 2414a–2414n carry voice band signals conforming to the ISUP protocol. An example of a suitable network switch 2410 is the Northern Telecom DMS-100. Each individual circuit within the trunk groups 2414a–2414n may be identified by a unique circuit identification code (CIC) that comprises a numeric identifier for a voice traffic circuit.

In the preferred embodiment, trunks 2414a–2414n are coupled from the network switch 2410 to a Channel Associated Signaling Module (CAS Module) 604, the details of which are presented elsewhere herein. For example, CCS trunks 2414 are coupled to a network interface card in the CAS Module 604 that is coupled to a Communication Signal Processor 2510. The CAS Module 604 is also described herein in connection with FIG. 6 and other drawing figures.

One or more A link signaling channels 2416 are coupled between the CCS network 2402 and a protocol converter 100. Call setup information and other signaling information is communicated between the network switch 2410 and protocol converter 100 using the A links. Call control information may be communicated over the same signaling network or a separate network; the use of the same or a separate network differs in different regions around the world. The A links carry signals that conform, in the preferred embodiment and merely by way of example, to a CCS SS7 protocol, such as ISUP.

Also coupled to the CAS Module 604, logically opposite the trunks 2414a–2414n, are one or more CAS trunks 2431. Each of the CAS trunks 2431 carries interleaved voice and signaling information between the CAS Module 604 and the CAS network 2404. In the preferred embodiment, the CAS signaling information conforms to the R1.5 variant of the Channel Associated Signaling protocol, and the voice information is transmitted over DS-0 channels of T1 or E1 circuits that have been channelized. Use of this particular CAS variant is not required, and any CAS protocol or variant thereof may be used. Also, voice information may be sent over other circuit types.

A universal protocol converter 100 is coupled to the CAS Module 604 by a communications interface 2511 via a digital connection 2424. In the preferred embodiment, the communications interface 2511 is an Ethernet interface, and the digital connection 2424 carries messages that conform to Transmission Control Protocol/Internet Protocol (TCP/IP). Any other suitable communication interface and transport protocol may be used. Also, the CAS Module 604 may be integrated into the protocol converter 100, in which case no digital connection 2424 may be needed. Digital connection 2424 functions to pass messages between the protocol converter 100 and the Trunk Service Units 2502, so that the protocol converter and Trunk Service Units can carry out a digital conversation concerning the form and content of analog signals and instructions to be communicated to and from the CAS Module 604.

As described further below, a LAN connection 2418 carries translated CAS signals between Communication Signal Processor 2510 and other elements of CAS Module 604.

Figure 24B:
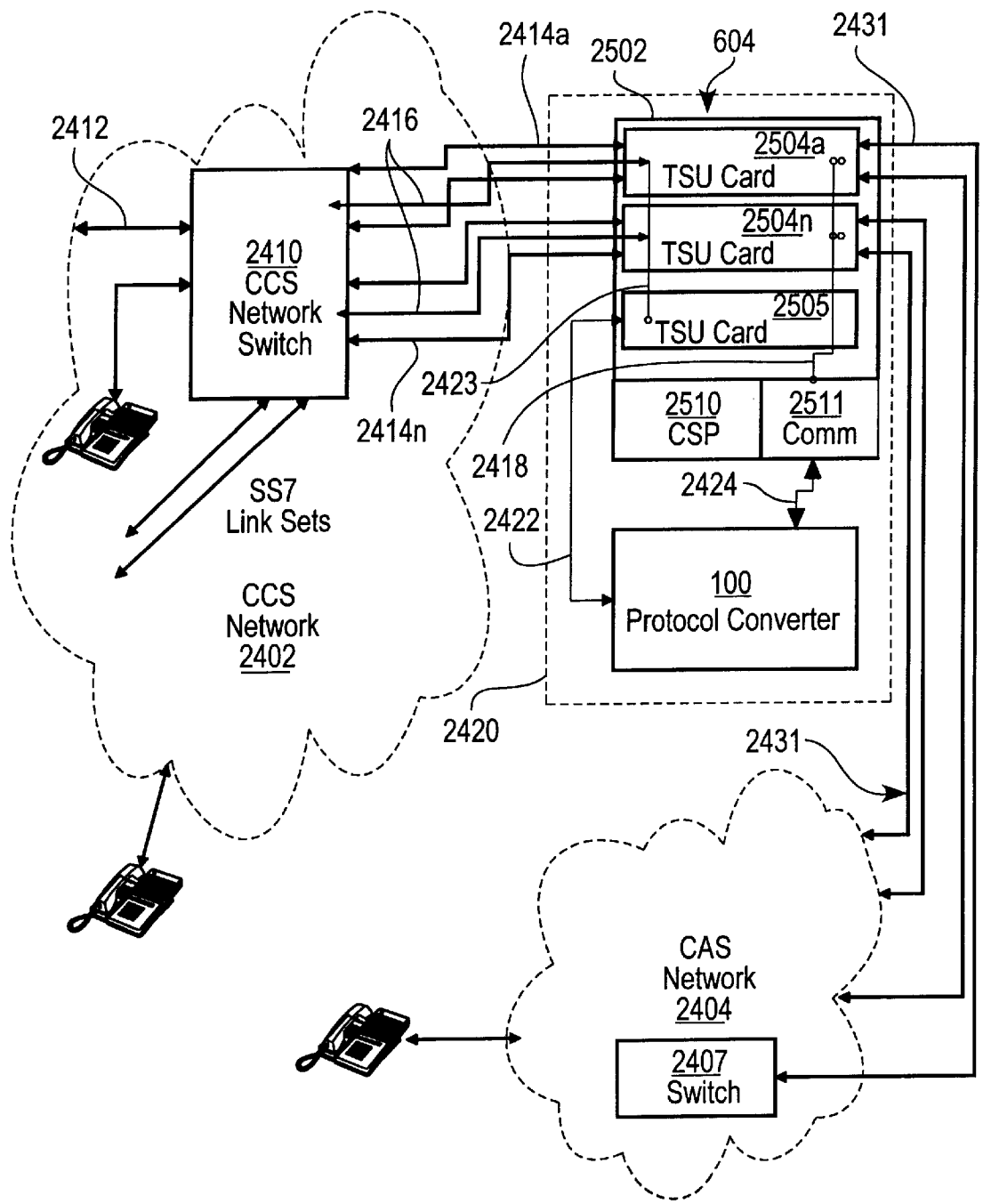
FIG. 24B is a block diagram of a protocol conversion system for use with CCS networks using F links.

FIG. 24B is a block diagram of main components of a preferred embodiment of a channel associated signaling protocol conversion system 2420 configured to connect to F links of an SS7 network. In this configuration, links 2416 are coupled between the network switch 2410 and CAS Module 604. The links 2416 may be SS7 F links or ISDN Primary Rate Interface (PRI) signaling channels.

In the configuration of FIG. 24B, universal protocol converter 100 is coupled to the CAS Module 604 by a digital connection 2422. Connection 2422 routes CCS protocol messages from trunks 2414 to the protocol converter 100 without modification. That is, the CAS Module 604 does not modify the signal information arriving from trunks 2414; it is passed directly through to protocol converter 100 via connection 2422.

UNIVERSAL PROTOCOL CONVERTER

In the preferred embodiment, the universal protocol converter 100 comprises the structure and functions described herein in connection with FIG. 1 through FIG. 23, inclusive.

Under control of the operating system, the protocol converter 100 executes originating and terminating state machines that are constructed based upon definitions prepared in a protocol definition language or Message Definition Language (MDL). The MDL defines message states and message formats for CAS protocol messages. An MDL is used to construct the originating call control (OCC) state machine of the protocol converter when CAS protocol is being used at the originating side of a call. The MDL is used to construct the terminating call control (TCC) state machine of the protocol converter when CAS protocol is being used at the terminating side of a call. A different MDL designed for CCS protocol is used to construct an originating or terminating call control state machine if CCS protocol is used on that side of the call.

In cooperation with the MDL, Communication Signal Processor 2520 converts in-band signaling information to out-of-band signaling information. In a broad sense, the CAS Module 604 collects digits that are transmitted in-band from a CAS source such as a switch, as well as information conveyed by "stolen bits" in the message and other tones, converts the digits to messages understandable by protocol converter 100, and passes the messages to the protocol converter.

In this configuration, the protocol converter 100 carries out process management, intrusive termination of CCS7 links, CCS7 MTP level 2 and 3, decoding and encoding of ISUP messages, ISUP circuit and destination management, conversion of call control messaging, call state management, alarm management, and configuration control.

The protocol converter 100 is based upon an execution environment that allows the protocol converter to function as a true network element. This includes support for fault-resistant operation, dynamic re-configuration, network management, alarming, statistics collection, reporting, etc.

Call establishment, progress, and disconnect messages are converted and managed by a conversion engine 300 that uses a Universal Call Model. The software architecture of the conversion engine 300 applies linked state machines 410, 412, 414 to be driven by external protocol stimulus. Another state machine can be linked when access to an external system is required to invoke intelligent network features or other external applications.

Call dependent data elements are converted to an internal format via protocol adapters 404, 406, 408, and managed as a call context 416 for each call in progress. As each incoming message is received, context data is managed through a multi-stage conversion process that allows for all applicable data elements to be passed through the conversion engine 300. Call context 416 is maintained in an open memory block for the duration of the call, allowing all state objects access to previously stored data when required for subsequent message encoding or decoding. Outgoing conversion is rule-based using data that can originate in call context or from user defined look-up tables. As an example, a called party number can be screened, analyzed, translated or manipulated prior to conversion to the outgoing side.

CHANNEL ASSOCIATED SIGNALING APPLICATION MODULE

Figure 25A:
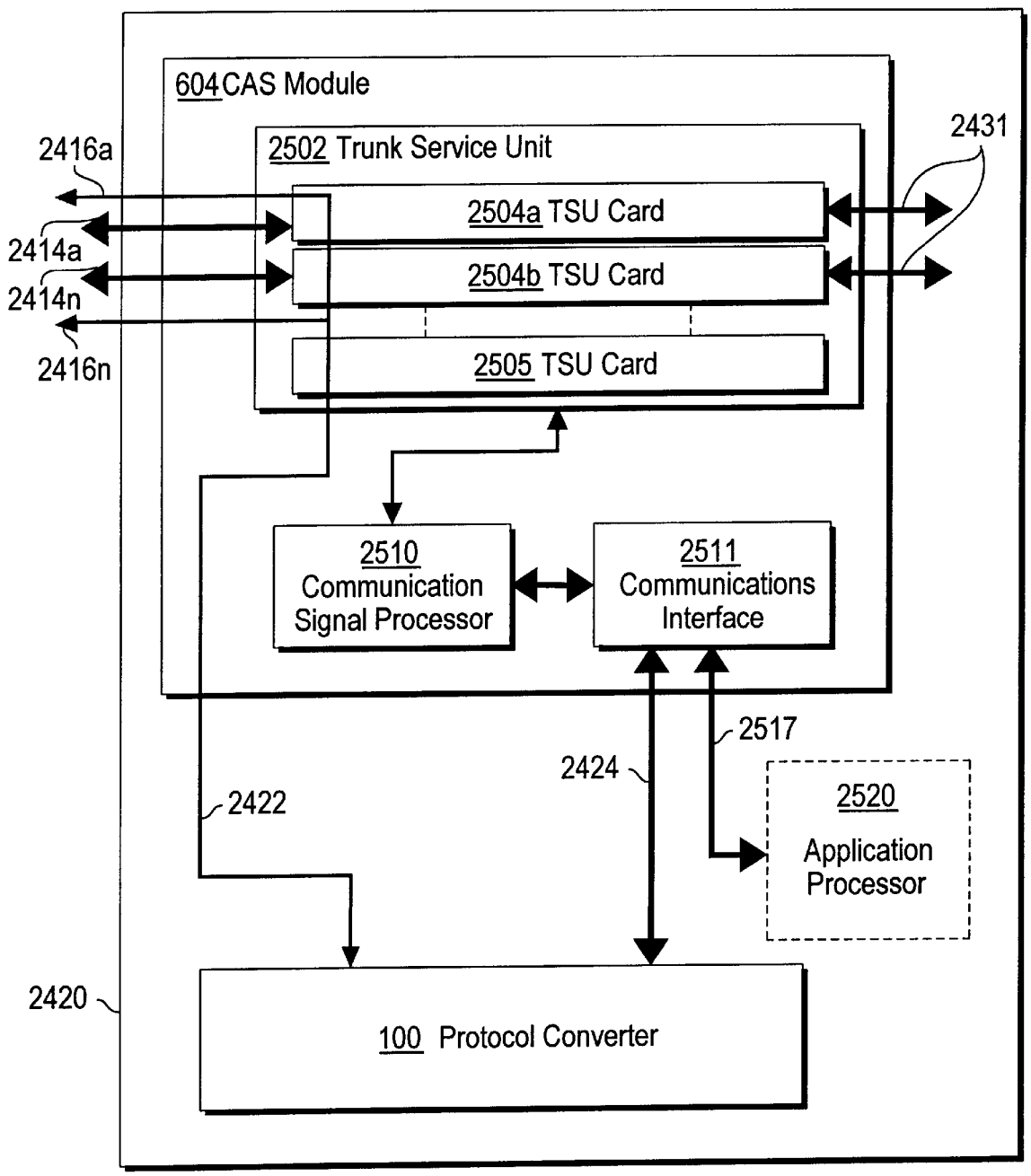
FIG. 25A is a block diagram of hardware elements of a channel associated signaling module.

FIG. 25A is a block diagram of a preferred embodiment of hardware elements of the CAS Module 604 in the configuration of FIG. 24B.

CAS Module 604 comprises one or more Trunk Service Units 2502, a Communication Signal Processor 2510, and an optional external Application Processor 2520. Trunk Service Unit 2502 comprises one or more first TSU cards 2504a, 2504b, through 2504n, and one second TSU card 2505. Each of the first TSU cards 2504a–2504n is associated with and coupled to one of the CCS trunk groups 2414a–2414n and one of the CAS trunks 2431. Thus, each of the first TSU cards can accept connections to both the CAS and CCS networks. Each trunk group 2414a–2414n carries voice information and signaling information.

Logically, circuitry in each of the first TSU cards 2504a–2504n is organized in a CAS side and a CCS side. The CAS side of each first TSU card has a digital signal processor (DSP) that conceptually listens for tones in the bearer channel transmissions and can insert digitized tones into the transmissions. The CAS side also senses bits that have been "stolen" from the encoded voice transmission and which are used to signify events such as a phone going off hook or on hook. The CAS side is also coupled to the Communication Signal Processor 2510, directly or indirectly through LAN connection 2418. Events sensed by the CAS side are converted to short messages and transmitted to the Communication Signal Processor 2510.

The CCS side of each of the first TSU cards 2504a–2504n can be configured to accept T1 connections or E1 connections that include a signaling channel in the transmission, as in the case of ISDN-PRI and SS7 F-links. Incoming signaling channel data is extracted from the transmission and sent over an ancillary connection 2423 to the second TSU card 2505. Preferably, the ancillary connection 2423 is part of the backplane of CAS Module 604 and is separate from the connection 2422 used for sending CAS events to Communication Signal Processor 2510.

The second TSU card 2505 is coupled to protocol converter 100 by connection 2422. The second TSU card 2505 receives data from CCS signaling frames, and re-channelizes the frames to be sent to the protocol converter 100 over connection 2422.

In this configuration, when protocol converter 100 is transmitting CCS messages, the messages flow from protocol converter 100, over digital connection 2422 to the second TSU card 2505, through the ancillary connection 2423 to the first TSU cards 2504a–2504n, which insert the data into the CCS signaling channel.

In the preferred embodiment, there may be multiple Trunk Service Units 2502. The TSU Cards and Trunk Service Units may be organized in one or more card cages that are mounted in one or more bays. Communication Signal Processor 2510 is coupled to each of the TSU cards 2504a–2504n by LAN connection 2418. The Communication Signal Processor 2510 processes in-band signaling events detected by the TSU cards 2504a–2504n. The Communication Signal Processor 2510 sends messages to trunks 2431 in response to and under the direction of messages sent to Communication Signal Processor 2510 by protocol converter 100 over link 2424. In general, Communication Signal Processor 2510 instructs Trunk Service Units 2502 what to do in order to process a call, for example, to go off hook, send digits, etc. Preferably, the Communication Signal Processor 2510 is capable of managing multiple Trunk Service Units 2502.

The Communication Signal Processor 2510 can be configured as a single processor or fault-tolerant dual processor system. Preferably, the Communication Signal Processor 2510 is a fault tolerant, dual processor system, and TSU cards 2504a–2504n are coupled to the Communication Signal Processor 2510 using a LAN or backplane. In one embodiment, trunks 2414 and trunks 2431 are connected to the TSU cards 2504a–2504n using DB15 or RJ45 connectors located on the back of the TSU card cage. The Communication Signal Processor 2510 and the Trunk Service Unit 2502 each have a power supply that provides 90VAC to 240VAC (50 Hz to 60 Hz) or 48VDC supply voltages.

Application Processor 2520 preferably comprises a fault-tolerant, hot-pluggable computer system having, in one embodiment, a processor, 32 Mb main memory (RAM), and a large mass storage device, such as a 1.8 GB hard disk drive. Application Processor 2520 is coupled to the Communication Signal Processor 2510 through the communications interface 2511 by a connection 2517. The connection between Application Processor 2520 to communications interface 2511 may be a direct local connection, or there may be an intermediary local area network, wide area network, or global network. Such a configuration allows for remote configuration, inspection and testing of CAS Module 604 by Application Processor 2520. In the preferred embodiment, Application Processor 2520 is configured in the form shown in FIG. 29 and described further herein. For example, suitable computing platforms include computers that are commercially available from Stratus or Sun Microsystems, Inc.

In this configuration, the system 2420 provides an interface to analog local exchanges, digital local exchanges and PBXs that employ Channel Associated Signaling. Although certain connections to the CAS Module 604 are described as E1 trunks or T1 trunks, the trunks may have other configurations. For example, conversion from trunks 2431 can be accomplished using a channel bank equipped with appropriate channel units.

Under control of Communication Signal Processor 2510, each TSU card 2504a–2504n can drop and insert signaling information to and from CAS channels. In this context, "insert" refers placing signaling information into empty frames of a channel and "drop" means to clearing signaling information from frames of a channel. Dropping and inserting signaling information is done by the TSU cards under control of Communication Signal Processor 2510 which in turn is controlled by protocol converter 100. In this configuration, the TSU cards have no independent control over signaling events that are sent to or from trunks 2414. The TSU cards pass messages arriving on trunks 2431 to protocol converter 100 via digital connection 2424. The protocol converter 100 sends messages to be placed on trunks 2424 to the TSU cards using connection 2422.

Figure 25B:
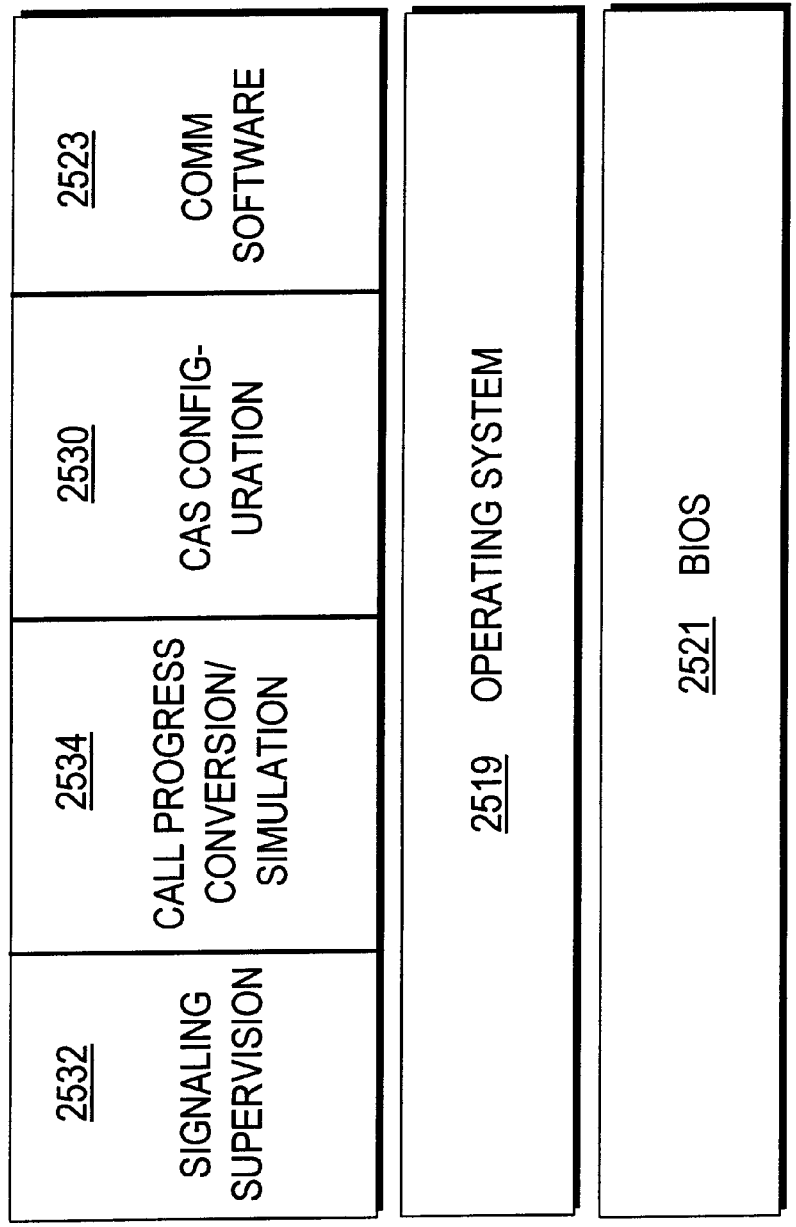
FIG. 25B is a block diagram of software elements of a channel associated signaling module.

FIG. 25B is a block diagram of a preferred embodiment of the software architecture of Communications Signal Processor 2510 and Communications Interface 2511 shown in FIG. 25A. Communications Signal Processor 2510 preferably executes a basic input/output system (BIOS) 2521 and a server-class operating system 2519. An example of a suitable operating system 2519 is the Microsoft NT Server™ Operating System. The operating system 2519 may also be a kernel-based operating system, such as UNIX, a derivative of UNIX, Solaris®, etc., in which case BIOS 2521 is not required.

Under control of the operating system 2519, the processor assembly also executes CAS Signaling Supervision Software 2532, CAS Call Progress Conversion/Simulation Software 2534, and CAS Configuration Software 2530. In an alternate embodiment, the functions of CAS Signaling Supervision Software 2532, CAS Call Progress Conversion/Simulation Software 2534, and CAS Configuration Software 2530 are integrated in a single software module called Signaling Supervision Software 2532. In another embodiment, CAS Configuration Software 2530 is executed by Application Processor 2520; this embodiment enables the CAS Module 604 to be configured remotely.

Communications software 2523 coordinates operation of communication interface 2511. For example, communications software 2523 is a TCP/IP driver.

CAS Signaling Supervision Software 2532 can decode and interpret CAS protocols, generate CAS line and register signaling, and identify and report on protocol anomalies. Further, CAS Call Progress Conversion/Simulation Software 2534 functions to track call progress supervision and call progress events, generate and insert call progress tones and supervision events in response to commands from protocol converter 100, and analyze CAS call progress events and report any identified anomalies. CAS Call Progress Conversion/Simulation Software 2534 also carries out message simulation. In this context, "simulation" means creating a message that simulates a call-related action or a message in a foreign protocol. Such messages, when sent to the Protocol Converter 100, enable it to perform protocol conversion and complete calls. Also preferably, the CAS Module 604 provides alarm and module status indications, provides an E1/T1 facility monitor, and provides cross connect functions.

In one preferred embodiment, CAS Signaling Supervision Software 2532 is configured to cause the CAS Module 604 to perform the following functions. CAS Module 604 will perform all timings required to receive and drive line signals. Some of these timings and persistency values may be passed to CAS Module 604 in a startup or initialization message. This enables the CAS Module 604 to be updated and adapted to changing network or protocol configurations, because an updated timing or persistency value may be provided at initialization time rather than fixed or hard-coded into the CAS Module.

CAS Module 604 will report any signaling error conditions to the protocol converter 100. CAS Module 604 will perform all register sending and reception required in either compelled or non-compelled mode of operation. The indication of signaling method will be passed in the startup message.

CAS Module 604 will report line state changes as required to the protocol converter 100 and will drive line state changes as requested by protocol converter 100. CAS Module 604 will maintain a digit buffer (per active call) of digits for reception and transmission of signals. This is to cover the example of an Originating Line Identity (OLI) or caller's phone number embedded in the called party number in the case of non-compelled signaling For an incoming call from the CAS network, CAS Module 604 will automatically respond to Seizure with seize acknowledge and make ready for reception of register signals. At the same time the CAS Module 604 will inform the protocol converter 100 of the new call, via the creation of a message by the simulation software, and await instruction. CAS Module 604 will perform first digit and inter-digit timing as requested by the protocol converter 100.

CAS Module 604 will report digits to the protocol converter 100 as requested according to the sending program. In the case of compelled signaling, CAS Module 604 will continue to request digits, for example, by sending back signals until all digits requested by the protocol converter 100 are received or it is requested to do otherwise by the protocol converter 100.

CAS Module 604 will upon request from the protocol converter 100, drive a specified backward signal and await subsequent forward signals. These signals will not be appended to the general digit buffer, but held separately. The backward signal between multiple digit collection in this mode will be determined by a field in a request message sent by protocol converter 100.

CAS Module 604 will drive the answer signal upon request by the protocol converter 100. CAS Module 604 will handle the circuit release and return to idle state under supervision of the protocol converter 100. Upon reporting Clear Forward to the protocol converter 100, CAS Module 604 will receive a Release message, which will result in a Release Guard response message being sent. In the case that release is initiated by the protocol converter 100, CAS Module 604 will receive a Release message and send either a Clear Back and/or Forced Release message depending on the type of signaling used. Upon receipt of Clear Forward, CAS Module 604 will make the circuit idle.

CAS Module 604 will respond to a request for resource connection in a TP_Signal_Bwd message by connecting up the required DSP of a TSU Card for DTMF detection, and provide the appropriate tone or announcement request in the ToneId field of the message. CAS Module 604 will first send the requested register or line signal backwards (for example, A-6 in the case of R2) in order to set up the speech conditions. CAS Module 604 will collect digits according to the sending program specified and report them to the protocol converter 100.

CAS Module 604 will respond to subsequent requests to collect DTMF digits and report them. CAS Module 604 will disconnect the resource upon request by the protocol converter 100 in a TP_Signal_Bwd message.

For outgoing calls, CAS Module 604 will, upon receipt of a TP_Otg_Seize message, put the seizure signal on the line and await seize acknowledgement. Upon reception of this signal, the CAS Module 604 will commence sending the digits supplied by the protocol converter 100.

In compelled signaling cases such as R2, CAS Module 604 will respond to backward requests A-1, A-2, A-7 and A-8 for transmission or re-transmission of digits in the digit buffer until all digits in the buffer have been sent. If the CAS Module 604 receives an A-1 backward digit request when all digits in the buffer have been sent, it will report the A-1 signal in a CAM_Signal message to the protocol converter 100. Any other backward requests received will cause the CAS Module 604 to pause, inform the protocol converter 100 and wait for the response before continuing.

CAS Module 604 will either append digits received in a TP_Signal_Fwd message to the digit buffer for normal transmission, or forward the received digits ahead of any digits in the digit buffer awaiting between each digit transmitted, the specified backward request digit as appropriate. CAS Module 604 will return to sending digits in the digit buffer when the backward request returns to A-1 and all the digits in the TP_Signal_fwd message have been sent.

CAS Module 604 will stop sending digits in the digit buffer upon receipt of a BnoComplete indicator in the TP_Signal_fwd message. From that point on, all backward signals received will be reported to the protocol converter 100 on a one-by-one basis. CAS Module 604 will report the detected answer signal in the form of a CAM_Answer message to the protocol converter 100. CAS Module 604 will report any meter pulse message to the protocol converter 100 in a CAM_Event message.

CAS Module 604 will handle release requested by the protocol converter 100 by driving the clear forward signal and will wait for release guard before returning to idle. CAS Module 604 will report clear back or force release as CAM_ClearBack to the protocol converter 100 and wait for TP_Release before sending a Clear Forward message.

CAS Module 604 will respond to a request for resource connection in a TP_Signal_Fwd message by connecting up a DSP of a TSU Card for network tone detection. The CAS Module 604 will report any tone detected in a CAM_Signal_in message. CAS Module 604 will automatically release the resource upon detection of a tone or upon request by the protocol converter 100.

CALL FLOW EXAMPLE

Figure 26:
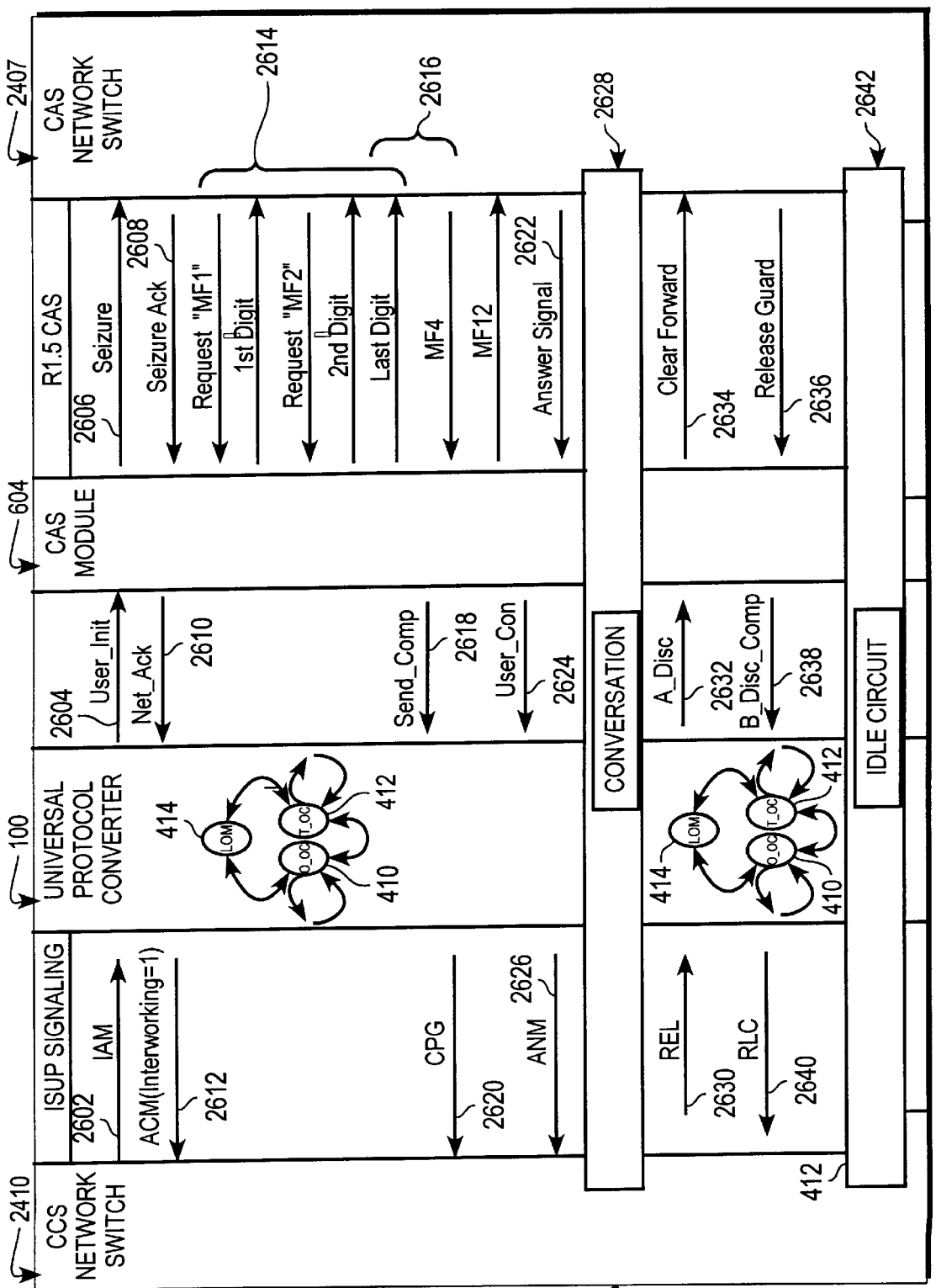
FIG. 26 is a call flow diagram of messages exchanged during protocol conversion.
Figure 27A:
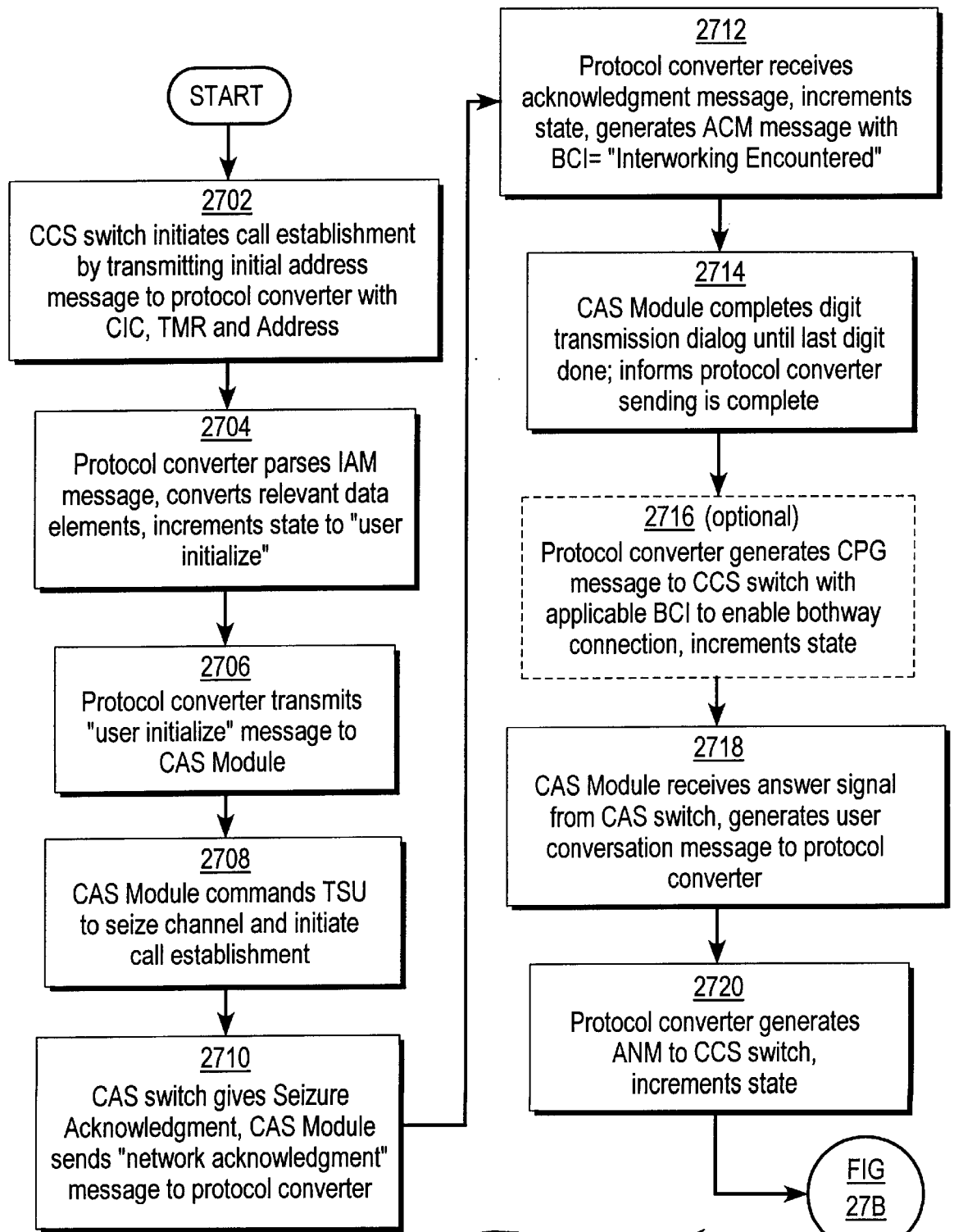
FIG. 27A is a flow diagram showing a portion of a method of protocol conversion.
Figure 27B:
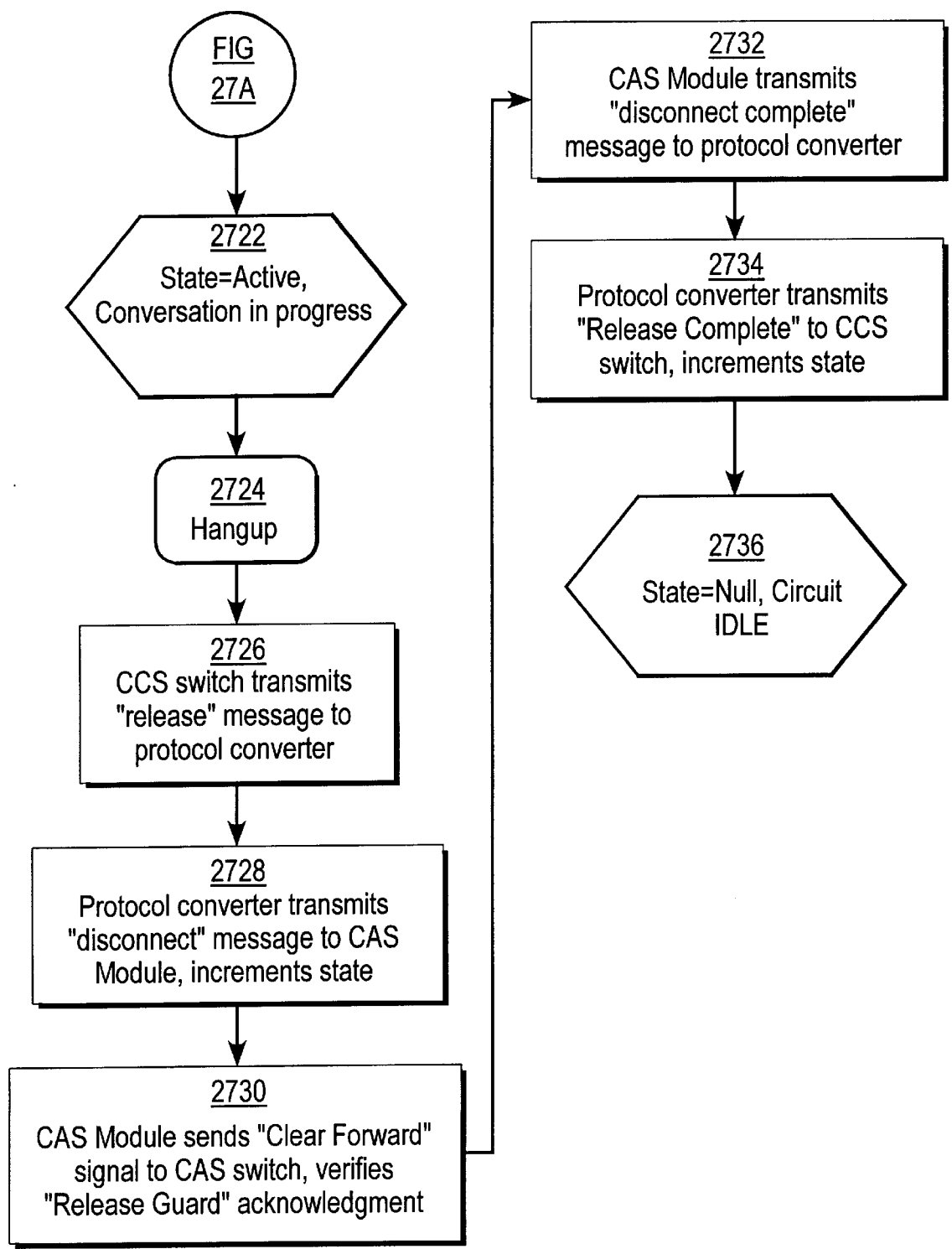
FIG. 27B is a flow diagram showing another portion of a method of protocol conversion.

FIG. 26 is a call flow diagram showing an example of call flow signaling carried out by a preferred embodiment. FIG. 27 is a flow diagram showing steps involved in carrying out the call flow signaling shown in FIG. 26. It will be apparent to one of ordinary skill in this art that the call flow diagram shown and discussed herein and in FIG. 26 and FIG. 27 involves one-way protocol conversion from SS7 ISUP messaging to CAS messaging. This example is provided merely for illustration, and the scope of the invention includes and is intended to cover signaling in the opposite logical direction, that is, from CAS messaging to CCS protocol messaging. The embodiments described herein are also effective for carrying out CAS to PRI protocol conversion. Further, ISUP messaging is not required. Any type of CCS protocol messaging and signaling may be used at either side of the conversion process. Other example signaling flows or call flows that are carried out by the system are set forth in APPENDIX 1 to this document.

As shown by block 2702, to initiate establishment of a call, the network switch 2410 transmits an Initial Address Message 2602 that is received by protocol converter 100. Initial Address Message 2602 contains CIC, TMR and Address information. As is known in this art, CIC is a circuit identifier code and TMR information identifies requirements of a trunk for a call to be completed over the trunk. For example, the TMR information may mean, "the trunk must be a 64 Kb clear channel trunk." The Address information identifies telephone numbers of the calling party and the called party. In this context, "Initial Address Message" refers broadly to a first message, such as the Initial Address Message (IAM) defined in ISUP/SSJ, the Setup message used in ISDN-PRI, the Initial Setup Request Message (ISRM) used in the DPNSS protocol, and others.

As shown by block 2704, protocol converter 100 parses the Initial Address Message 2602 and converts the relevant data elements, such as the dialed number and the dialing number. Details of the parsing and conversion are handled in the MDL and will be apparent from the message definitions described herein. The protocol converter 100 also increments its internal state to the "user initialize" ("User_Init") state. As indicated in block 2706, protocol converter 100 then transmits a User_Init message 2604, containing values identifying a channel and address, to the Communication Signal Processor of the CAS Module 604 over the digital link 2424. CAS Module 604 stores the dialed number and dialing number in memory.

The CAS Module 604 commands one of its TSUs 2502 send a seizure message 2606 to seize the identified channel, and initiate call establishment towards the CAS switch or other equipment in the CAS network 2404, as indicated by block 2708. As shown in block 2710, the CAS switch responds with a Seizure Acknowledgment message 2608 that acknowledges that the channel has been seized for use in this call. In response, the CAS Module 604 sends a network acknowledgment ("Net_Ack") message 2610 to the protocol converter 100 over digital link 2424, to indicate that an acknowledgement from network 2404 has been received.

As shown by block 2712, protocol converter 100 receives the Net_Ack message 2610. In response, the protocol converter 100 increments its internal state, and generates an "ACM" message 2612 to the network switch with the Basic Call Interworking (BCI) parameter set to the value "Interworking Encountered", as shown by block 2712. This message instructs the network placing the call, for example, CCS network 2402, to use only basic call interworking features and to omit special interworking features.

The CAS Module 604 then enters into a digit transmission dialog with the CAS switch involving a plurality of messages 2614. Each message 2614 includes a header that indicates the channel on which the message is received. In the digit transmission dialog, the CAS Module 604 sends one or more Dual Tone Multi-frequency (DTMF) tones that identify numeric digits and represent call setup information. The tones represent digits of the called number and calling number that were parsed from the Initial Address Message 2602 in block 2704. The DTMF tones are sent in one of the E1/T1 voice channels, as dictated by the Channel Associated Signaling protocol. As shown by block 2714 and message 2616, the CAS Module 604 carries out the digit transmission dialog with the CAS network switch until the last digit is sent and acknowledged.

When the dialog is complete, the CAS switch generates the message "MF4" which indicates "all digits have been received." The CAS Module 604 returns message "MF12" which indicates "acknowledge." The CAS Module 604 informs the protocol converter 100 that digit transmission is complete by sending a "send complete" ("Send_Comp") message 2618 to the protocol converter over digital link 2424.

Optionally, as shown in block 2716, protocol converter 100 generates a call progress (CPG) message 2620 to the CCS network switch 2410. The CPG message 2620 contains call progress tones indicating the state of the call, and includes a BCI applicable to enable a both-way connection. The protocol converter 100 also increments its state.

In block 2718, the CAS Module 604 receives an answer signal 2622 from the CAS network switch, which indicates that someone connected to CAS network 2404 has answered the call. The CAS Module 604 then generates a user conversation ("User_Con") message 2624 to the protocol converter 100. In block 2720, the protocol converter 100 generates an answer message ("ANM") 2626 to the network switch 2410, and increments its state. The answer message also indicates that someone has answered the call at the destination end of the call. At this point, the state of the call is Active, as indicated by block 2722, and a conversation 2628 is in progress between the calling party and the called party.

Eventually, either the calling party or the called party terminates the conversation 2628 by hanging up a telephone, as indicated by block 2724, or by disconnecting other end station equipment. For purposes of illustration, FIG. 26 assumes that the call is terminated by a party connected to the CCS network 2402. To signal that the call has been released, as indicated in block 2726 the CCS network switch 2410 transmits a release ("REL") message 2630 to protocol converter 100. In an embodiment, the Cause parameter of the REL message 2630 is set to a value of "16", indicating Normal Release.

In response, as shown by block 2728, protocol converter 100 transmits a disconnect ("A_Disc") message 2632 to CAS Module 604, and increments its state. This message instructs the CAS Module 604 to tell the CAS network switch to disconnect the call. In response, the CAS Module 604 sends a "Clear Forward" signal 2634 to the CAS network switch, as shown by block 2730. The CAS Module 604 also verifies that a "Release Guard" acknowledgment 2636 is received from the CAS network switch, indicating that call disconnection has occurred.

The CAS Module 604 then transmits a "disconnect complete" ("B_Disc_Comp") message 2638 to protocol converter 100, as shown by block 2732, to inform the protocol converter that disconnection has occurred. As indicated by block 2734, protocol converter 100 transmits a release complete ("RLC") message 2640 to the network switch 2410, and increments its state. This message informs the network switch 2410 that the call or channel has been released successfully. At this point, the call state is Null, and the circuit is IDLE, as indicated by block 2736 and idle circuit 2642.

INTERNAL MESSAGING FORMATS

In the preferred embodiment, the protocol converter 100 and CAS Module 604 communicate using messages having the format and content that are described in this section. The formats described in this section are merely exemplary, and other formats may be used. Examples of call flows that use the messaging formats described below are set forth in APPENDIX 1.

GENERAL MESSAGE FORMAT

Generally, messages exchanged between protocol converter 100 and the CAS Module 604 have the structure shown in Table 1.

TABLE 1

GENERAL MESSAGE STRUCTURE

1st bit transmitted ⟶

| 7 | 0 | 7 | 4 | 3 | 0 |
|---|---|---|---|---|---|
| UNIT/GROUP ID | | CAGE ID | | BAY ID | |
| CHANNEL ID | | INTERFACE ID | | | |
| LENGTH | | MESSAGE CODE | | | |
| | /C | | | | |
| OPTIONAL DATA | | | | | |
| .... | | | | | |

Each six-octet header consists of two parts, the CAS MODULE 604 address and the message. The message consists of a code (defined below), the P/C indicator (PDU vs. Control), the length indicator (which may be zero) and optional data. There is no maximum size for a message.

The address consists of a Bay ID, a Cage ID, a Unit ID, an Interface ID, and a channel ID. The Bay ID (or system ID) identifies the protocol conversion system that is using channel associated signaling. The Cage ID identifies a particular circuit card cage within the specified bay. The Unit ID identifies a board or chassis slot within the cage. The interface ID identifies which E1 or T1 span on the Unit is being addressed. The channel ID identifies the timeslot on the interface. For messages that are not specific to a timeslot, one or more IDs can be set to "255" by the originating side and will be ignored by the receiving side. Preferably, the Bay ID is set to a value ranging from 0–15; the Cage ID has a value from 0–15; the Unit/Group ID has a value from 0–254 in which the Unit ID has values of 0–127 and values of 128–254 are the Group ID. The Slot ID has a value of 0–254 (255=Not Applicable), the Interface ID has a value of 0–254 (255=Not Applicable), and the Channel ID has a value of 0–254 (255=Not Applicable). The foregoing values are merely exemplary and are not required by the invention or any implementation or embodiment thereof.

Bit 7 of the Unit/Group ID is used to discriminate between messages targeted at a Unit or a Group. For example, when bit 7 has a value of "0", the message is a Unit Message, and it is a Group Message when bit 7 has a value of "1". Thus, when a group spans multiple bays, it will require multiple messages be sent. If a group can span multiple cages, the cage parameter will be ignored.

Bit 7 of the Message Code is used as a level indication used to discriminate between PDU (call processing) and Control messages. PDU message formats and control message formats (which includes configuration and alarms) are described below. Preferably, PDU is indicated when bit 7=0 and Control is indicated by a value of "1".

CAS CALL PROCESSING SIGNALS

The following section provides a description of the Call Processing portion of the communication protocol between protocol converter 100 and CAS Module 604. All Call Processing Messages conform to the general message format described above. For all Call Processing messages, the value of P/C, which is the high order bit of the Message Code, is zero. The length field indicates the length of optional data and can be zero.

Call processing messages are formatted in one of a plurality of message types. Each message type consists of the standard header followed by optional data. Only the message code and length are specified for each type; the address section of the header is constant for all messages. The messages are broken into three groups; the first group contains messages sent by the CAS Module 604 to the protocol converter 100, the second group contains messages sent by the protocol converter to the CAS Module, and the third group contains messages that can originate at either protocol converter or the CAS Module. Message codes have assigned ranges for each group. For example, messages sent by CAS Module 604 have codes of 1–20, messages transmitted by the protocol converter 100 have codes of 21–40 and messages sent in either direction have codes of 41–60.

A message of type CAM_Seize (Message code=1) indicates that an incoming circuit seizure has been detected. Seizing acknowledge is automatically returned by the CAS Module 604. The protocol converter 100 is informed of the new call with this message. There is no data contained within this message.

A message of type CAM_ClearForward (Message code=2) indicates that Clear Forward has been detected. Release guard signal is returned by the CAS Module 604, when TP_Release is subsequently received, and at that point, the circuit and receiver are put into idle state. Protocol converter 100 is informed of the call release with this message. There is no data contained within this message.

A message of type CAM_ForwardTransfer (Message code=3) indicates that an incoming request for operator assistance has been detected. This signal is only received in an international exchange and would not normally be expected. This message will be forwarded to the protocol converter 100, which may decide to ignore it or reject the call.

A message of type CAM_Event (Message code=4) indicates that an unexpected event has been detected internally by the CAS Module 604. The CAS Module 604 will continue processing after reporting the event until requested to do otherwise by the protocol converter 100. In the case of event type 9, CAS Module 604 will act alone to release the incoming or outgoing call as communication between the protocol converter 100 and the CAS Module 604 cannot be relied upon. Table 2 provides a mapping of event types, event names, and the meaning of events of each type.

TABLE 2

EVENTS

| Event Type | Event Name | Meaning |
|---|---|---|
| 1 | FirstDigitTimeout | No digits received |
| 2 | InterDigitTimeout | Timeout occurs between digits |
| 3 | SignalingError | Invalid line signal received |
| 4 | MessageOutOfSequence | TP message received in an invalid state |
| 5 | RegisterError | Invalid tone/timing |
| 6 | LineTimingError | Signal too short/long or missing |
| 7 | Blocked | Backward blocking received during a call |
| 8 | CAS Module Timeout | The CAS Module 604 has not received a requested or required message from the TP within the allotted time interval |

The event data field is valid for event numbers 3, 4, 5 and 6. In each case it will contain the following. In the case of Event 3, the event data field contains line state Rx and Tx and call state indication. In the case of Event 4, the event data field contains the Name of the message from the protocol converter, from an enumerated list of all protocol converter messages. For Event 5, the event data field contains a value in the range of 1–15 that represents the tone. In the case of Event 6, the event data field stores the name of signal and type of fault, where type of fault has the following values: Signal Persistence too long=0, Signal Persistence too short=1, Signal not received within time required =2.

A message type of CAM_Answer (Message code=5) indicates that an answer signal was received from the next exchange. No data is present in this message.

A message type of CAM_ClearBack (Message code=6) indicates that a Clearback or Forced Release signal was received from the next exchange. No data is present in this message. The next signal expected by the outgoing CAS Module 604 is TP_Release.

A message type of CAM_Release (Message code=7) is sent from the CAS Module 604 when it is unable to process (or continue processing) the call. This could for example be due to a lack of internal resources within the CAS Module 604.

A message of type CAM_MeterPulse (Message code=8) is sent from the CAS Module 604 when a meter pulse(s) is/are received.

A message of type CAM_Offer (Message code=9) is sent from the CAS Module 604 when an offer signal has been received.

A message of type CAM_Signal_In (Message code=10) is received in a forward direction or backwards direction and contains signals/address digits either received autonomously in a backwards direction or upon request in a forwards direction. The message contains a RequestID value. RequestID is passed from the Protocol converter 100 to the CAS Module 604 in a TP_Send_Fwd or TP_Send_Bwd message and is returned with the same value in CAS Module 604_Signal in order that the Protocol converter 100 can associate the Signal message with the request issued. RequestID can have the values set forth in Table 3:

TABLE 3

REQUESTID VALUES

| Value | Name | Meaning |
|---|---|---|
| 1 | ID_None | Information was not requested |
| 2 | ID_DigitsRequested | B number digits requested |
| 3 | ID_CPC | Calling party category |
| 4 | ID_Oli | Originating Line Identity |
| 5 | ID_Ccode | Country code |
| 6 | ID_Lang | Language/discriminator digit |
| 7 | ID_NOC | Nature of Circuit |
| 8 | ID_Echo | Echo suppresser information |
| 9 | ID_ApplyResource | Apply resource for tone detection and transmission |
| 10 | ID_ReleaseResource | Release connected resource |

The following messages are communicated by protocol converter 100.

A TP_SeizeAck message (Message code=21) is sent to CAS Module 604 in response to CAS Module 604_Seize and includes the Sending program required, digit timing values and Request Id (which is ID_DigitsRequested in this case). FirstDigitTimer and InterDigitTimer are specified in units of 1 second.

| Value | Name | Meaning |
|---|---|---|
| 1 | SP_SendAll | Automatically collect all digits up to and including address digit I-15 (or an inter digit timer occurs), report them in a block to the TP and await further instruction. |
| 2 | SP_Send1by1 | Report digits as they are received and continue doing so until otherwise stated in a TP_Send_Bwd message |
| 3 | SP_SendN | Report digits N when they are received and await further instructions in the form of a TP_Send_Bwd request. If an I-15 signal is received before N digits have been collected then send the received digits to TP. |

The DigitsRequired field will only be relevant for SP_SendN.

A TP_Signal_Bwd message (Message code=22) is sent to the CAS Module 604 on the incoming side, to request the transmission of a specific register signal in the backward direction and to send the responses received to this signal in the forward direction to protocol converter 100. The TP_Signal_Bwd message has a length of 10 octets and carries the following values: Signal; Digits Requested; Signal To Next; Resource Data; Last Digit Request; Request ID; Sending Program; Interdigit Timer; BNO Complete; and Cut Through. If RequestId is ID_DigitsRequested, the CAS Module 604 will treat this request as a demand for digits from the digit buffer and use the Interdigit timer if specified as the new value for timing digits and the program will determine with DigitsRequested, how to collect the B number. If RequestID=ID_ApplyResource, a ResourceData value will define what resource to apply and how. The ResourceData value comprises a ToneID value and a ResourceType value. ResourceType defines the tone detection criteria (currently foreseen as either RES_DTMF_Rcv or RES_NetTones_Rcv). RES_DTMF_Rcv will normally be used in the backward direction to receive DTMF signals directly through the network from a subscriber's handset. In this case, ToneId is an index that specifies which tone or announcement prompt will be applied in the backward direction. The Signal field will be set if it is necessary to send a network register signal prior to connection to provide a through connection. The SendingProgram, DigitsRequested and InterDigitTimer will apply to the DTMF digits being requested.

The resource RES_NetTones is normally applied on the outgoing side and is used to detect network tones according to a tone map passed in TP_StartUp and return a tone index in the Digit 1 position of the CAS Module 604_Signal_in.

If RequestID=ID_None, then only the signal field is significant because no forward signal response is expected.

For other RequestId values, the CAS Module 604 will respond to this message from the protocol converter 100 with the new digit(s) received over the incoming circuit and not add these into the general digit buffer. When the response to this message has been provided, the CAS Module 604 will continue with digit collection and reporting activities as specified in the previous RequestId=ID_DigitsRequested unless BnoComplete is set.

If more than 1 digit is requested, SigToNext defines the backward signal to be sent after each digit to request the next one.

If BnoComplete is set, the CAS Module 604 will stop responding to forward signals with backward signal A-1.

If LastDigitRequest is set, the CAS Module 604 will stop responding to forward signals with backward signal A-1 when the requested number of digits have been received. The sending program will determine the method of reporting digits to the Protocol converter 100.

The Cut Through value indicates whether a change to the default cut-through point is required for this particular call. It can take one of the following values: No_Change, Seizure, AddressComplete, Answer. The default is No_Change. Seizure is only valid in the initial group settings and in the TP_OtgSeize message.

A TP_Signal_Fwd message (Message code=23) is sent to the CAS Module 604 to request the transmission of a specific register signal(s) in the forward (outgoing) direction. This message is used to either send further digits to the next exchange or to respond to backward requests for CPC, OLI, etc. The message has a length of 5 octets plus N octets, in which N is the number of signals that are forwarded. The fields in the message are: NoToSend; Signal 2; BNO Complete; Cut Through; Request ID; Signal values 1 through N; and Signal To Next.

If RequestID=ID_DigitsRequested, the CAS Module 604 will append signals 1-N to the end of the digit buffer for transmission to the next exchange otherwise the CAS Module 604 will transmit the digits received in this signal next and then return to transmission of any remaining digits in the digit buffer.

The SigToNext field defines the signal expected to prompt the transmission of the next digit in the case where there is more than 1 signal digit in the message (e.g. OLI). Protocol converter 100 will always put I-15 at the end of the OLI.

BnoComplete is used to instruct the CAS Module 604 to stop sending address digits.

A TP_Release message (Message code=24) is sent in either the forward or backward direction to initiate the end of a call. It may be sent in response to clear forward or clear back. No further communication will take place after this message has been received. CAS Module 604 is responsible for the control of forward or backward signals required to put the circuit in idle condition.

A TP_OtgSeize message (Message code=25) is the first message sent on the outgoing side to initiate a call. Upon receipt of this message, the CAS Module 604 will send seizure forward, wait for proceed to send and start transmitting the B number forward waiting for the appropriate backward digit request between digits. CAS Module 604 will maintain these digits in a buffer and support the basic B number digit requests (A-1, A-2, A-7 and A-8) autonomously. Any other backward signals will be reported back to protocol converter 100 and digit transmission paused. The message has a length of 2 octets plus N, in which N is the number of digits transmitted, and has fields of: Digit 1 through Digit N; Digit Count; and Cut Through.

A TP_Answer message (Message code=26) is sent in the backward direction to indicate answer to the previous switch.

A TP_MeterPls message (Message code=27) is sent in the backward direction to send meter pulses to the previous switch.

A TP_Clearback message (Message code=28) is sent in the backward direction to send a clearback line signal to the previous switch.

A TP_Offer message (Message code=29) is sent in the forward direction to send the offer signal to the next switch.

The following section describes signals sent by either the Protocol converter 100 or the CAS Module 604.

A SYS_Blocking message (Message code=41) is used. If the CAS Module 604 detects blocking on a circuit, it will wait for a predefined time period in order to correlate this line condition with other idle trunks in the same trunk group. If all idle trunks exhibit the same status change, then the CAS Module 604 will report this in a single message referencing the involved trunk group in order to reduce the possibility of a far-end outage or return to service causing overload conditions in the CAS Module 604 or protocol converter 100.

If the protocol converter 100 wishes to block or unblock an entire trunk group, this message will be sent with the G/C indicator set and the CAS Module 604 will block all idle circuits. All busy circuits will be marked for blocking when they become idle but will not be immediately affected by this message. If the protocol converter sends a blocking request against an individual circuit then it will be force released and blocked regardless of its call state. The message carries a G/C value, which is a Trunk Group/Circuit indicator stored in a 1 bit field. The G/C value indicates that ID refers to Trunk Group when set. ID is either circuit ID or Trunk Group ID, dependent upon the value of G/C.

At initialization or reconfiguration, a SYS_Download message (Message code=42) is used. The format of this message is described in the section entitled "Remote Startup".

Examples of call flows using the foregoing messages are set forth in APPENDIX 1.

ADMINISTRATION MESSAGES

In the preferred embodiment, CAS Module 604 may receive and respond to a plurality of control messages for setting parameters of the CAS Module. For example, in an embodiment, CAS Module 604 accepts messages for setting configuration parameters, such as time of day, port configuration, channel assignment map, sync source, tone set, and statistical reports.

In the preferred embodiment, CAS Module 604 accepts messages for setting display parameters including system status, time of day, channel status, and sync status. Preferably CAS Module 604 also responds to a Remove class of messages for removing the port configuration, channel assignment map, sync source, and tone set.

Also, CAS Module 604 generates system event messages that provide configuration acknowledgment, a configuration failure indication, an alarm register indication, and an alarm clear notice.

ALARM MESSAGES

Preferably the protocol converter 100 or the CAS Module 604 have a Network Management System that manages software and hardware components of the protocol converter 100 and CAS Module 604. The Network Management System provides the user with an interface to manage inventory, systems, equipment, and tests of the protocol converter as integrated with the CAS Module. In one embodiment, Network Management System provides fault management including alarm surveillance and alarm logging. The alarm logging function provides continuous logging of fault types and severity types. Protocol converter 100 is designed to survey and log the alarm types set forth in Table 4.

TABLE 4

ALARM TYPBS

Facility: transmission lines, circuits, link protocols
Physical Interface (T1/E1, 64K DDS)
Loss-of-signal
Errors in a second (number of frame slips, bit errors)
Excessive errors in a second causing it to be marked as an Errored Second (ES) or Severely Errored Second (SES)
Number of SES, ES in a user defined timeframe
Channel (Timeslot) in Physical Interface
Alarm Indication Signal
Link Layer CRC errors
Link Resets
Loopback test failure
Equipment: hardware, software, system-wide
CSP: CSP processor, configuration, and hardware alarms
TSU: Loss Of Sync, TSU processor, configuration, and hardware error alarms
Card Failure
Software Load Crash
System Failure
Resource Limitation (e.g. No-disk-space, processor busy)
Environmental: temperature, power
Temperature Threshold
Low Power
Power Failure
Miscellaneous: scheduled event, housekeeping
Scheduled job was not executed
Security violation
Log overflow Each alarm has a state and a severity value. The state can be active, cleared or pending (for situations when a trouble needs to exist for a period of time before it can be reported.) A user can configure the severity values. Default severity values are CRITICAL, MAJOR, MINOR, and EVENT.

The Network Management System includes advanced security management features to allow the network operators to manage access to the systems. The security system includes the management of user authentication and authorization, security violation enforcement and security logging. The security systems are flexible to facilitate the addition and/or removal of users from the system.

CONFIGURATION

In one embodiment, configuration data is entered using a graphical user interface executed by the processor of the CAS Module 604 and coupled to a display. In an alternate embodiment, configuration information is entered using a graphical user interface or terminal interface executed by protocol converter 100, and the configuration information is relayed to CAS Module 604 by digital connection 2424.

Preferably, the following data types can be configured in the CAS Module 604: Channel; Group; Interface; Cage; DFX; Alarm thresholds. Physically, channels reside on Interfaces; Interfaces are part of Units; Units are part of Cages; and Cages are part of Bays.

Logically, channels are also part of groups. It is at the group level that protocol specific configuration data is found for all of the channels within the group. Each channel may be enabled or disabled using a circuit identifier (Circuit ID) and a group identifier (Group ID). Each Group may be configured by enabling or disabling its Protocol, default cut-through point, direction (incoming, outgoing, two-way), and other parameters.

REMOTE STARTUP AND INITIALIZATION MESSAGES

In the preferred embodiment, when the CAS Module 604 is started or re-started, the protocol converter 100 sends initialization messages and data to the CAS Module. Preferably, the initialization messages and data specify all signal timings, signal persistency values, tone frequencies, and state transitions applicable to CAS messaging. In this manner, different implementations of CAS can be handled in the system by making changes to initialization data only in the protocol converter 100. The CAS Module 604 need not be reconfigured separately.

The initialization messages and data preferably comprise a SYS_Initialize message containing a buffer. A SYS_Initialize message is sent for each signaling group of channels, in which a group constitutes a part of an E1/T1 interface, or spans several such interfaces. The buffer data is divided into sections, each of which is preceded by a tag name and length. The buffer always commences with the mandatory tag part and subsequently any combination of the other data tags can be present. The valid data tags are as follows: TAG_MANDATORY_PART=1; TAG_DTMF_TABLE=2; TAG_LS_SIGNAL_DEFINITIONS=3; TAG_LS_INC_LINE_STATE_TABLE=4; TAG_LS_INC_DRIVE_STATE_TABLE 5; TAG_LS_OTG_LINE_STATE_TABLE=6; TAG_LS_OTG_DRIVE_STATE_TABLE=7; TAG_MF_FWD_TABLE=8; TAG_MF_BWD_TABLE=9; TAG_MF_BWD_PULSE_TABLE=10; and TAG_PROGRESS_TONES=11. Table 5 identifies these sections of the buffer, exemplary values, and exemplary lengths in octets.

TABLE 5

BUFFER LAYOUT

| BUFFER LAYOUT | VALUE | OCTET |
|---|---|---|
| TAG: Mandatory Part | 1 | 1 |
| Length | 3 (fixed) | 2 |
| Data 1 | | 3 |
| Data 2 | | 4 |
| Data 3 | | 5 |
| TAG: Next tag | tag x | 6 |
| Length | x | 7 |
| Data 1 | | |
| .. | | |
| Data x | | x + 7 |
| .. | | |
| TAG: Last tag | tag y | |
| Length | y | |
| Data 1 | | |
| .. | | |
| Data y | | |

Data lengths may be fixed or variable. Each part of the buffer data is described below. Examples of buffer layouts are provided in APPENDIX 2.

MANDATORY PART

Figure 28A:
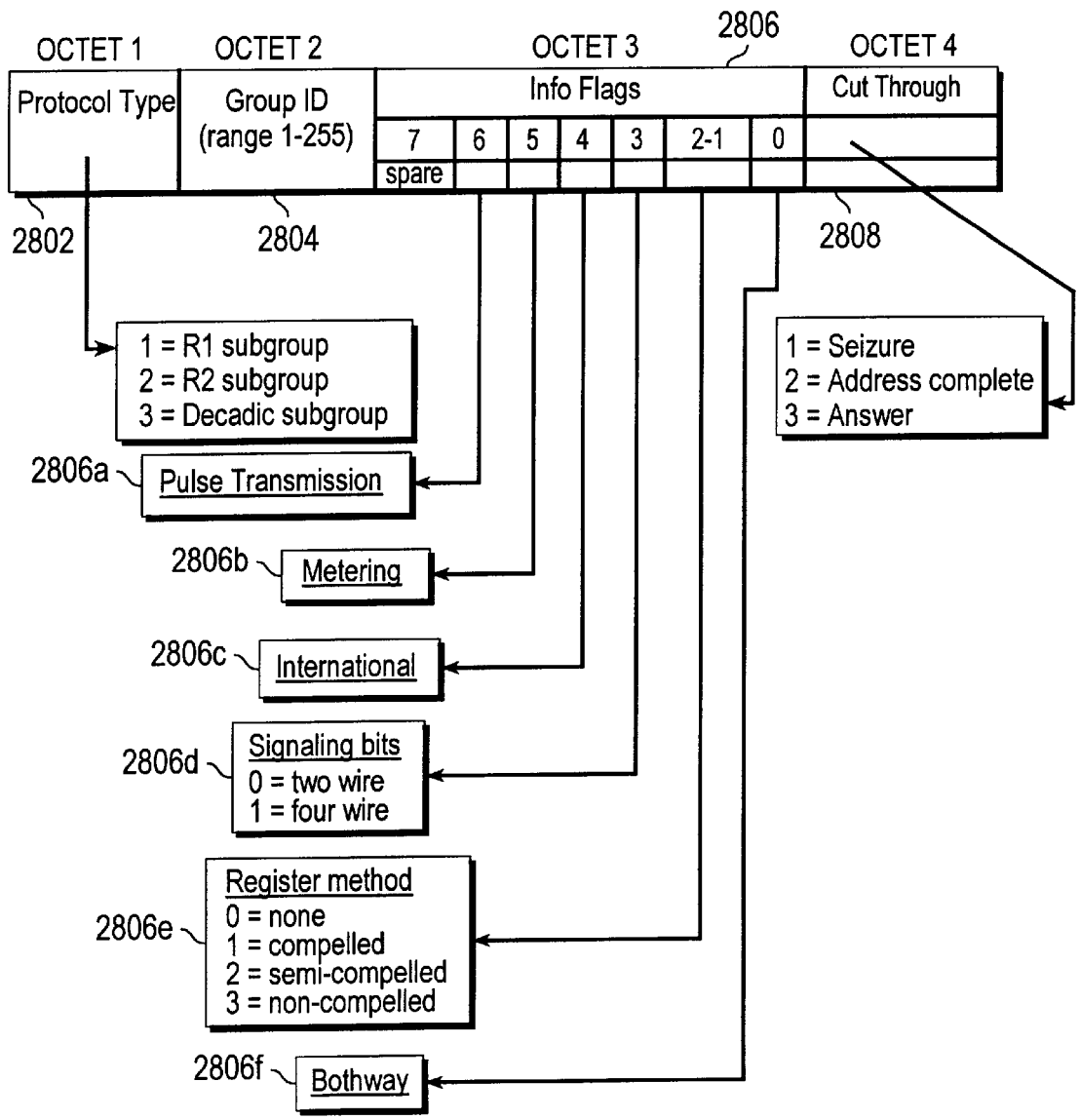
FIG. 28A is a diagram of the data format of a mandatory part of a message buffer.

FIG. 28A is a diagram of the data format of the mandatory part of the buffer. The mandatory part has a fixed length and comprises four (4) octets of data 2802, 2804, 2806, 2808. The first octet 2802 identifies the protocol type to be used. A value of "1" indicates R1 subgroup protocol, a value of "2" indicates R2 subgroup protocol, and a value of "3" indicates decadic subgroup protocol. The second octet 2804 carries a group identifier value in the range "1" to "255". Use of group identifier values ("GroupID" values) is described further above.

The third octet 2806 comprises information flags. A pulse transmission flag 2806a is set when compelled register signaling also uses pulse transmission for certain signals. A metering flag 2806b is set if signaling is to support metering pulses. An international flag 2806c is set if the system is working in an international environment. A signaling bits flag is set when four-wire signaling is used and clear when two-wire signaling is used. A register method flag, which comprises two (2) bits, has a value of "0" when register signaling is not in use, "1" when compelled register signaling is in use, "2" when semi-compelled register signaling is in use, and "3" when non-compelled register signaling is in use. A bothway flag 2806f is set when bothway working is required.

The fourth octet 2808 carries a value of "1" for a seizure condition, "2" for an address complete condition, and "3" for an answer condition.

DTMF TABLE

The DTMF table has a fixed length of 64 octets and defines 16 DTMF codes. Each DTMF code comprises two tones, each of which are represented by 2 octets specifying the frequency in hertz.

LINE SIGNAL DEFINITION TABLE

Figure 28B:
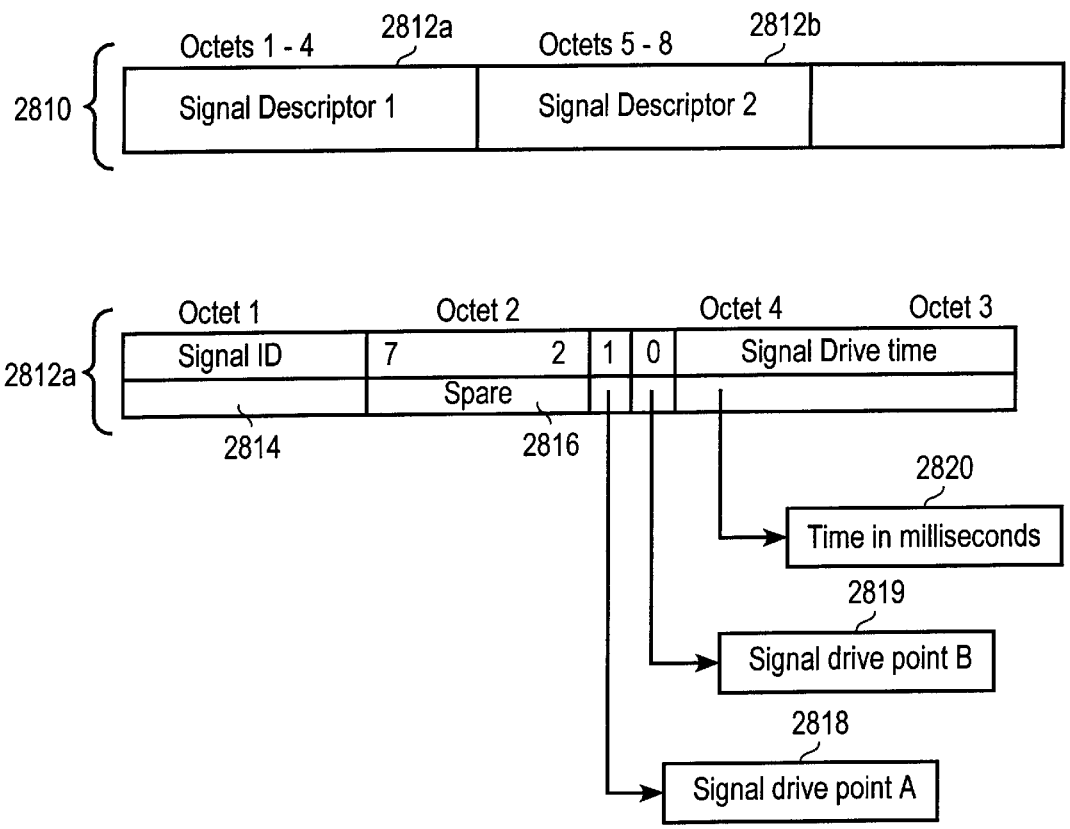
FIG. 28B is a diagram of an exemplary format of a line signal definition table.

FIG. 28B is a diagram of an exemplary format of the line signal definition table 2810. The line signal definition table 2810 has a variable length and contains a list of a plurality of signal descriptors 2812a, 2812b through 2812n. Each signal descriptor 2812a–2812n comprises 4 octets of data. Only those signals that are relevant to the signaling protocol are listed in the table.

As shown in FIG. 28B, an exemplary signal descriptor 2812a comprises a first octet that stores a signal ID 2814. Possible values of the signal ID 2814 include: IDLE=1; SEIZE=2; SEIZE ACK=3; PROCEED TO SEND=4; ANSWER=5; CLEARBACK=6; CLEARFORWARD=7; FORWARD XFER=8; OFFER=9; BLOCK=10; FORCE RELEASE=11; METER PULSE=12; NONE=13.

The second octet of signal descriptor 2812a comprises spare bits 2816, a signal drive point A bit value 2818, and a signal drive point B value 2819. The third and fourth octets of signal descriptor 2812a comprise a time value 2820 expressed in milliseconds.

INCOMING LINE STATE TRANSITION TABLE

Figure 28C:
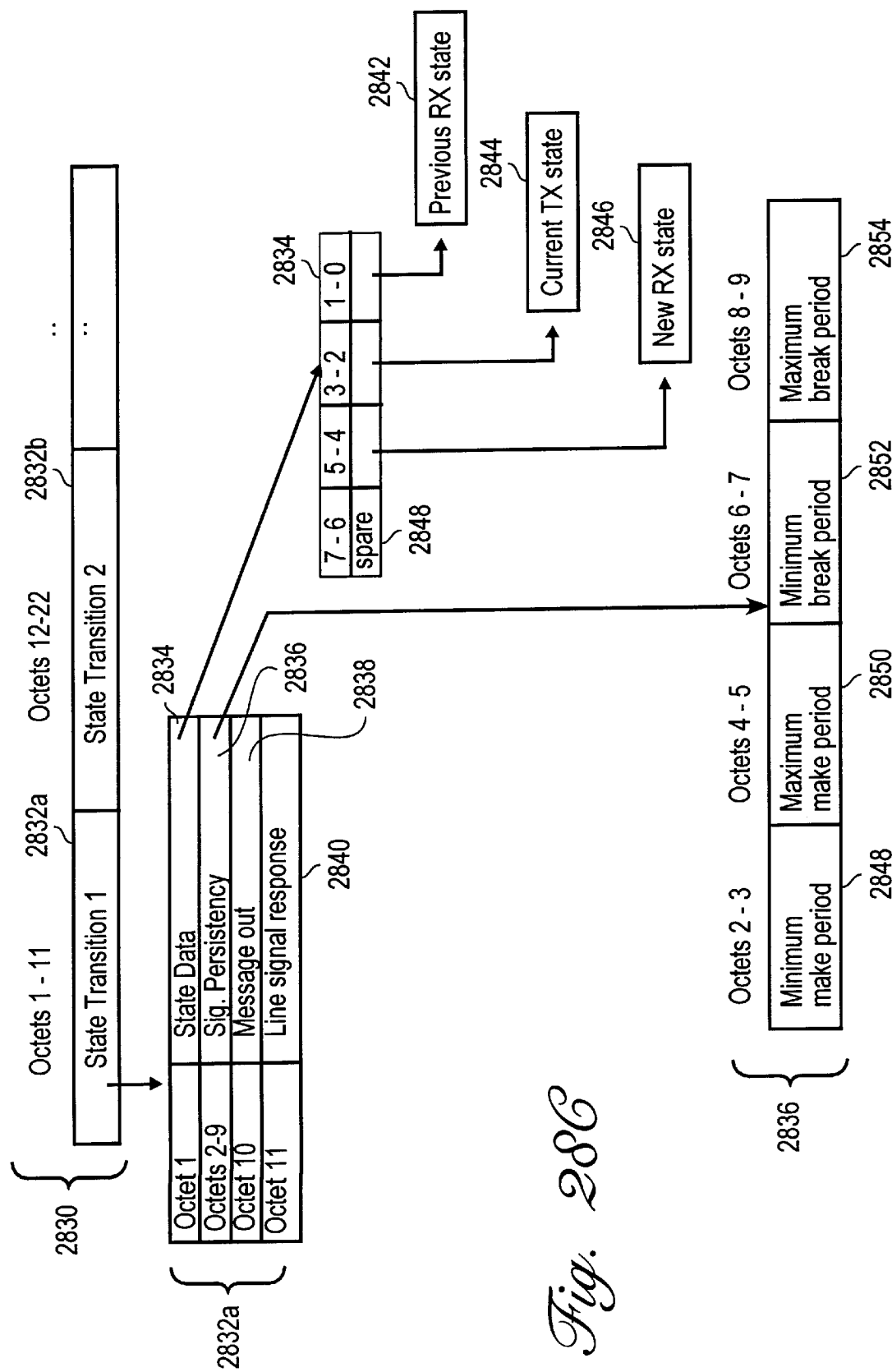
FIG. 28C is a diagram of an incoming line state transition table.

FIG. 28C is a block diagram of the incoming line state transition table 2830. The incoming line state transition table 2830 has variable length and contains a list of detected line state transitions 2832a–2832n. Each state transition 2832a–2832n comprises 11 octets of data. Only those state transitions that are relevant to the signaling protocol are listed in the table.

As shown in FIG. 28C, an exemplary line state transition 2832a comprises state data 2834, signal persistency data 2836, a message out value 2838, and a line signal response value 2840. State data 2834 comprises a previous receiving state value 2842, a current transmission state value 2844, and a new receiving state value 2846. In the previous receiving state value 2842, bit 0 identifies part B, and bit 1 identifies part A. In the current transmission state value 2844, bit 2 identifies part B, and bit 3 identifies part A. In the new receiving state value 2846, bit 4 identifies part B, and bit 5 identifies part A.

Signal persistency data 2836 comprises a minimum make period value 2848, a maximum make period value 2850, a minimum break period value 2852, and a maximum break period value 2854. Minimum make period value 2848 stores a value indicating the minimum time in milliseconds that a signal must persist for to be valid. The maximum make period value 2850 stores the maximum time in milliseconds that signal must persist for to be valid, for pulse signals only. A value of 0 indicates the signal must persist indefinitely. The minimum break period value 2852 indicates the minimum time gap in milliseconds that signal must be absent, for pulse signals only. The maximum break period value 2854 indicates the maximum time gap in milliseconds that a signal must be absent, for pulse signals only.

The message out value 2838 indicates the type of message to send out, and may carry a value of: CAM_Seize=1; CAM_ClearForward=2; CAM_ForwardTransfer=3; CAM_Event=4; CAM_Answer=5; CAM_ClearBack=6; CAM_Release=7; CAM_MeterPulse=8; CAM_Offer=9; SYS_Blocking=41; CAS_MsgNone=0.

The line signal response value 2840 may carry a value of: IDLE=1; SEIZE=2; SEIZE ACK=3; PROCEED TO SEND=4; ANSWER=5; CLEARBACK=6; CLEARFORWARD=7; FORWARD XFER=8; OFFER=9; BLOCK=10; FORCE RELEASE=11; METER PULSE=12; NONE=13.

INCOMING LINE DRIVE STATE TABLE

Figure 28D:
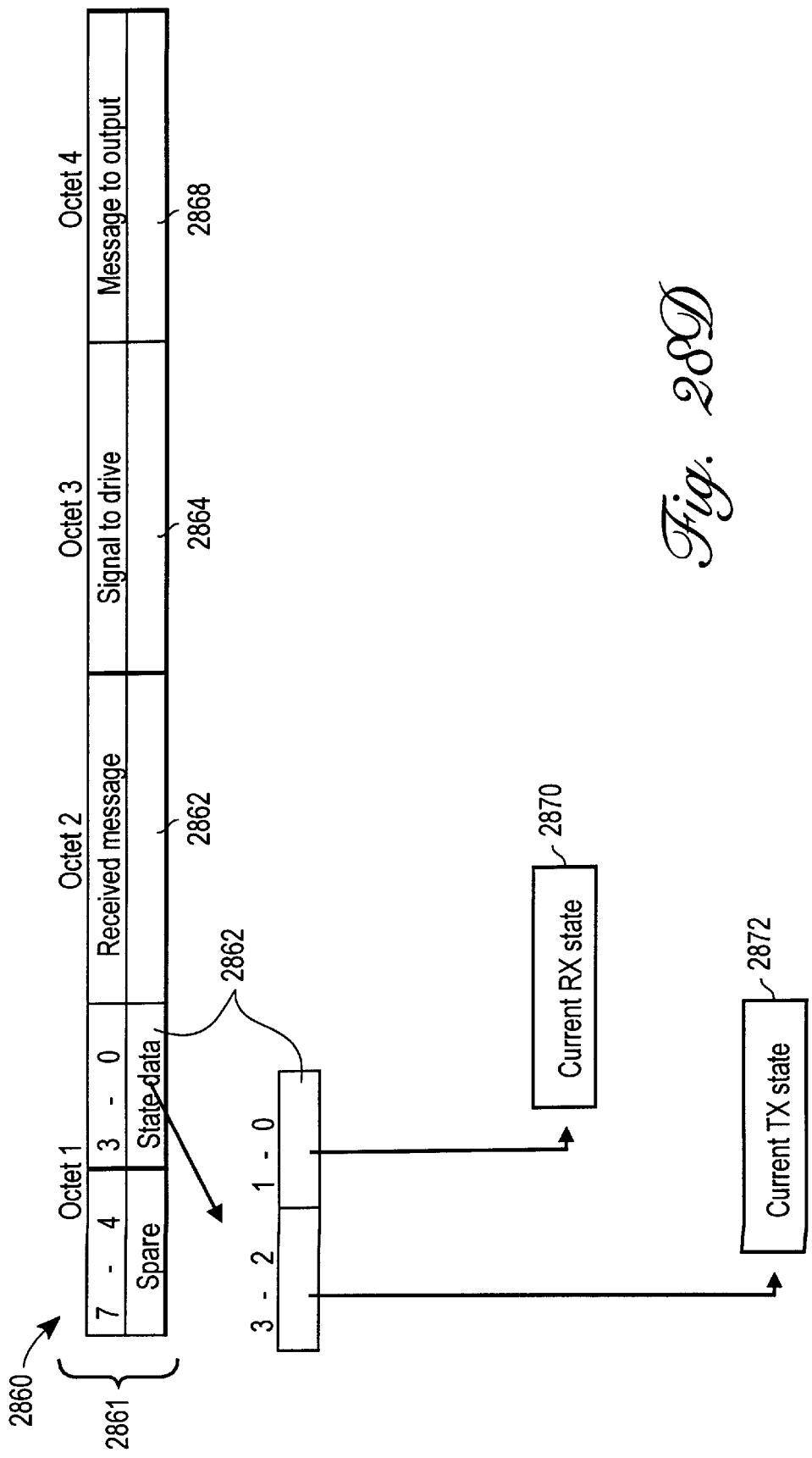
FIG. 28D is a diagram of an incoming line drive state table.

FIG. 28D is a block diagram of an incoming line drive state table 2860. This table is of variable length and contains a list of requested line state transitions, of which one exemplary line state transition 2861 is shown. Each state transition comprises 4 octets of data. Only those state transitions that are relevant to the signaling protocol are listed in the table. As shown in FIG. 28D, a line state transition 2861 comprises state data 2862, a received message value 2864, a signal to drive value 2866, and a message to output value 2868.

State data 2862 comprises a current receiving state value 2870 and a current transmission state value 2872. Preferably, in the current receiving state value 2870, bit 0 relates to part B and bit 1 relates to part A. In the current transmission state value 2872, bit 2 relates to part B and bit 3 relates to part A.

Received message value 2864 identifies the type of message that has been received, and may carry values of: TP_SeizeAck=21; TP_Release=24; TP_OtgSeize=25; TP_Answer=26; TP_MeterPls=27; TP_ClearBack=28; TP_Offer=29; SYS_Blocking=41.

The signal to drive value 2866 identifies the signal to be driven, and may carry values of: IDLE=1; SEIZE=2; SEIZE ACK=3; PROCEED TO SEND=4; ANSWER=5; CLEARBACK=6; CLEARFORWARD=7; FORWARD XFER=8; OFFER=9; BLOCK=10; FORCE RELEASE=11; METER PULSE=12; NONE=13.

The message to output value 2868 identifies the type of message to be output by CAS Module 604, and may carry values of: CAM_Seize=1; CAM_ClearForward=2; CAM_ForwardTransfer=3; CAM_Event=4; CAM_Answer=5; CAM_ClearBack=6; CAM_Release=7; CAM_MeterPulse=8; CAM_Offer=9; SYS_Blocking=41; or CAS_MsgNone=0.

OUTGOING TABLES

The outgoing line state transition table of the buffer has a format that is the same as the incoming line state transition table described above. Similarly, the outgoing line drive state table of the buffer has a format that is the same as the Incoming line drive state table described above.

MF FORWARD TONE DEFINITION TABLE

Figure 28E:
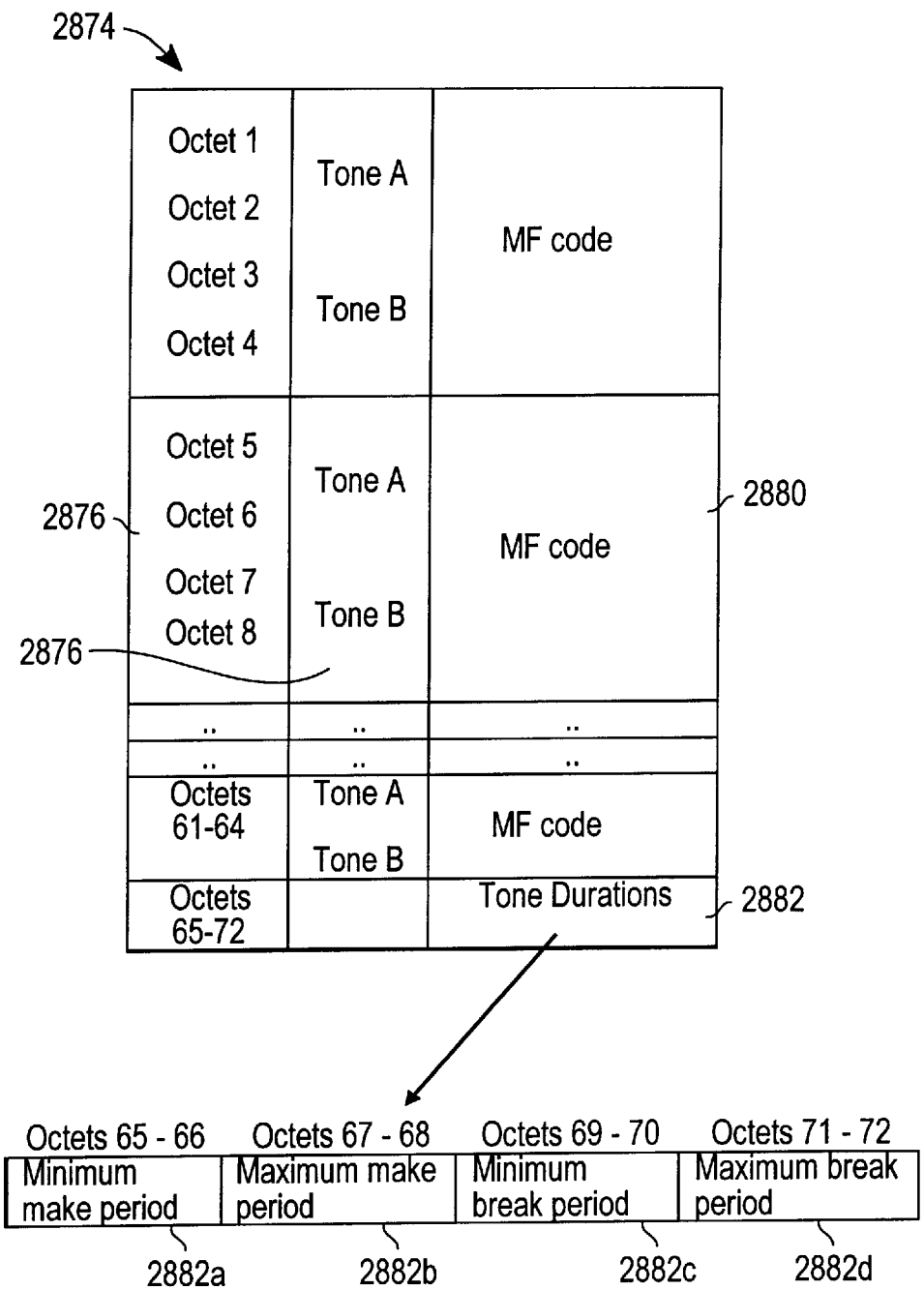
FIG. 28E is a diagram of a multifunction (MF) forward tone definition table.

FIG. 28E is a diagram of a multifunction (MF) forward tone definition table 2874. The table 2874 has a fixed length of 72 octets; it defines 16 MF codes, of which codes 1–15 are valid, and tone duration limits. As shown in FIG. 28E in the case of exemplary MF code 2880, each MF code comprises a pair of tone values 2878. Each tone value in the pair of tone values 2878 is represented by 2 octets, among a set of octets 2876, specifying a frequency in hertz.

Tone duration value 2882 is stored at the end of the table 2874 and comprises a minimum make period value 2882a, a maximum make period value 2882b, a minimum break period value 2882c, and a maximum break period value 2882d. The tone duration values store the same information as described above in connection with signal persistency data 2836.

MF BACKWARD TONE DEFINITION TABLE

The buffer also contains a MF backward tone definition table that has a format which is the same as the MF forward tone definition table 2874 described above.

MF BACKWARD PULSE TONE TABLE

The buffer further comprises an MF backward pulse tone table. This table is of variable length and is defined only in the case of compelled signaling protocols which can also receive pulsed tones in the backwards direction. It comprises a list of an arbitrary number of signal descriptor values. Each signal descriptor value comprises a tone identifier value, a tone drive time value, and an allowable fluctuation value. The tone identifier value is a number in the range of 1 to 15, representing the 16 DTMF digits. The tone drive time value is a numeric value in milliseconds that defines the length of time used when sending or generating a pulse tone. The allowable fluctuation limit value is a numeric value representing deviation in milliseconds, and is used in the case of pulse tone detection.

PROGRESS TONE DEFINITION TABLE

Figure 28F:
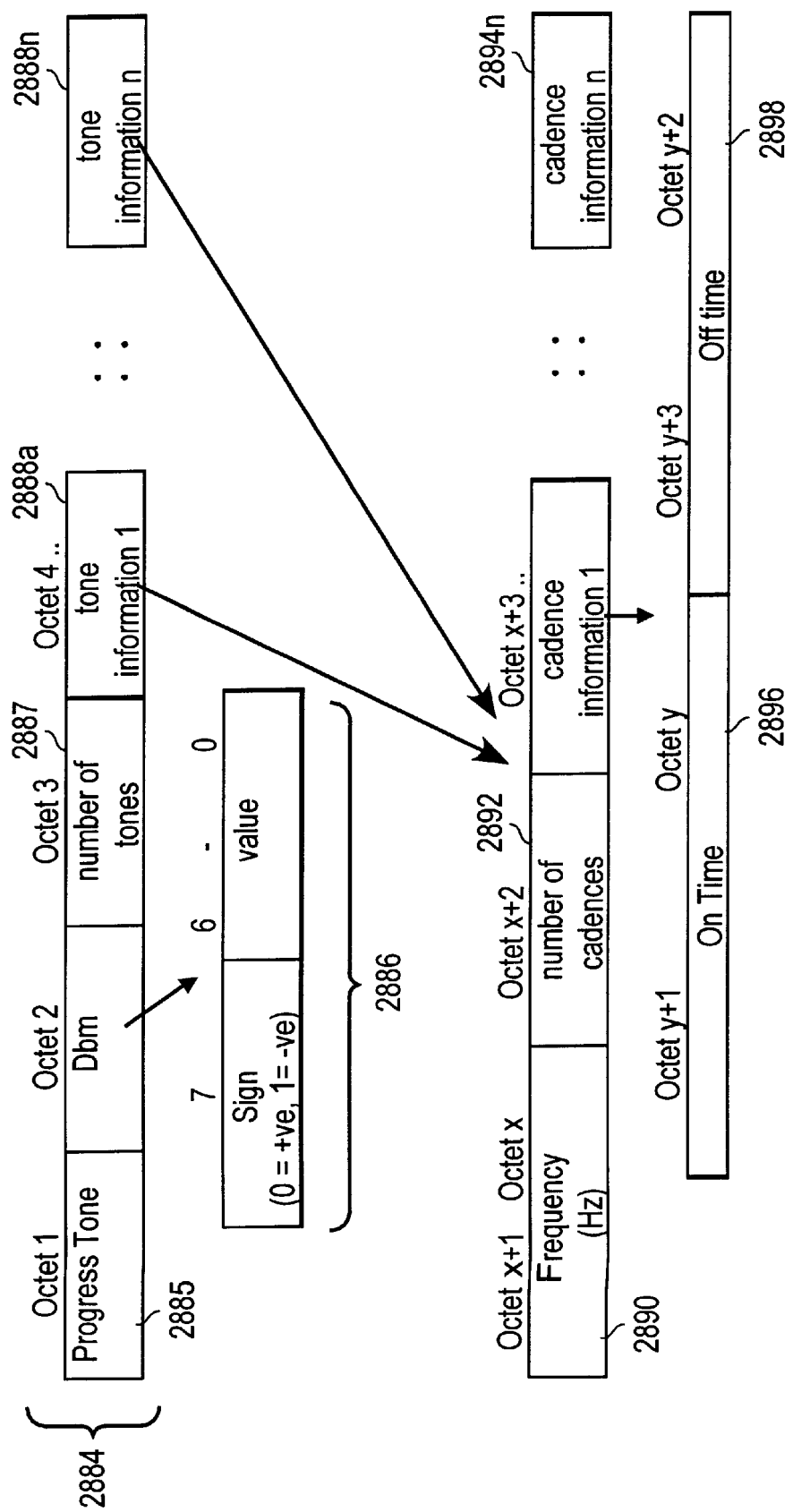
FIG. 28F is a diagram of a progress tone definition table.

The buffer also comprises a progress tone definition table as shown in FIG. 28F. The progress tone definition table has variable length and defines progress tones to be applied or detected during the course of a call. Generally, it comprises a list of tones and their composition. In a preferred embodiment, the table comprises a plurality of entries 2884. Each entry comprises a progress tone value 2885, a Dbm value 2886, a number of tones value 2887, and one or more tone information values 2888a–2888n. The progress tone value 2886 identifies the type of progress tone represented by the entry 2884, and may carry a value of: Dial tone=1; Special dial tone=2; Ring tone=3; Busy tone=4; Equipment busy tone=5; Congestion tone=6; NU tone=7; Special info tone=8; Call waiting tone=9.

The Dbm value 2886 comprises a sign bit and a numeric value. The number of tones value 2887 carries a numeric value indicating the number of tone information values 2888a–2888n that follow.

Each tone information value 2888a–2888n comprises a frequency value 2890, a number of cadences value 2892, and one or more cadence information values 2894a–2894n. The frequency value 2890 expresses the frequency in Hertz of a tone that makes up the progress tone 2885. The number of cadences value 2892 carries a numeric value indicating the number of cadence information values 2894a–2894n that follow. Each of the cadence information values 2894a–2894n comprises an on time value 2896 and an off time value 2898. The on time value and the off time value express the time in milliseconds that a tone is on or off for a particular cadence.

TRUNK TEST MODULE

CAS Module 604 drops and inserts channels as part of its normal protocol conversion function. Communication Signal Processor 2510 is also capable of acting as a Remote Office Test Line (ROTL) and responder. For example, Communication Signal Processor 2510 can initiate calls and supply standard ROTL tones when optioned to do so. Communication Signal Processor 2510 will verify the state of the line/trunk to insure that it is Idle and initiate a call to a responder telephone number. When the call is answered, a ROTL session is initiated. Transmission and noise tests are performed using the ROTL or ATME-D procedures. Subsequent calls can be initiated to test line or trunk groups as required.

When optioned and enabled for responder capability, the Trunk Service Unit 2502 or TSU cards 2504a–2504n will intercept incoming calls and depending on the tones detected, will terminate the call. Normal responder functions will be performed and when completed, the Communication Signal Processor 2510 will release the line/trunk.

The Digital Test Head is also capable of performing Analog Transmission Tests. The following tests are provided: Send Tone (100 to 4000 Hz); Receive Tone (100 to 4000 Hz); Measure Noise; Send Three Tone Slope; and Send Full Frequency Run (100 Hz Steps).

APPLICATIONS PROGRAMMING INTERFACE (API)

Protocol converter 100 is designed to interoperate with other computers in an open system environment using one or more Applications Programming Interfaces (APIs). Protocol converter 100 APIs are based on the UNIX operating system, and enable a user of the protocol converter to design and code customized applications.

Preferably, protocol converter 100 communicates with the CAS Module 604 using an API. The API enables the CAS Module 604 to access the Universal Call Model state machine. As described elsewhere herein, the protocol converter 100 maintains call context information that can utilize events detected by the CAS Module 604. Protocol converter 100 obtains such events from the CAS Module 604 using the API, enabling the protocol converter to conduct advanced analysis of call disposition. Thus, by utilizing the conversion tool, a user may define precise signaling actions to be taken upon detection of each unique event.

In the preferred embodiment, the API incorporates an interactive dialog between protocol converter 100 and the CAS Module 604. The CAS Module 604 executes Configuration Data, real time command and response, hardware status and alarm information. Protocol converter 100's Process Manager maintains all processes. Information is communicated between the protocol converter 100 and the CAS Module 604 using the digital connection 2424.

By maintaining call context information, the protocol converter 100 can provide complete call detail reports, or can filter on specific information and provide customized reports based on user defined parameters. This position of the protocol converter within the call path also facilitates development of call processing applications in which the manipulation of call signal information is required. For example, the API can be used to develop Fraud Management applications, Billing applications, and other applications.

HARDWARE OVERVIEW

FIG. 29 is a block diagram that illustrates a computer system 2900 upon which an embodiment of the invention may be implemented. Computer system 2900 includes a bus 2902 or other communication mechanism for communicating information, and a processor 2904 coupled with bus 2902 for processing information. Computer system 2900 also includes a main memory 2906, such as a random access memory (RAM) or other dynamic storage device, coupled to bus 2902 for storing information and instructions to be executed by processor 2904. Main memory 2906 also may be used for storing temporary variables or other intermediate information during execution of instructions to be executed by processor 2904. Computer system 2900 further includes a read only memory (ROM) 2908 or other static storage device coupled to bus 2902 for storing static information and instructions for processor 2904. A storage device 2910, such as a magnetic disk or optical disk, is provided and coupled to bus 2902 for storing information and instructions.

Computer system 2900 may be coupled via bus 2902 to a display 2912, such as a cathode ray tube (CRT), for displaying information to a computer user. An input device 2914, including alphanumeric and other keys, is coupled to bus 2902 for communicating information and command selections to processor 2904. Another type of user input device is cursor control 2916, such as a mouse, a trackball, or cursor direction keys for communicating direction information and command selections to processor 2904 and for controlling cursor movement on display 2912. This input device typically has two degrees of freedom in two axes, a first axis (e.g., x) and a second axis (e.g., y), that allows the device to specify positions in a plane.

The invention is related to the use of computer system 2900 for protocol conversion and signaling control. According to one embodiment of the invention, protocol conversion and signaling control is provided by computer system 2900 in response to processor 2904 executing one or more sequences of one or more instructions contained in main memory 2906. Such instructions may be read into main memory 2906 from another computer-readable medium, such as storage device 2910. Execution of the sequences of instructions contained in main memory 2906 causes processor 2904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2904 for execution. Such a medium may take many forms, including but not limited to, non-volatile media, volatile media, and transmission media. Non-volatile media includes, for example, optical or magnetic disks, such as storage device 2910. Volatile media includes dynamic memory, such as main memory 2906. Transmission media includes coaxial cables, copper wire and fiber optics, including the wires that comprise bus 2902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2904 for execution. For example, the instructions may initially be carried on a magnetic disk of a remote computer. The remote computer can load the instructions into its dynamic memory and send the instructions over a telephone line using a modem. A modem local to computer system 2900 can receive the data on the telephone line and use an infrared transmitter to convert the data to an infrared signal. An infrared detector can receive the data carried in the infrared signal and appropriate circuitry can place the data on bus 2902. Bus 2902 carries the data to main memory 2906, from which processor 2904 retrieves and executes the instructions. The instructions received by main memory 2906 may optionally be stored on storage device 2910 either before or after execution by processor 2904.

Computer system 2900 also includes a communication interface 2918 coupled to bus 2902. Communication interface 2918 provides a two-way data communication coupling to a network link 2920 that is connected to a local network 2922. For example, communication interface 2918 may be an integrated services digital network (ISDN) card or a modem to provide a data communication connection to a corresponding type of telephone line. As another example, communication interface 2918 may be a local area network (LAN) card to provide a data communication connection to a compatible LAN. Wireless links may also be implemented. In any such implementation, communication interface 2918 sends and receives electrical, electromagnetic or optical signals that carry digital data streams representing various types of information.

Network link 2920 typically provides data communication through one or more networks to other data devices. For example, network link 2920 may provide a connection through local network 2922 to a host computer 2924 or to data equipment operated by an Internet Service Provider (ISP) 2926. ISP 2926 in turn provides data communication services through the world wide packet data communication network now commonly referred to as the "Internet" 2928. Local network 2922 and Internet 2928 both use electrical, electromagnetic or optical signals that carry digital data streams. The signals through the various networks and the signals on network link 2920 and through communication interface 2918, which carry the digital data to and from computer system 2900, are exemplary forms of carrier waves transporting the information.

Computer system 2900 can send messages and receive data, including program code, through the network(s), network link 2920 and communication interface 2918. In the Internet example, a server 2930 might transmit a requested code for an application program through Internet 2928, ISP 2926, local network 2922 and communication interface 2918. In accordance with the invention, one such downloaded application provides for protocol conversion and signaling control as described herein.

The received code may be executed by processor 2904 as it is received, and/or stored in storage device 2910, or other non-volatile storage for later execution. In this manner, computer system 2900 may obtain application code in the form of a carrier wave.

ADVANTAGES, EXTENSIONS AND ALTERNATIVES

The solution described herein is particularly advantageous, in that it is capable of interpretation, manipulation and conversion of any voice network protocol, it is centrally managed, user programmable, and scalable with a built-in diagnostic capability. In addition, the solution described herein is flexible, in that it accommodates interworking of all network protocols and provides a set of flexible user tools to remotely define, map, alter and logically convert between any combination of multiple protocol stacks including C7s, Primary Rate Interfaces, Channel Associated Signaling, analog protocols, and proprietary protocols.

The solution described herein is also manageable in that it has a remote management capability with a common user interface supporting graphical user interfaces, man-machine language, or customer specific operations support systems via APIs. Further, the system is scalable in that it is functional on a variety of hardware platforms with a range of capacity requirements from management of a single signaling path to hundreds of signaling links.

Advantageously, the system offers embedded diagnostics in the form of a built-in signaling analyzer to automatically and independently determine the signaling data between two points, interpret the data and quickly identify a method for resolving the interworking issues in real time. This capability significantly minimizes customer install intervals due to signaling incompatibilities. Further, the system is configured to produce network statistic and analysis reports, providing real time data to generate network statistics and reports such as answer seizure ratio, call attempts, percentage failures, average holding time, etc. potentially preventing costly downtime.

The system includes an application enabler that is located at the access layer of the network. The application enabler captures, in real time, valuable call context information enabling applications such as billing records, advice of charge notification, fraud detection and control, digit translation, etc. The system also has flexibility so that it is capable of interworking with the most cost effective third party network via the ability to instantly mirror whatever interface is presented by an egress provider.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1
EXAMPLE SIGNALING FLOWS INCOMING CALL (OVERLAP)
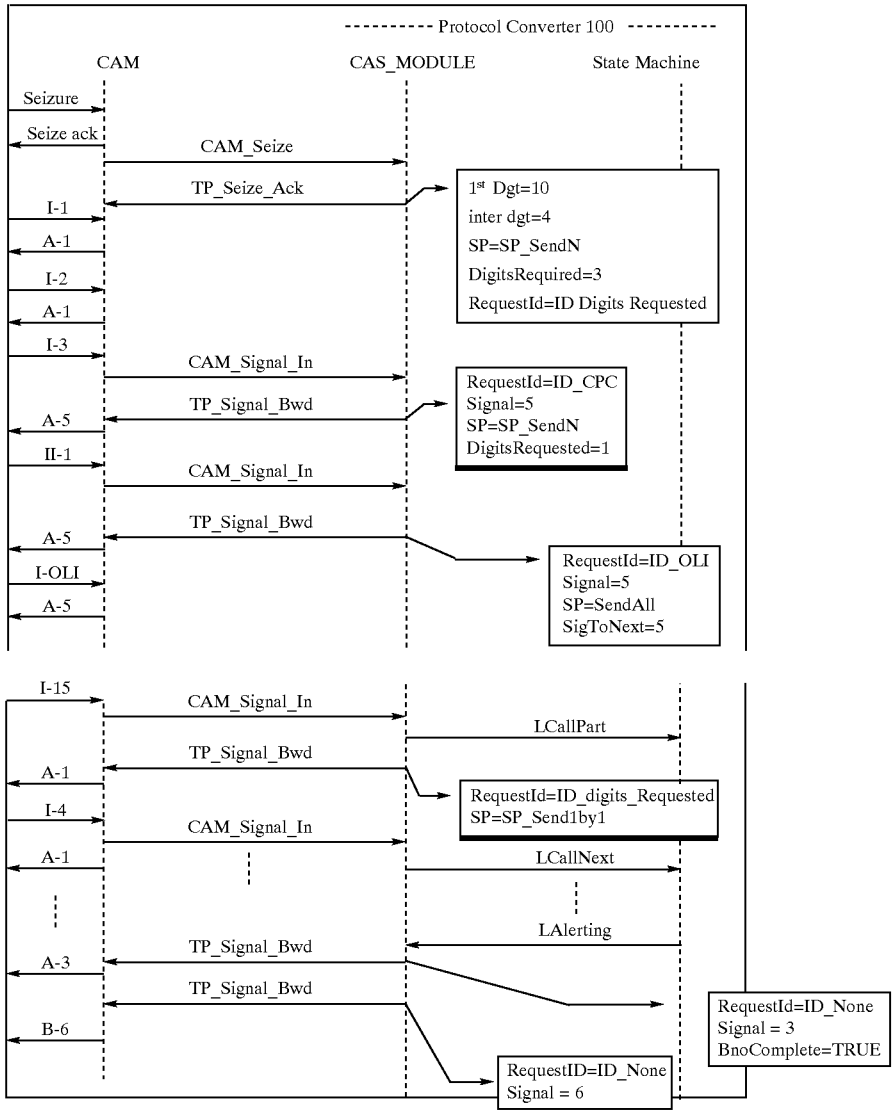
EXAMPLE SIGNALING FLOWS INCOMING CALL (EN BLOC)

APPENDIX 1-continued
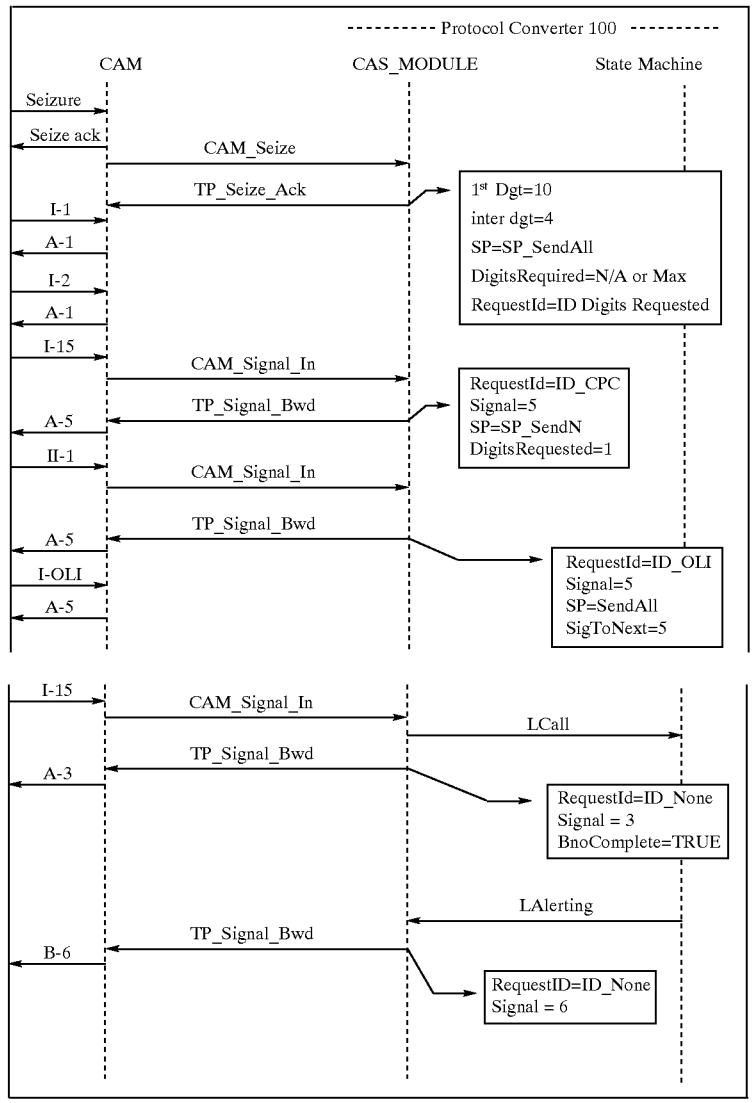
EXAMPLE CALL FLOWS OUTGOING CALL (OVERLAP)

APPENDIX 1-continued
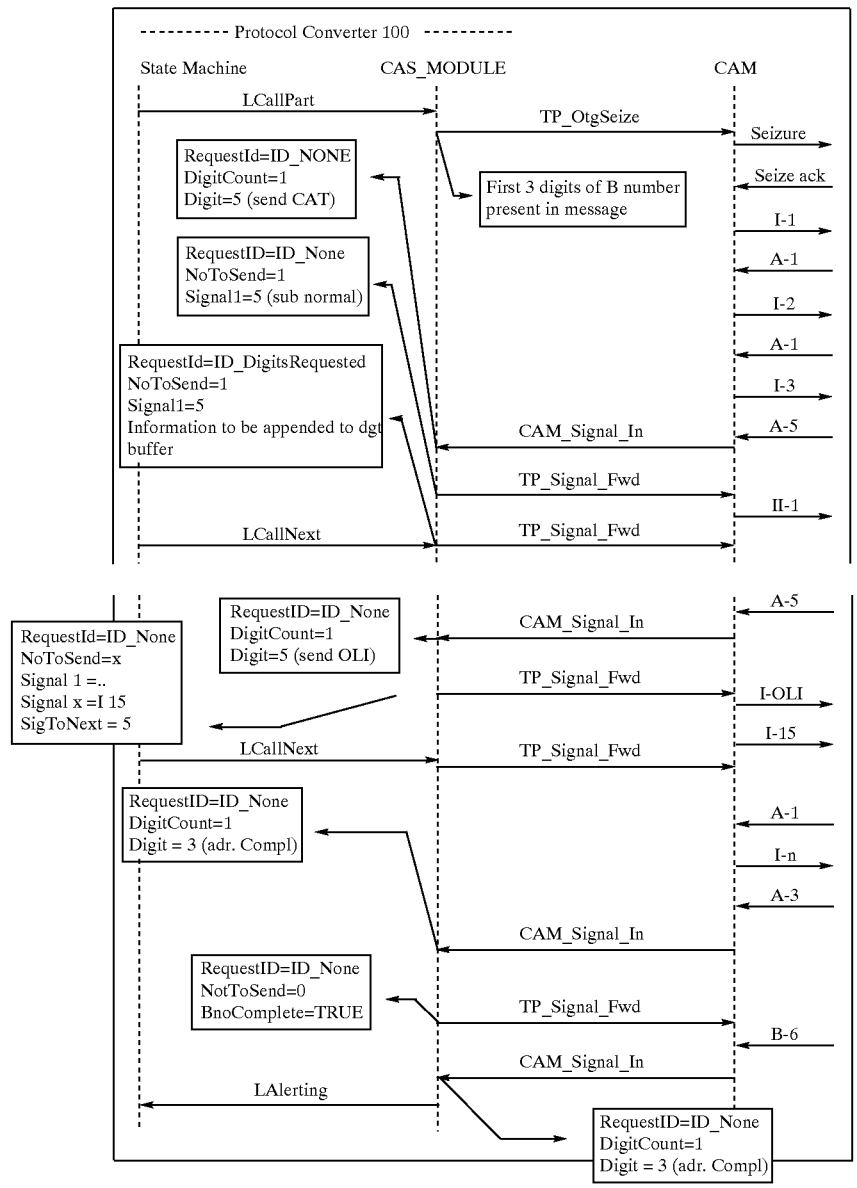
EXAMPLE CALL FLOWS OUTGOING CALL (EN BLOC)

APPENDIX 1-continued
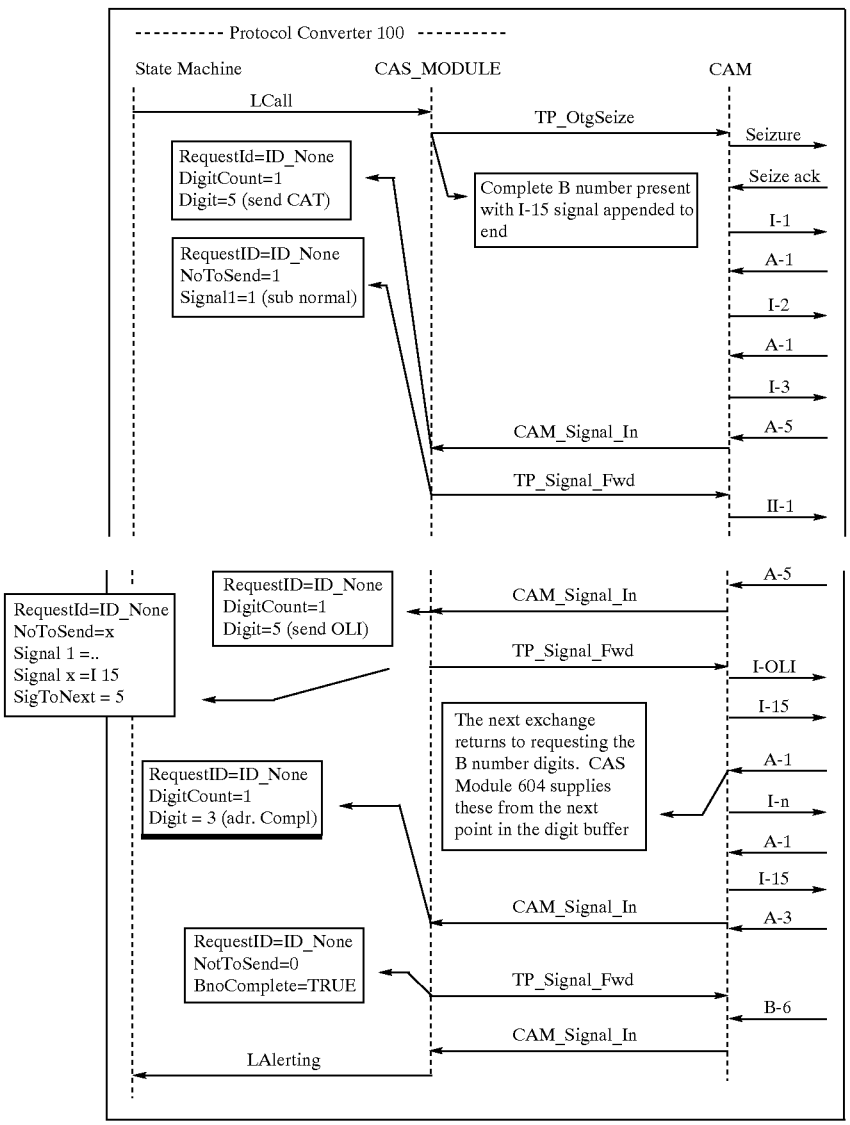
EXAMPLE CALL FLOWS OLI AND CPC TREATMENT IN NON COMPLELLED SIGNALING
(OVERLAP WORKING)

APPENDIX 1-continued

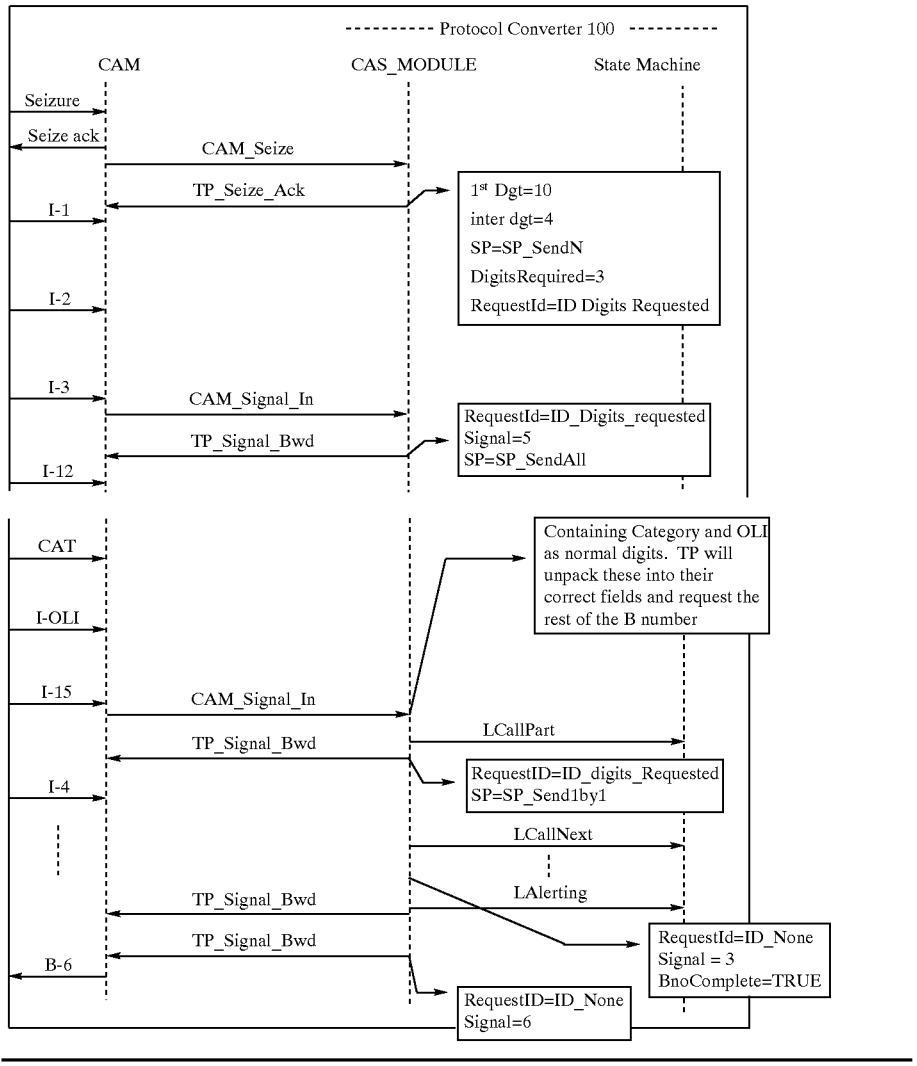

APPENDIX 2

EXAMPLE BUFFER LAYOUT -- R2 NATIONAL PROTOCOL

| Values | Contents |
|---|---|
| 01H | TAG ID - Mandatory part |
| 03H | TAG length |
| 02H | R2 subgroup |
| 01H | Group ID = 1 |
| 4FH | Bothway, compelled, four wire, national, no metering, pulse transmission |
| 02H | Cut Through point = Address complete |
| 03H | TAG ID - Line signal definitions |
| 20H | TAG length |
| 01H | LS_IDLE_SIG |
| 02H | sig pts 1-0 |
| 0000H | drive time = indefinite |
| 02H | LS_SEIZE_SIG |
| 00H | sig pts 0-0 |
| 0000H | drive time = indefinite |
| 07H | LS_CLF_SIG |
| 02H | sig pts 1-0 |
| 0000H | drive time = indefinite |
| 09H | LS_OFFER_SIG |

APPENDIX 2-continued

EXAMPLE BUFFER LAYOUT -- R2 NATIONAL PROTOCOL

| Values | Contents |
|---|---|
| 02H | sig pts 1-0 |
| 0078H | drive time = 120 milliseconds |
| 0AH | LS_BLOCK_SIG |
| 03H | sig pts 1-1 |
| 0000H | drive time = indefinite |
| 03H | LS_SEIZE_ACK_SIG |
| 03H | sig pts 1-1 |
| 0000H | drive time = indefinite |
| 05H | LS_ANSWER_SIG |
| 01H | sig pts 0-1 |
| 0000H | drive time = indefinite |
| 06H | LS_CLB_SIG |
| 03H | sig pts 1-1 |
| 0000H | drive time = indefinite |
| 04H | TAG ID - Incoming Line state table |
| A5H | TAG length |
| 0AH | State data - IDLE-SEIZE |
| 0064H | Persistency - min. make period = 100ms |
| 0000H | Persistency - max. make period = indefinite |

APPENDIX 2-continued

EXAMPLE BUFFER LAYOUT -- R2 NATIONAL PROTOCOL

| Values | Contents |
|---|---|
| 0000H | Persistency - min. break period = none |
| 0000H | Persistency - max. break period = none |
| 01H | message to send = CAM_Seize |
| 03H | line signal response = LS_SEIZE_ACK |
| 3AH | State data - IDLE-BLOCK |
| 0064H | Persistency - min. make period = 100ms |
| 0000H | Persistency - max. make period = indefinite |
| 0000H | Persistency - min. break period = none |
| 0000H | Persistency - max. break period = none |
| 29H | message to send = SYS_Blocking |
| 0AH | line signal response = LS_BLOCK |
| 1AH | State data - IDLE-INVALID |
| 0064H | Persistency - min. make period = 100ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 2CH | State data - SEIZE-CLF |
| 012CH | Persistency - min. make period = 300ms |
| 0000H | Persistency - max. make period = indefinite |
| 0000H | Persistency - min. break period = none |
| 0000H | Persistency - max. break period = none |
| 02H | message to send = CAM_ClearForward |
| 0CH | line signal response = LS_NONE |
| 3CH | State data - SEIZE-BLOCK |
| 0032H | Persistency - min. make period = 50ms |
| 0000H | Persistency - max. make period = indefinite |
| 0000H | Persistency - min. break period = none |
| 0000H | Persistency - max. break period = none |
| 29H | message to send = SYS_Blocking |
| 0AH | line signal response = LS_BLOCK |
| 1CH | State data - SEIZE-INVALID |
| 0032H | Persistency - min. make period = 50ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 24H | State data - ANSWER-CLF |
| 012CH | Persistency - min. make period = 300ms |
| 0000H | Persistency - max. make period = indefinite |
| 0000H | Persistency - min. break period = none |
| 0000H | Persistency - max. break period = none |
| 02H | message to send = CAM_ClearForward |
| 0CH | line signal response = LS_NONE |
| 34H | State data - ANSWER-BLOCK |
| 0032H | Persistency - min. make period = 50ms |
| 0000H | Persistency - max. make period = indefinite |
| 0000H | Persistency - min. break period = none |
| 0000H | Persistency - max. break period = none |
| 29H | message to send = SYS_Blocking |
| 0AH | line signal response = LS_BLOCK |
| 14H | State data - ANSWER-INVALID |
| 0032H | Persistency - min. make period = 50ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 2CH | State data - CLB-CLF |
| 012CH | Persistency - min. make period = 300ms |
| 0000H | Persistency - max. make period = indefinite |
| 0000H | Persistency - min. break period = none |
| 0000H | Persistency - max. break period = none |
| 02H | message to send = CAM_ClearForward |
| 0CH | line signal response = LS_NONE |
| 3CH | State data - CLB-BLOCK |
| 012CH | Persistency - min. make period = 300ms |
| 0000H | Persistency - max. make period = indefinite |
| 0000H | Persistency - min. break period = none |
| 0000H | Persistency - max. break period = none |
| 29H | message to send = SYS_Blocking |
| 0CH | line signal response = LS_NONE |
| 1CH | State data - CLB-INVALID |
| 0032H | Persistency - min. make period = 50ms |
| 0000H | Persistency - max. make period = indefinite |
| 0000H | Persistency - min. break period = none |
| 0000H | Persistency - max. break period = none |
| 04H | message to send = CAM_Event |
| 0CH | line signal response = LS_NONE |
| 2FH | State data - BLOCKED - IDLE |
| 0032H | Persistency - min. make period = 50ms |
| 0000H | Persistency - max. make period = indefinite |
| 0000H | Persistency - min. break period = none |
| 0000H | Persistency - max. break period = none |
| 29H | message to send = SYS_Blocking |
| 01H | line signal response = LS_IDLE |
| 2DH | State data - FAULT - IDLE |
| 0032H | Persistency - min. make period = 50ms |
| 0000H | Persistency - max. make period = indefinite |
| 0000H | Persistency - min. break period = none |
| 0000H | Persistency - max. break period = none |
| 29H | message to send = SYS_Blocking |
| 01H | line signal response = LS_IDLE |
| 05H | TAG ID - Incoming drive state table |
| 1CH | TAG length |
| 0AH | State data - IDLE - BLOCKED |
| 29H | Message in - SYS_Blocking |
| 0AH | Signal to drive - LS_BLOCK |
| 00H | Message out - CAS_MsgNone |
| 0CH | State data - SEIZE - ANSWER |
| 1AH | Message in - TP_Answer |
| 05H | Signal to drive - LS_ANSWER |
| 00H | Message out - CAS_MsgNone |
| 0CH | State data - SEIZE - BLOCKED |
| 29H | Message in - SYS_Blocking |
| 0AH | Signal to drive - LS_BLOCK |
| 00H | Message out - CAS_MsgNone |
| 04H | State data - ANSWER - CLB |
| 1CH | Message in - TP_ClearBack |
| 06H | Signal to drive-LS_CLB |
| 00H | Message out - CAS_MsgNone |
| 06H | State data - CLF - RELEASE |
| 18H | Message in - TP_Release |
| 01H | Signal to drive - LS_IDLE |
| 00H | Message out - CAS_MsgNone |
| 06H | State data - CLF - BLOCKED |
| 29H | Message in - SYS_Blocking |
| 0AH | Signal to drive - LS_BLOCK |
| 00H | Message out - CAS_MsgNone |
| 0EH | State data - CLB - RELEASE |
| 18H | Message in - TP_Release |
| 01H | Signal to drive - LS_IDLE |
| 00H | Message out - CAS_MsgNone |
| 06H | TAG ID - Outgoing line state table |
| B0H | TAG length |
| 3AH | State data - IDLE-BLOCK |
| 0064H | Persistency - min. make period = 100ms |
| 0000H | Persistency - max. make period = indefinite |
| 0000H | Persistency - min. break period = none |
| 0000H | Persistency - max. break period = none |
| 29H | message to send = SYS_Blocking |
| 0AH | line signal response = LS_BLOCK |
| 0AH | State data - IDLE-IN VALID1 |
| 0064H | Persistency - min. make period = 100ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 1AH | State data - IDLE-INVALID2 |
| 0064H | Persistency - min. make period = 100ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 23H | State data - SEIZE-IDLE |
| 0064H | Persistency - min. make period = 100ms |

APPENDIX 2-continued

EXAMPLE BUFFER LAYOUT -- R2 NATIONAL PROTOCOL

| Values | Contents |
|---|---|
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 13H | State data - SEIZE-ANSWER |
| 012CH | Persistency - min. make period = 300ms |
| 0000H | Persistency - max. make period = indefinite |
| 0000H | Persistency - min. break period = none |
| 0000H | Persistency - max. break period = none |
| 05H | message to send = CAM_Answer |
| 0DH | line signal response = LS_None |
| 03H | State data - SEIZE-INVALID |
| 0064H | Persistency - min. make period = 100ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 31H | State data - ANSWER-CLB |
| 012CH | Persistency - min. make period = 300ms |
| 0000H | Persistency - max. make period = indefinite |
| 0000H | Persistency - min. break period = none |
| 0000H | Persistency - max. break period = none |
| 06H | message to send = CAM_Clearback |
| 0DH | line signal response = LS_None |
| 21H | State data - ANSWER-IDLE |
| 012CH | Persistency - min. make period = 300ms |
| 0000H | Persistency - max. make period = indefinite |
| 0000H | Persistency - min. break period = none |
| 0000H | Persistency - max. break period = none |
| 04H | message to send = $CAM_{13}$ Event |
| 0AH | line signal response = LS_BLOCK |
| 01H | State data - ANSWER-INVALID |
| 012CH | Persistency - min. make period = 300ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_BLOCK |
| 13H | State data - CLB - ANSWER |
| 012CH | Persistency - min. make period = 300ms |
| 0000H | Persistency - max. make period = indefinite |
| 0000H | Persistency - min. break period = none |
| 0000H | Persistency - max. break period = none |
| 05H | message to send = CAM_Answer |
| 0DH | line signal response = LS_NONE |
| 23H | State data - CLB - IDLE |
| 012CH | Persistency - min. make period = 300ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_NONE |
| 03H | State data - CLB - INVALID |
| 0064H | Persistency - min. make period = 100ms |
| 0000H | Persistency - max. make period = indefinite |
| 0000H | Persistency - min. break period = none |
| 0000H | Persistency - max. break period = none |
| 04H | message to send = CAM_Event |
| 0AH | line signal response = LS_N0NE |
| 2FH | State data - BLOCK1 - IDLE |
| 0064H | Persistency - min. make period = 100ms |
| 0000H | Persistency - max. make period = indefinite |
| 0000H | Persistency - min. break period = none |
| 0000H | Persistency - max. break period = none |
| 29H | message to send = SYS_Blocking |
| 01H | line signal response = LS_IDLE |
| 2EH | State data - BLOCK2 - IDLE |
| 0064H | Persistency - min. make period = 100ms |
| 0000H | Persistency - max. make period = indefinite |
| 0000H | Persistency - min. break period = none |
| 0000H | Persistency - max. break period = none |
| 29H | message to send = SYS_Blocking |
| 01H | line signal response = LS_IDLE |
| 2CH | State data - FAULT1 - IDLE |
| 0064H | Persistency - min. make period = 100ms |
| 0000H | Persistency - max. make period = indefinite |
| 0000H | Persistency - min. break period = none |
| 0000H | Persistency - max. break period = none |
| 29H | message to send = SYS_Blocking |
| 01H | line signal response = LS_IDLE |
| 2DH | State data - FAULT2 - IDLE |
| 0064H | Persistency - min. make period = 100ms |
| 0000H | Persistency - max. make period = indefinite |
| 0000H | Persistency - min. break period = none |
| 0000H | Persistency - max. break period = none |
| 29H | message to send = SYS_Blocking |
| 01H | line signal response = LS_IDLE |
| 07H | TAG ID - Outgoing drive state table |
| 24H | TAG length |
| 0AH | State data - IDLE - SEIZE |
| 19H | Message in - TP_OtgSeize |
| 02H | Signal to drive - LS_SEIZE |
| 00H | Message out - CAS_MsgNone |
| 0AH | State data - IDLE - BLOCKED |
| 29H | Message in - SYS_Blocking |
| 0AH | Signal to drive - LS_BLOCK |
| 00H | Message out - CAS_MsgNone |
| 03H | State data - SEIZE - RELEASE |
| 18H | Message in - TP_Release |
| 07H | Signal to drive - LS_CLF |
| 00H | Message out - CAS_MsgNone |
| 03H | State data - SEIZE - BLOCK |
| 29H | Message in - SYS_Blocking |
| 0AH | Signal to drive - LS_BLOCK |
| 00H | Message out - CAS_MsgNone |
| 01H | State data - ANSWER - RELEASE |
| 18H | Message in - TP_Release |
| 07H | Signal to drive - LS_CLF |
| 00H | Message out - CAS_MsgNone |
| 01H | State data - ANSWER - BLOCK |
| 29H | Message in - SYS_Blocking |
| 0AH | Signal to drive - LS_BLOCK |
| 00H | Message out - CAS_MsgNone |
| 03H | State data - CLB - RELEASE |
| 18H | Message in - TP_Release |
| 07H | Signal to drive - LS_CLF |
| 00H | Message out - CAS_MsgNone |
| 03H | State data - CLB - BLOCK |
| 29H | Message in - SYS_Blocking |
| 0AH | Signal to drive - LS_BLOCK |
| 00H | Message out - CAS_MsgNone |
| 0FH | State data - BLOCK - IDLE |
| 18H | Message in - TP_Release |
| 07H | Signal to drive - LS_CLF |
| 00H | Message out - CAS_MsgNone |
| 08H | TAG ID - MF forward tone table |
| 48H | TAG length |
| 0564H | MF code 1 - Tone A (1380) |
| 05DCH | MF code 1 - Tone B (1500) |
| 0564H | MF code 2 - Tone A (1380) |
| 0654H | MF code 2 - Tone B (1620) |
| 05DCH | MF code 3 - Tone A (1500) |
| 0654H | MF code 3 - Tone B (1620) |
| 0564H | MF code 4 - Tone A (1380) |
| 06CCH | MF code 4 - Tone B (1740) |
| 05DCH | MF code 5 - Tone A (1500) |
| 06CCH | MF code 5 - Tone B (1740) |
| 0654H | MF code 6 - Tone A (1620) |
| 06CCH | MF code 6 - Tone B (1740) |
| 0564H | MF code 7 - Tone A (1380) |
| 0744H | MF code 7 - Tone B (1860) |
| 05DCH | MF code 8 - Tone A (1500) |
| 0744H | MF code 8 - Tone B (1860) |
| 0654H | MF code 9 - Tone A (1620) |
| 0744H | MF code 9 - Tone B (1860) |
| 06CCH | MF code 10 - Tone A (1740) |
| 0744H | MF code 10 - Tone B (1860) |
| 0564H | MF code 11 - Tone A (1380) |

APPENDIX 2-continued

EXAMPLE BUFFER LAYOUT -- R2 NATIONAL PROTOCOL

| Values | Contents |
|---|---|
| 07BCH | MF code 11 - Tone B (1980) |
| 05DCH | MF code 12 - Tone A (1500) |
| 07BCH | MF code 12 - Tone B (1980) |
| 0654H | MF code 13 - Tone A (1620) |
| 07BCH | MF code 13 - Tone B (1980) |
| 06CCH | MF code 14 - Tone A (1740) |
| 07BCH | MF code 14 - Tone B (1980) |
| 0744H | MF code 15 - Tone A (1860) |
| 07BCH | MF code 15 - Tone B (1980) |
| 0564H | MF code 16 - Tone A (0) |
| 06CCH | MF code 16 - Tone B (0) |
| 0032H | Tone Durations - Min make |
| 0000H | Tone Durations - Max make |
| 0032H | Tone Durations - Min break |
| 0000H | Tone Durations - Max break |
| 09H | TAG ID - MF backward tone table |
| 48H | TAG length |
| 0474H | MF code 1 - Tone A (1140) |
| 03FCH | MF code 1 - Tone B (1020) |
| 0474H | MF code 2 - Tone A (1140) |
| 0384H | MF code 2 - Tone B (900) |
| 03FCH | MF code 3 - Tone A (1020) |
| 0384H | MF code 3 - Tone B (900) |
| 0474H | MF code 4 - Tone A (1140) |
| 030CH | MF code 4 - Tone B (780) |
| 03FCH | MF code 5 - Tone A (1020) |
| 030CH | MF code 5 - Tone B (780) |
| 0384H | MF code 6 - Tone A (900) |
| 030CH | MF code 6 - Tone B (780) |
| 0474H | MF code 7 - Tone A (1140) |
| 0294H | MF code 7 - Tone B (660) |
| 03FCH | MF code 8 - Tone A (1020) |
| 0294H | MF code 8 - Tone B (660) |
| 0384H | MF code 9 - Tone A (900) |
| 0294H | MF code 9 - Tone B (660) |
| 030CH | MF code 10 - Tone A (780) |
| 0294H | MF code 10 - Tone B (660) |
| 0414H | MF code 11 - Tone A (1140) |
| 021CH | MF code 11 - Tone B (540) |
| 03FCH | MF code 12 - Tone A (1020) |
| 021CH | MF code 12 - Tone B (540) |
| 0384H | MF code 13 - Tone A (900) |
| 021CH | MF code 13 - Tone B (540) |
| 030CH | MF code 14 - Tone A (780) |
| 021CH | MF code 14 - Tone B (540) |
| 0294H | MF code 15 - Tone A (660) |
| 021CH | MF code 15 - Tone B (540) |
| 0564H | MF code 16 - Tone A (0) |
| 06CCH | MF code 16 - Tone B (0) |
| 0032H | Tone Durations - Min make |
| 0000H | Tone Durations - Max make |
| 0032H | Tone Durations - Min break |
| 0000H | Tone Durations - Max break |
| 0AH | TAG ID - MF backward pulse table |
| 10H | TAG length |
| 03H | ToneID - A-3 |
| 0096H | Drive time - 150ms |
| 0032H | Fluctuation - 50ms |
| 04H | ToneID - A-4 |
| 0096H | Drive time - 150ms |
| 0032H | Fluctuation - 50ms |
| 06H | ToneID - A-6 |
| 0096H | Drive time - 150ms |
| 0032H | Fluctuation - 50ms |
| 0FH | ToneID - A - 15 |
| 0096H | Drive time - 150ms |
| 0032H | Fluctuation - 50ms |
| 0BH | TAG ID - Progress tone table |
| 40H | TAG length |
| 01H | Id - Dial tone |
| 02H | no of tones - 2 |
| 015EH | Frequency - 350HZ |
| 8DH | Dbm - minus 13 |
| 00H | No of cadences - 0 |
| 01B8H | Frequency - 440HZ |

APPENDIX 2-continued

EXAMPLE BUFFER LAYOUT -- R2 NATIONAL PROTOCOL

| Values | Contents |
|---|---|
| 8DH | Dbm - minus 13 |
| 00H | No of cadences - 0 |
| 03H | Id - Ring tone |
| 02H | no of tones - 2 |
| 01B8H | Frequency - 440HZ |
| 98H | Dbm - minus 24 |
| 00H | No of cadences - 1 |
| 07D0H | On time - 2 secs |
| 0FA0H | Off time - 4 secs |
| 01E0H | Frequency - 480HZ |
| 98H | Dbm - minus 24 |
| 00H | No of cadences - 1 |
| 07D0H | On time - 2 secs |
| 0FA0H | Off time - 4 secs |
| 04H | Id - Busy tone |
| 02H | no of tones - 2 |
| 01E0H | Frequency - 480HZ |
| 98H | Dbm - minus 24 |
| 00H | No of cadences - 1 |
| 01F4H | On time - 500ms |
| 01F4H | Off time - 500ms |
| 026CH | Frequency - 620HZ |
| 98H | Dbm - minus 24 |
| 00H | No of cadences - 1 |
| 01F4H | On time - 500ms |
| 01F4H | Off time - 500ms |
| 06H | Id - Congestion tone |
| 02H | no of tones - 2 |
| 01E0H | Frequency - 480HZ |
| 98H | Dbm - minus 24 |
| 00H | No of cadences - 1 |
| 00FAH | On time - 250ms |
| 00FAH | Off time - 250ms |
| 026CH | Frequency - 620HZ |
| 98H | Dbm - minus 24 |
| 00H | No of cadences - 1 |
| 00FAH | On time - 250ms |
| 00FAH | Off time - 250ms |

What is claimed is:

1. A method of communicating signaling information between a first signaling system that uses a common channel signaling (CCS) protocol and a second signaling system uses a channel associated signaling (CAS) protocol, in which the CCS protocol is incompatible with the CAS protocol, the method comprising the steps of:

receiving, at a protocol conversion system logically located between the first signaling system and the second signaling system, a first message from the first signaling system that conforms to the CCS protocol;

converting the first message to one or more second messages that conform to the CAS protocol; and communicating the one or more second messages to the second signaling system;

whereby a voice conversation is established between the first signaling system and the second signaling system.

2. The method recited in claim 1, further comprising the steps of:

receiving, at the protocol conversion system, a third message from the second signaling system that conforms to the CAS protocol;

converting the third message to one or more fourth messages that conform to CCS protocol; and communicating the one or more fourth messages to the first signaling system.

3. The method recited in claim 1, further comprising the steps of:

receiving, at the protocol conversion system, an initial address message from the first signaling system;

determining, based on the initial address message, to send a seizure request message; and communicating the seizure request message to the second signaling system.

4. The method recited in claim 3, further comprising the steps of:

sending, from the protocol conversion system to the second signaling system, a plurality of voiceband tones that represent digits of a call progress message.

5. The method recited in claim 4, further comprising the steps of:

communicating a message from the second signaling system to the protocol conversion system indicating that transmission of the voiceband tones is complete; and communicating a call progress message from the protocol conversion system to the first signaling system.

6. The method recited in claim 5, further comprising the steps of:

receiving, at the protocol conversion system, an answer signal from the second signaling system;

determining, based on the answer signal, to send an answer message;

sending an answer message from the protocol conversion system to the first signaling system.

7. The method recited in claim 6, further comprising the steps of:

receiving, at the protocol conversion system, a release signal from the first signaling system;

determining, based on the release signal, to send a clear forward signal; and sending the clear forward signal to the second signaling system.

8. The method recited in claim 1, in which the step of receiving comprises the step of receiving, at a CAS interface system coupled logically between the first signaling system and the second signaling system, a first message from the first signaling system that conforms to the CCS protocol.

9. The method recited in claim 1, in which the step of receiving comprises the step of receiving, at a trunk service unit coupled logically between the first signaling system and the second signaling system, a first message from the first signaling system that conforms to the CCS protocol.

10. The method recited in claim 9, further comprising the step of receiving the first message from the first signaling system at the trunk service unit under control of a processor that can cause the trunk service unit to insert and drop CCS protocol signals in frames of channels on trunks of the first signaling system.

11. The method recited in claim 1, in which the step of converting further comprises the steps of converting the first message to one or more second messages that conform to CAS protocol using a state machine executing in the protocol conversion system.

12. The method recited in claim 11, in which the step of converting further comprises the steps of executing a message definition language in the state machine of the protocol conversion system, in which the message definition language is configured to convert CCS messages to CAS messages and to convert CAS messages to CCS messages.

13. A system for communicating signaling information between a first signaling system that uses a common channel signaling (CCS) protocol and a second signaling system uses a channel associated signaling (CAS) protocol, the system comprising:

a trunk service device coupled to the first signaling system and to the second signaling system;

a processor coupled to the trunk service device for controlling the trunk service device to communicate one or more messages to the first signaling system and to the second signaling system; and a memory coupled to the processor and having stored therein one or more sequences of instructions for communicating signaling information between the first signaling system and the second signaling system by converting CCS protocol signals into CAS protocol signaling messages.

14. The system recited in claim 13, wherein the memory has stored therein one or more sequences of instructions which, when executed by the processor, cause the processor to communicate signaling information between the first signaling system and the second signaling system by converting CCS protocol signals into CAS protocol signaling messages by carrying out the steps of:

receiving, at the processor, a first message from the first signaling system that conforms to the CCS protocol;

converting the first message to one or more second messages that conform to the CAS protocol; and communicating the one or more second messages to the second signaling system;

whereby a voice conversation is established between the first signaling system and the second signaling system.

15. The system recited in claim 13, the one or more sequences of instructions further comprising the steps of:

receiving, at the processor, a third message from the second signaling system that conforms to the CAS protocol;

converting the third message to one or more fourth messages that conform to CCS protocol; and communicating the one or more fourth messages to the first signaling system.

16. The system recited in claim 13, the one or more sequences of instructions further comprising the steps of:

receiving, at the processor, an initial address message from the first signaling system;

determining, based on the initial address message, to send a seizure request message; and communicating the seizure request message to the second signaling system.

17. The system recited in claim 16, the one or more sequences of instructions further comprising the steps of:

sending, from the processor to the second signaling system, a plurality of voiceband tones that represent digits of a call progress message.

18. The system recited in claim 17, the one or more sequences of instructions further comprising the steps of:

communicating a message from the second signaling system to the processor indicating that transmission of the voiceband tones is complete; and communicating a call progress message from the processor to the first signaling system.

19. The system recited in claim 18, the one or more sequences of instructions further comprising the steps of:

receiving, at the processor, an answer signal from the second signaling system;

determining, based on the answer signal, to send an answer message;

sending an answer message from the processor to the first signaling system.

20. The method recited in claim 18, the one or more sequences of instructions further comprising the steps of:

receiving, at the processor, a release signal from the first signaling system;

determining, based on the release signal, to send a clear forward signal; and sending the clear forward signal to the second signaling system.

21. The system recited in claim 13, in which the step of receiving comprises the step of receiving, at a CAS interface system coupled logically between the first signaling system and the second signaling system, a first message from the first signaling system that conforms to the CCS protocol.

22. The system recited in claim 13, in which the step of receiving comprises the step of receiving, at a trunk service unit coupled logically between the first signaling system and the second signaling system, a first message from the first signaling system that conforms to the CCS protocol.

23. The system recited in claim 22, in which the step of receiving further comprises the step of receiving the first message from the first signaling system at the trunk service unit under control of a processor that can cause the trunk service unit to insert and drop CCS protocol signals in frames of channels on trunks of the first signaling system.

24. The system recited in claim 13, in which the step of converting further comprises the steps of converting the first message to one or more second messages that conform to CAS protocol using a state machine executing in the processor.

25. The system recited in claim 24, in which the step of converting further comprises the steps of executing a message definition language in the state machine of the processor, in which the message definition language is configured to convert CCS messages to CAS messages and to convert CAS messages to CCS messages.

26. A system for communicating signaling information between a first signaling system that uses a common channel signaling (CCS) protocol and a second signaling system uses a channel associated signaling (CAS) protocol, the system comprising:

a trunk service unit having a first input coupled to at least one CCS trunk group and having a second input coupled to at least one CAS trunk group;

a communications signal processor coupled to the trunk service unit; and one or more processors coupled to the communications signal processor and having stored therein one or more sequences of instructions for communicating signaling information between a first signaling system that uses a common channel signaling (CCS) protocol and a second signaling system uses a channel associated signaling (CAS) protocol, in which the one or more sequences of instructions, when executed by the one or more processors, cause the one or more processors to execute the steps of:

receiving, at a protocol conversion system logically located between the first signaling system and the second signaling system, a first message from the first signaling system that conforms to the CCS protocol;

converting the first message to a second message that conforms to the CAS protocol; and communicating the second message to the second signaling system;

whereby a voice conversation is established between the first signaling system and the second signaling system.

27. A computer data signal embodied in a carrier wave, the computer data signal carrying one or more sequences of instructions for protocol conversion using channel associated signaling, wherein execution of the one or more sequences of instructions by one or more processors causes the one or more processors to perform the steps of:

receiving, at a protocol conversion system logically located between the first signaling system and the second signaling system, a first message from the first signaling system that conforms to the CCS protocol;

converting the first message to one or more second messages that conform to the CAS protocol; and communicating the one or more second messages to the second signaling system;

whereby a voice conversation is established between the first signaling system and the second signaling system.

* * * * *